United States Patent [19]

Takei et al.

[11] Patent Number: 4,637,971
[45] Date of Patent: Jan. 20, 1987

[54] PHOTORECEPTOR HAVING POLYCARBONATE LAYERS AND PROCESS FOR THE PREPARATION THEREOF

[75] Inventors: Yoshiaki Takei; Hiroyuki Nomori; Katumi Matuura, all of Hachioji, Japan

[73] Assignee: Konishiroku Photo Industry Co., Ltd., Tokyo, Japan

[21] Appl. No.: 700,671

[22] Filed: Feb. 11, 1985

[30] Foreign Application Priority Data

Feb. 16, 1984 [JP] Japan .................................. 59-28309

[51] Int. Cl.$^4$ ............................................. G03G 5/04
[52] U.S. Cl. ......................................... 430/59; 430/96; 430/129
[58] Field of Search ..................... 430/67, 96, 59, 129

[56] References Cited

U.S. PATENT DOCUMENTS 3,703,372  11/1972  Merrill et al. ......................... 430/96
4,260,671   4/1981  Merrill ................................. 430/96
4,391,888   7/1983  Chang et al. ......................... 430/96

*Primary Examiner*—John L. Goodrow
*Attorney, Agent, or Firm*—Bierman and Muserlian

[57] ABSTRACT

A photoreceptor comprising a photosensitive layer and a support, wherein said photosensitive layer contains a polycarbonate compound binder selected from the group consisting of Formula A and B,

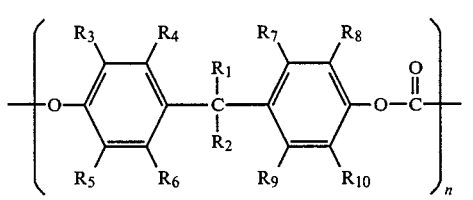

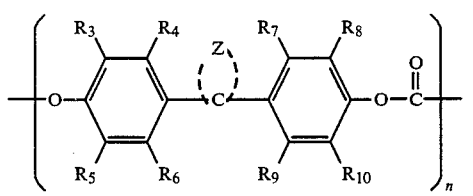

wherein $R_1$ and $R_2$ are independently hydrogen, substituted or unsubstituted aliphatic, or a substituted or unsubstituted hydrocarbon ring, provided that at least one of $R_1$ and $R_2$ has at least 3 carbon atoms, Z represents a group of atoms necessary to constitute a substituted or unsubstituted carbon ring or a substituted or unsubstituted heterocyclic ring, $R_3$ to $R_{10}$ in Formulas A and B are independently hydrogen, halogen, substituted or unsubstituted aliphatic, or a substituted or unsubstituted hydrocarbon ring, and n is a number from 10 to 1000.

32 Claims, 7 Drawing Figures

PHOTORECEPTOR HAVING POLYCARBONATE LAYERS AND PROCESS FOR THE PREPARATION THEREOF

BACKGROUND OF THE INVENTION

1. Field of the Invention

The present invention relates to a photoreceptor, and more particularly to a photoreceptor (e.g., an electrophotographic photoreceptor) having a photosensitive layer comprising a carrier generating layer and a carrier transport layer.

2. Description of the Prior Art

Those conventionally known electrophotographic photoreceptors are of the construction comprising in combination a carrier generating layer (hereinafter may be abbreviated to "CGL") containing a carrer generating material (hereinafter may be abbreviated to "CGM") which absorbs visible rays to generate a charge carrier (hereinafter called simply "carrier") and a carrier transport layer (hereinafter may be abbreviated to "CTL") containing a carrier transport material (hereinafter may be abbreviated to "CTM") which transports either a negative carrier or a positive carrier or both carriers that have been generated in the CGL. Allotting in this way the necessary two different basic functions, the carrier generation and the transport thereof, to the separate layers, respectively, that constitutes a photosensitive layer not only extends the selectable range of materials applicable to the construction of the photosensitive layer but also permits the independent selection of the respective materials or types of materials capable of most effectively attaining the respective functions. Also, the above allotment enables the obtaining of an electrophotographic photoreceptor having characteristics required in the electrophotographic process, e.g., such excellent characteristics consisting of high surface electric potential obtained when charged, high charge retainability, high sensitivity to light, and high stability in the repeated use.

As the above photosensitive layer, for example, those of the following constructions are known:

(1) A construction comprising in combination a CGL containing amorphous selenium or cadminum sulfide and a CTL containing poly-N-vinyl carbazole.

(2) A construction comprising in combination a CGL containing amorphous selenium or cadmium sulfide and a CTL containing 2,4,7-trinitrilo-9-fluorenone.

(3) A construction comprising in combination a CGL containing a perylene derivative and a CTL containing an oxadiazole derivative (as disclosed in U.S. Pat. No. 3,871,882).

(4) A construction comprising in combination a CGL containing chlorodianeblue or methyl skaririum and a CTL containing a pyrazoline derivative (Japanese Patent Publication Open to Public Inspection (hereinafter referred to as Japanese Patent O.P.I. Publication) No. 90827/1976).

(5) A construction comprising in combination a CGL containing amorphous selenium or an alloy thereof and a CTL containing a polyarylalkane-type aromatic amino compound (Japanese Patent Application No. 147251/1977).

(6) A construction comprising in combination a CGL containing a perylene derivative and a CTL containing a polyarylalkane-type aromatic amino compound (Japanese Patent Application No. 907/1978).

Attempts have been made to obtain an electrophotographic photoreceptor having excellent electrophotographic characteristics and excellent layer strength through the combined use of a low-molecular-weight organic compound as the charge transport material, an arbitrary charge generating material, and a high-molecular binder.

As the above high-molecular binder, polycarbonate is excellent in respect of the chargeability, repeatability, etc., the polycarbonate including, for example, those having the following structural formula unit:

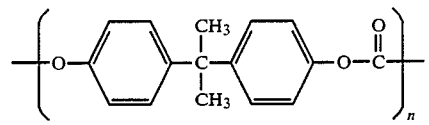

The polycarbonate is of the structure wherein two methyl groups are symmetrically combined to the center carbon atom of bisphenol A. As a result of our additional investigation, however, it has now been found that, if the above polycarbonate is used to form a layer, a crystalline polycarbonate is deposited thereon during the layer formation to tend to cause protruded portions over the formed layer, the protruded portions producing trail marks in the coating to thereby decrease its yield or causing, when the carbonate is used as a photoreceptor, toner residue to remain uncleared at the protruded portions which tends to result in image troubles due to the so-called toner filming. The deposition of the crystalline polycarbonate is considered to result from the fact that, in the above polycarbonate, the groups coupled to the center carbon atom are of a lower alkyl, methyl, which produces a high-degree molecular chain configuration.

OBJECT OF THE INVENTION

It is therefore an object of the present invention to provide a photoreceptor which is not only excellent in the chargeability, repeatability, and impressions (copying running life) but also free from the disadvantage in the characteristics, such as the undesirable toner filming, and the like.

BRIEF DESCRIPTION OF THE DRAWINGS

The accompanying drawings show the examples of the present invention.

DETAILED DESCRIPTION OF THE INVENTION

Figure 1:
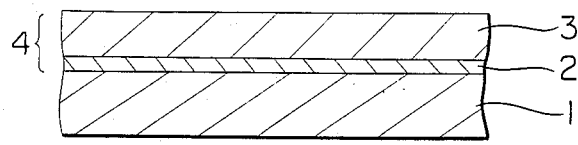
FIGS. 1, 2, 3, 4 and 5 are the cross-sectional views of the electrophotographic photoreceptors of five examples, respectively.

The present invention relates to a photoreceptor which comprises a photosensitive layer in which either a polycarbonate having the following Formula [A] or a polycarbonate having the following Formula [B] is contained as the principal component.

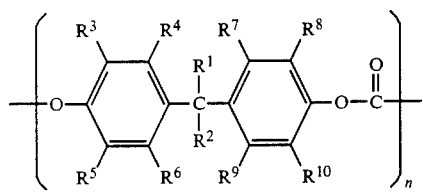

Formula [A]

wherein $R^1$ and $R^2$ each is a hydrogen atom, a substituted or unsubstituted aliphatic group, a substituted or unsubstituted carbocyclic group, or a substituted or unsubstituted aromatic group, and at least either one of the $R^1$ and $R^2$ is a bulky group; $R^3$, $R^4$, $R^5$, $R^6$, $R^7$, $R^8$, $R^9$ and $R^{10}$ each is a hydrogen atom, a halogen atom, substituted or unsubstituted aliphatic group, or a substituted or unsubstituted carbocyclic group; and n is from 10 to 1000.

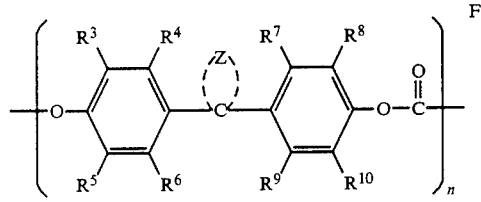

Formula [B]

wherein $R^3$, $R^4$, $R^5$, $R^6$, $R^7$, $R^8$, $R^9$ and $R^{10}$, and n are as defined in Formula [A]; and Z is a substituted or unsubstituted carbocyclic groups or a group of atoms necessary to form a substituted or unsubstituted heterocyclic group.

According to this invention, a polycarbonate having the above Formula [A] or [B] is used as the principal component of the binder of the photosensitive layer, and to the center carbon atom of the bisphenol A of these polycarbonates are coupled $R^1$ and $R^2$, at least either one of which is a bulky group, or formed a cyclic ring represented by the above Z, so that the presence of the $R^1$ and/or $R^2$ or Z prevents effectively the molecular chain of the polycarbonate from being configured in a specific direction. For this reason, there occurs no crystalline polycarbonate deposition during the formation of the photosensitive layer, thus enabling to prevent possible decrease of the yield due to the abnormal protrusion and deterioration of such characteristics as the image trouble due to the toner filming. This significant effect can be displayed more adequately if, in Formula [A], the $R^1$ and $R^2$ are different from each other or combined asymmetrically. In Formula [B], the ring formed by the Z contributes directly to the significant effect.

The binder used in this invention, since it is of the polycarbonate type, is capable of providing the photoreceptor with the characteristics peculiar to polycarbonate excellent in the chargeability, repeatability, impressions, and the like.

In the present invention, the polycarbonate having Formula [A] or [B] is desirable to be contained in an amount of not less than 15% by weight, and preferably not less than 30% by weight of the whole binder of the photosensitive layer.

Of the above-mentioned polycarbonates to be used in this invention, in the one having Formula [A], it is essential that at least either one of the $R^1$ and $R^2$ is a bulky group. The bulky group is desirable to have not less than three carbon atoms, which functions as a three-dimentional obstruction to prevent the molecular chain configuration in a specific direction. The following are examples of the above-mentioned bulky group:

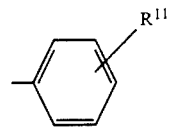

(1)

wherein $R^{11}$ is a hydrogen atom, an alkyl group such as methyl, etc., or an alkyl ester group represented by $-(CH_2)_m COOR$ (wherein R is an alkyl group, and m is equal to or more than 1).

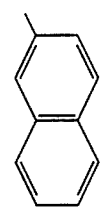

(2)

(3) An alkyl group represented by $-(C_m H_{2m+1}$ (wherein m is equal to or more than 4).

(4) An alkyl ester group represented by $-(CH_2)_m COOR^{12}$ (wherein $R^{12}$ is an alkyl group, and m is equal to or more than 2).

In the case where either one of the $R^1$ and $R^2$ is a bulky group, the other may be a hydrogen atom or an alkyl group such as methyl.

Next, in Formulas [A] and [B], the $R^3$ through $R^{10}$ each is preferably hydrogen, a halogen such as Cl, Br, F, a saturated carbocyclic group such as cyclohexyl, or the like.

Also, in the polycarbonate of Formula [B], the Z may be ones to form 5- or 6-member carbocyclic or heterocyclic ring, the ring including cyclohexyl ring, cyclopentyl ring, etc. And into part of the ring may be introduced a substituent such as an acetyl group, an acetylamino group, or the like.

The following are examples of the polycarbonate applicable to the present invention.

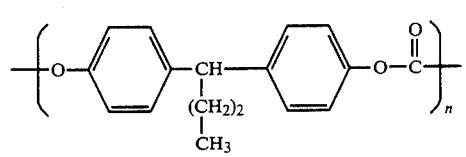

(A-1)

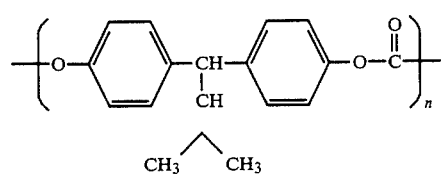

(A-2)

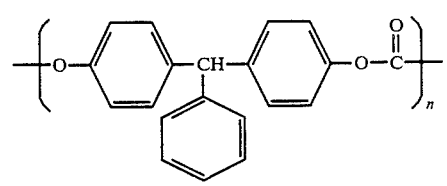

(A-3)

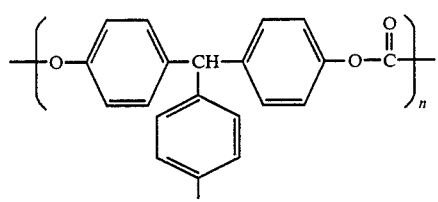 (A-4)
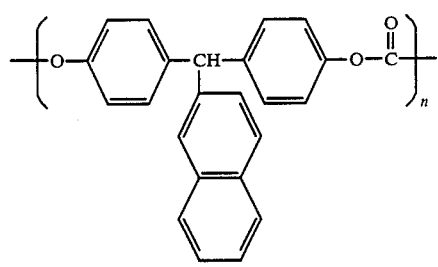 (A-5)
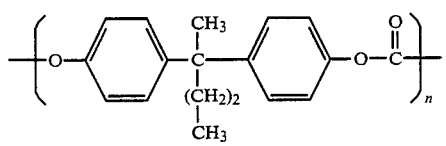 (A-6)
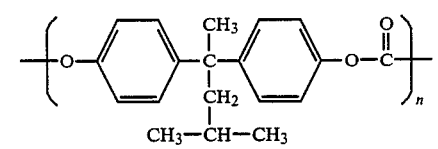 (A-7)
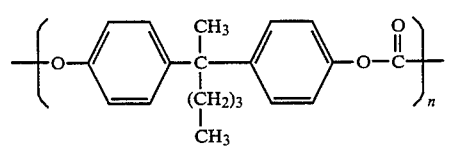 (A-8)
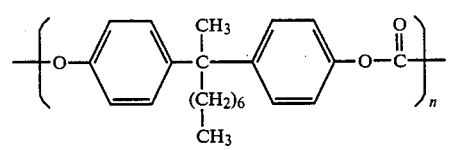 (A-9)
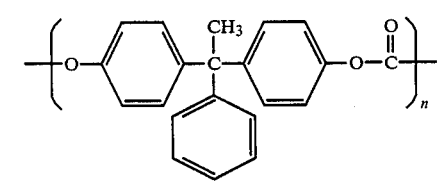 (A-10)
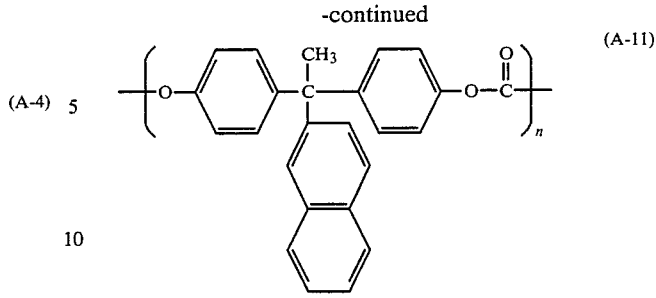 (A-11)
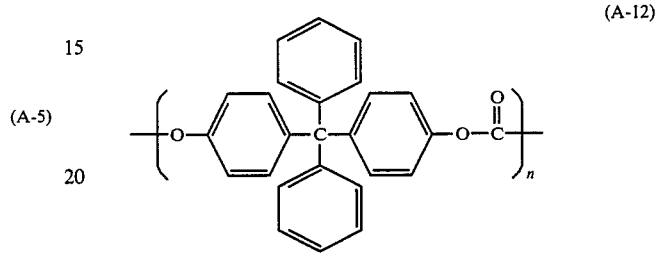 (A-12)
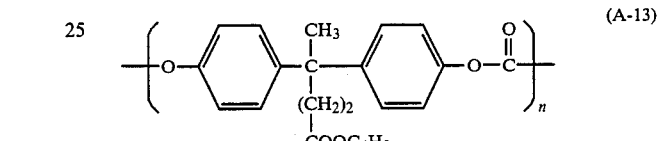 (A-13)
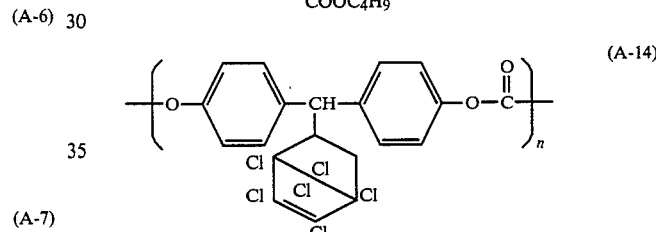 (A-14)
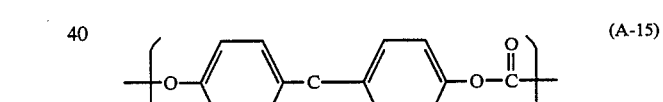 (A-15)
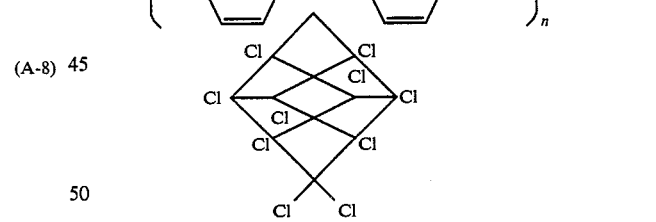 (B-1)
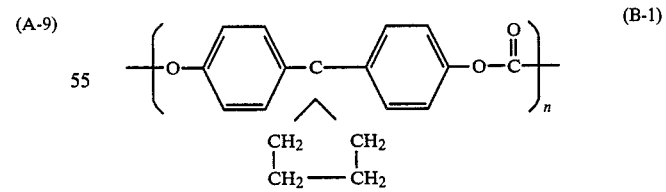 (B-1)
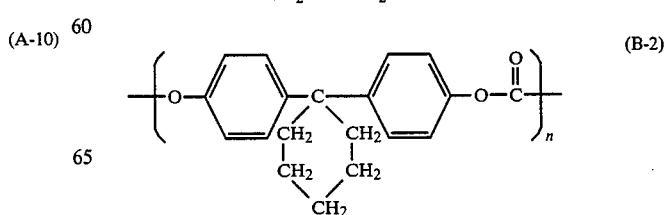 (B-2)

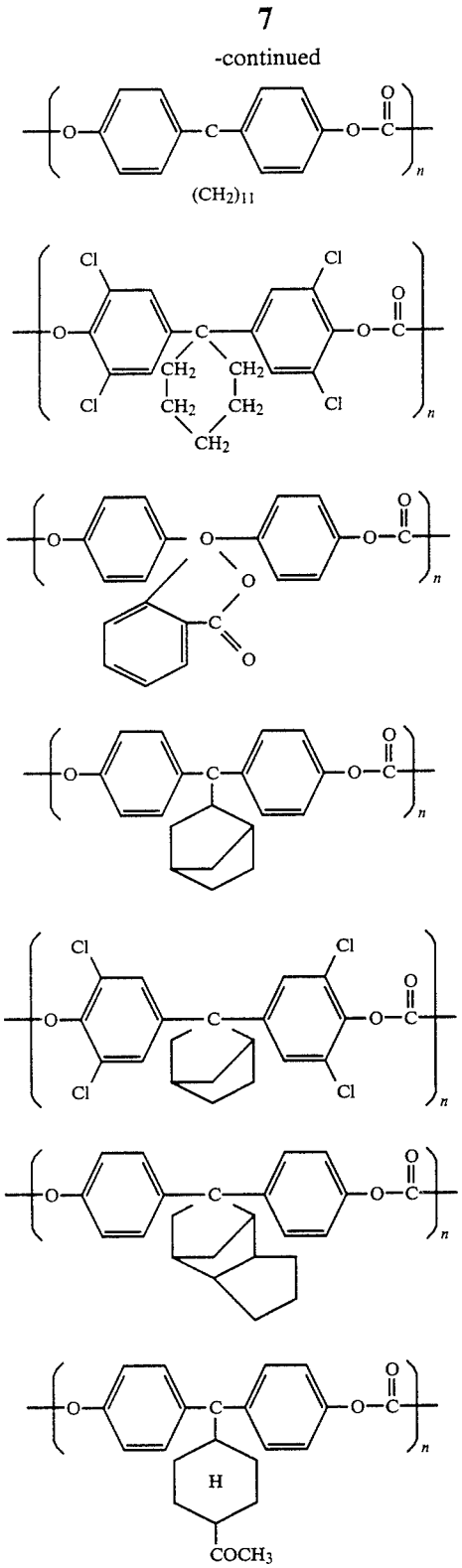

tron transport layer and electron generating layer of the function-separation-type photoreceptor.

Materials usable as the electron transport material (CTM) of the electron transport layer (CTL) include those carbazole derivatives having the following Formula [I] and those hydrazone compounds having the following Formula [II].

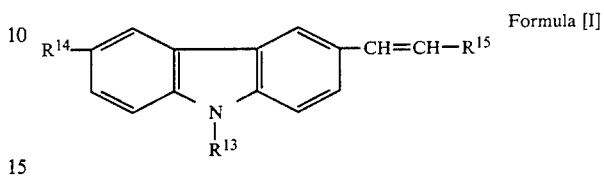

wherein $R^{13}$ is a substituted or unsubstituted aryl group; $R^{14}$ is hydrogen, a halogen, a substituted or unsubstituted alkyl group, an alkoxy group, an amino group, a hydroxyl group, or a substituted amino group; and $R^{15}$ is a substituted or unsubstituted aryl group or a substituted or unsubstituted heterocyclic group.

Formula [II]

$R^{16}$— [carbazole] —$R^{17}$

N=CH—Ar$^1$—N($R^{18}$)($R^{19}$)

wherein $R^{16}$ and $R^{17}$ each is hydrogen or a halogen; $R^{18}$ and $R^{19}$ each is a substituted or unsubstituted aryl group; and Ar$^1$ is a substituted or unsubstituted arylene group.

Examples of those carbazole derivatives having Formula [I] include, for example, the compounds having the following structural formulas, but are not limited thereto.

(I-1) [carbazole with N-phenyl, CH=CH-phenyl]

(I-2) [carbazole with N-phenyl, CH=CH-phenyl-C$_2$H$_5$]

(I-3) [carbazole with N-phenyl, CH=CH-phenyl-OCH$_3$]

(I-4) [carbazole with N-phenyl, CH=CH-phenyl-N(C$_2$H$_5$)$_2$]

The polycarbonate of the present invention is used as the principal component of the binder, and other binder components additionally usable include the previously mentioned ordinary polycarbonates, those polycarbonates free of the above $R^1$, $R^2$ and Z, polyesters, styrene-acryl-type resins, and the like.

These polycarbonates mentioned above may be used as the binder for the photosensitive layer (particularly for the electron transport layer of or for both the elec-

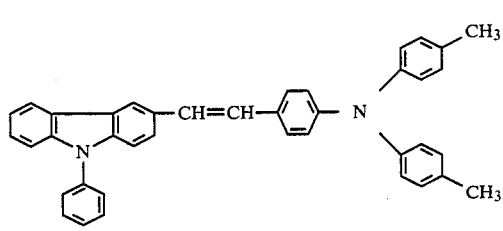 (I-5)
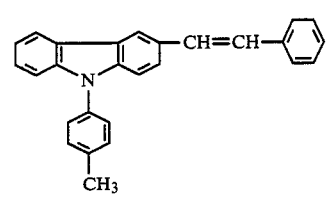 (I-6)
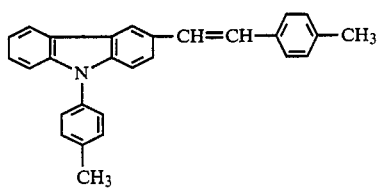 (I-7)
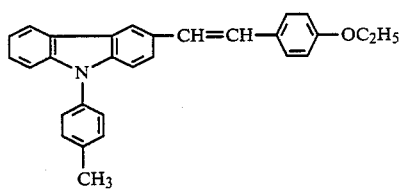 (I-8)
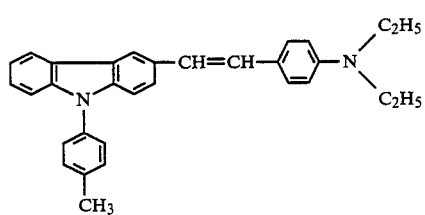 (I-9)
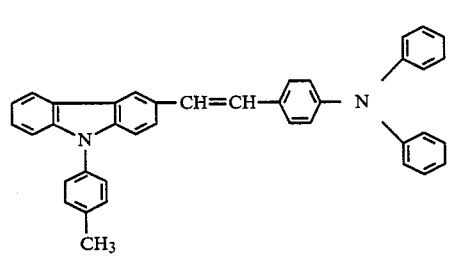 (I-10)
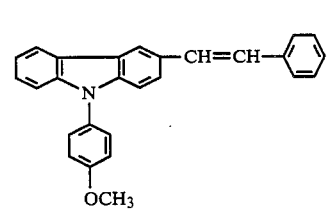 (I-11)
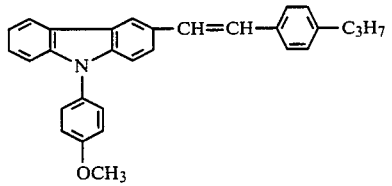 (I-12)
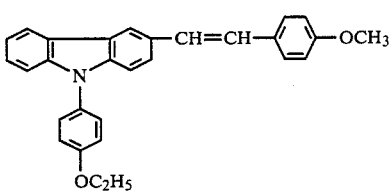 (I-13)
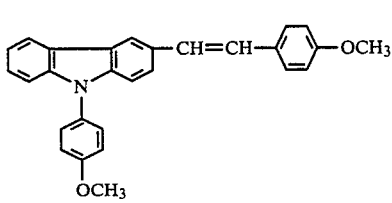 (I-14)
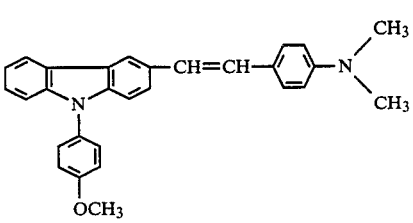 (I-15)
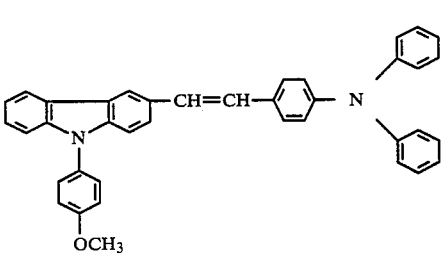 (I-16)
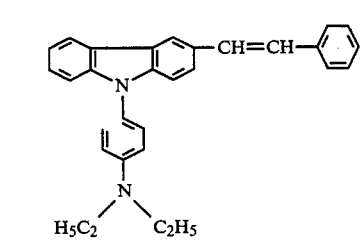 (I-17)
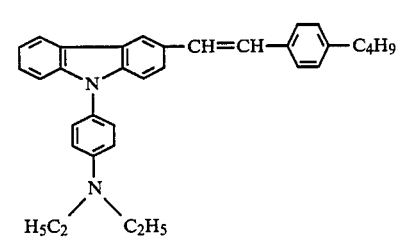 (I-18)

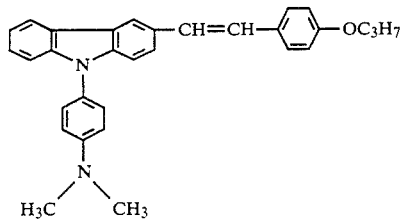 (I-19)
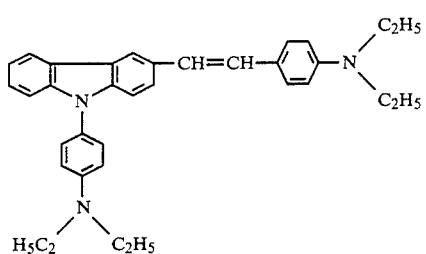 (I-20)
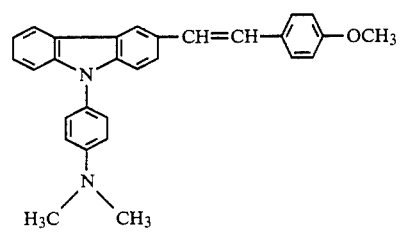 (I-21)
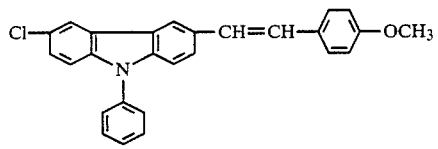 (I-22)
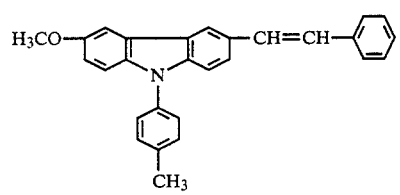 (I-23)
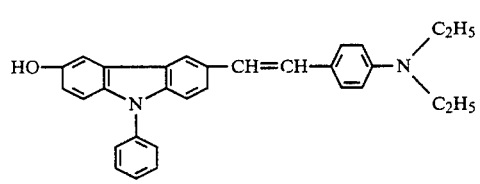 (I-24)
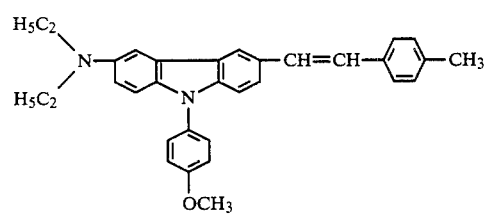 (I-25)
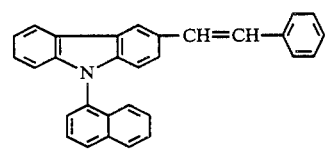 (I-26)
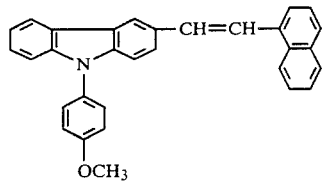 (I-27)
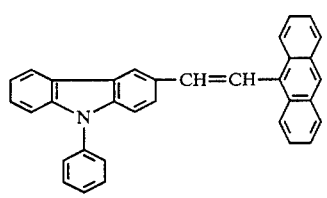 (I-28)
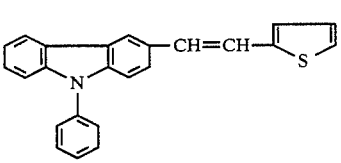 (I-29)
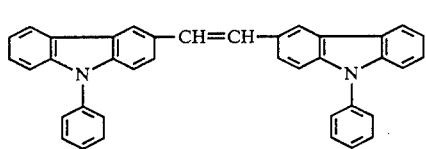 (I-30)
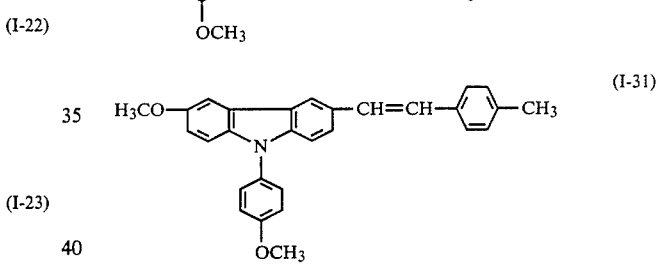 (I-31)
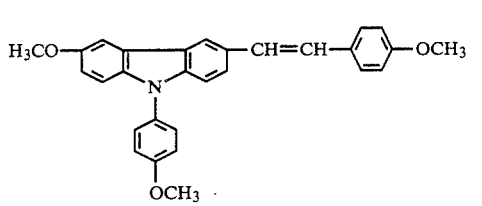 (I-32)
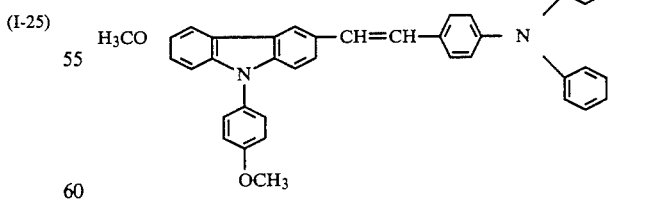 (I-33)
Examples of those hydrazone compounds having Formula [II] include, e.g., the compounds having the following structural formulas, but are not limited thereto.

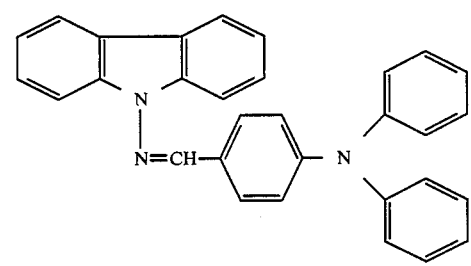 (II-1)
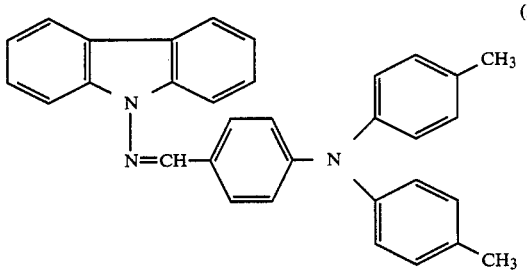 (II-2)
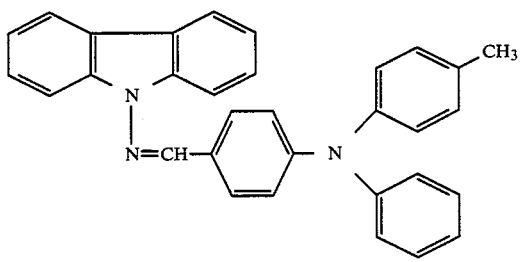 (II-3)
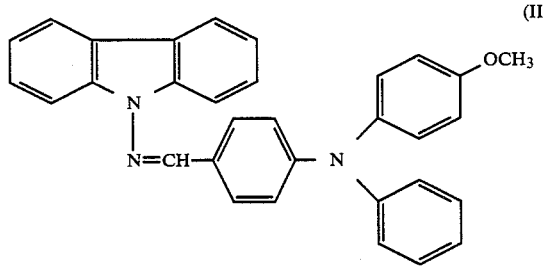 (II-4)
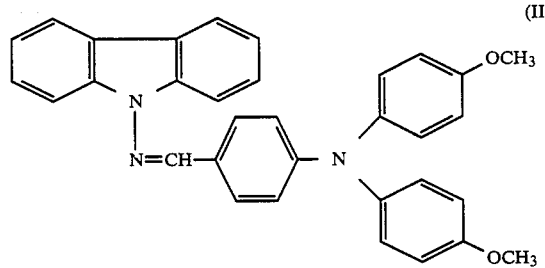 (II-5)
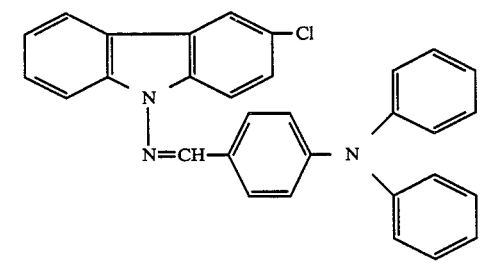 (II-6)
-continued
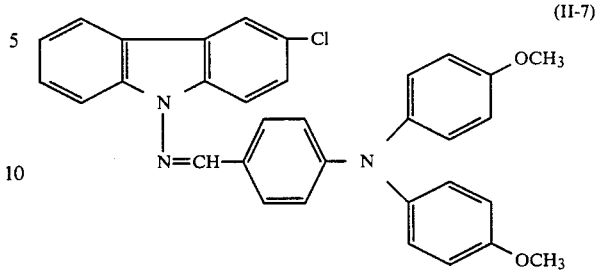 (II-7)
(II-8)
(II-9)
(II-10)
(II-11)

-continued

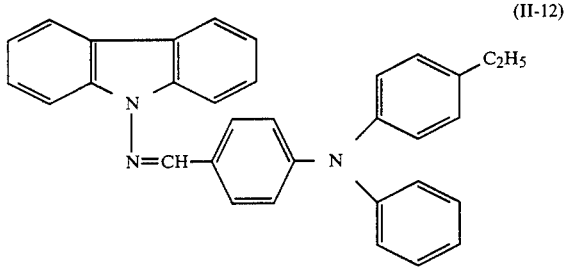
(II-12)

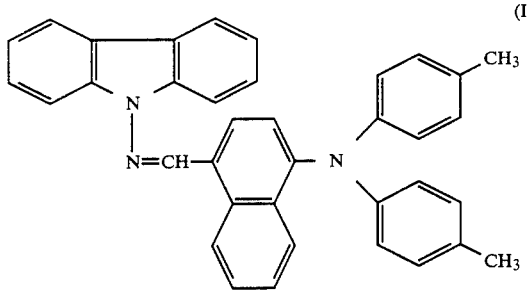
(II-13)

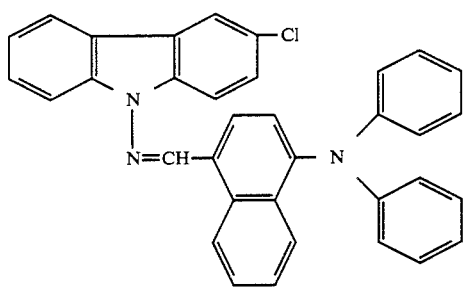
(II-14)

Different other CTMs usable include those compounds having the following formulas [III], [IV], [V], [VI] and [VII].

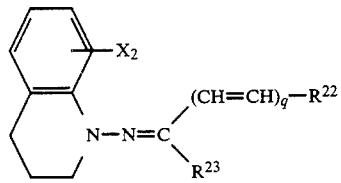
Formula [III]

wherein $R^{20}$ is a substituted or unsubstituted aryl group or a substituted or unsubstituted heterocyclic group; $R^{21}$ is hydrogen, a substituted or unsubstituted alkyl group or a substituted or unsubstituted aryl group; Q is hydrogen, a halogen, an alkyl group, a substituted amino group, an alkoxy group or a cyano group; and p is an integer of zero or 1.

Formula [IV]

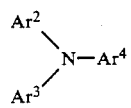

wherein $R^{22}$ is a substituted or unsubstituted aryl group or a substituted or unsubstituted heterocyclic group;

$R^{23}$ is hydrogen, a substituted or unsubstituted alkyl group or a substituted or unsubstituted aryl group; X is hydrogen, a halogen, an alkyl group, a substituted amino group, an alkoxy group or a cyano group; and q is an integer of zero or 1.

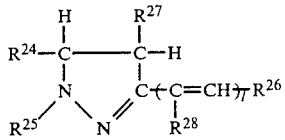
Formula [V]

wherein l is an integer of zero or 1; $R^{24}$, $R^{25}$ and $R^{26}$ each is a substituted or unsubstituted aryl group; $R^{27}$ and $R^{28}$ each is hydrogen, an alkyl group having from 1 to 4 carbon atoms or a substituted or unsubstituted aryl or aralkyl group (provided both $R^{27}$ and $R^{28}$ are not allowed to be hydrogen together; when l is zero, the $R^{27}$ is not hydrogen).

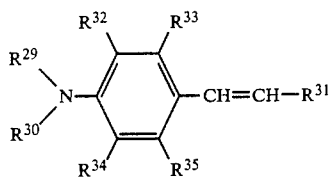
Formula [VI]

wherein $R^{29}$ and $R^{30}$ each is a substituted or unsubstituted alkyl or phenyl group, provided as the substituent an alkyl, alkoxy or phenyl group may be used; $R^{31}$ is a substituted or unsubstituted phenyl, naphthyl, anthryl, fluorenyl or heterocyclic group, provided as the substituent an alkyl or alkoxy group, a halogen, hydroxyl or phenyl group may be used; and $R^{32}$, $R^{33}$, $R^{34}$ and $R^{35}$ each is hydrogen, a halogen, an alkyl, alkoxy or alkylamino group.

$$\begin{array}{c} Ar^2 \\ \diagdown \\ N-Ar^4 \\ \diagup \\ Ar^3 \end{array}$$
Formula [VII]

wherein $Ar^2$ and $Ar^3$ each is a substituted or unsubstituted phenyl group, provided as the substituent a halogen, an alkyl, nitro, or alkoxy group may be used; $Ar^4$ is a substituted or unsubstituted phenyl, naphthyl, anthryl, fluorenyl or heterocyclic group, provided as the substituent an alkyl or alkoxy group, a halogen, a hydroxyl, aryloxy, aryl, amino, nitro, piperidino, morpholino, naphthyl, anthryl or substituted amino group, provided as the substituent of the substituted amino group an acyl, alkyl, aryl or aralkyl group may be used.

Examples of those hydrazone derivatives having Formula [III] include, e.g., the compounds having the following structural formulas, but are not limited thereto.

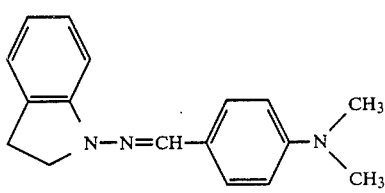
(III-1)

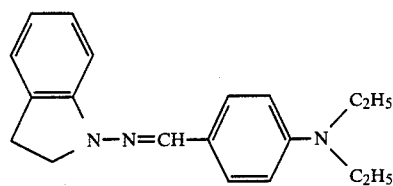 (III-2)
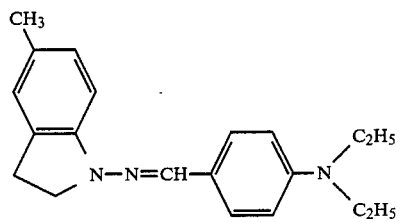 (III-3)
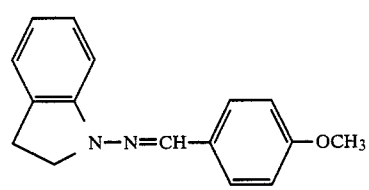 (III-4)
(III-5)
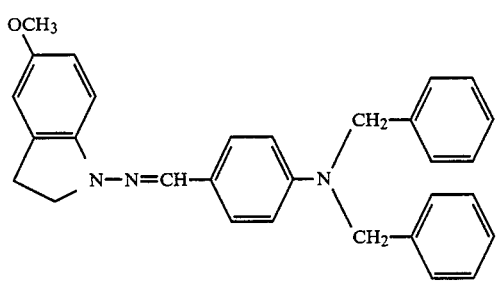 
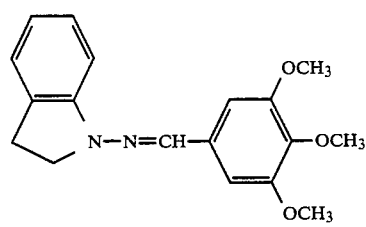 (III-7)
(III-8)
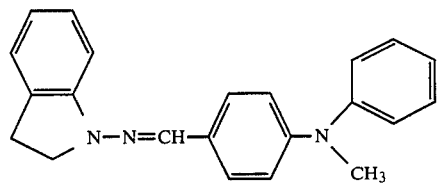 (III-9)
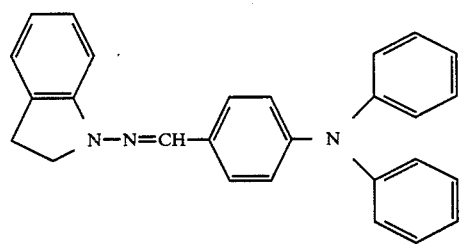 (III-10)
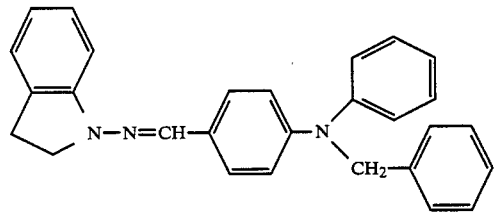 (III-11)
(III-12)
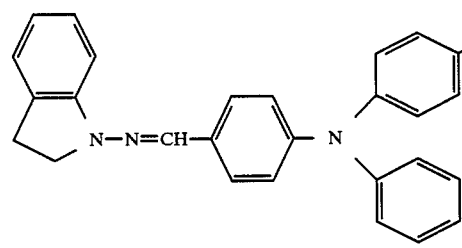 (III-13)
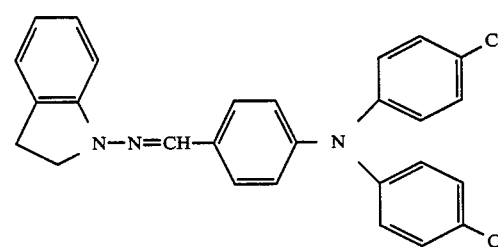 (III-14)

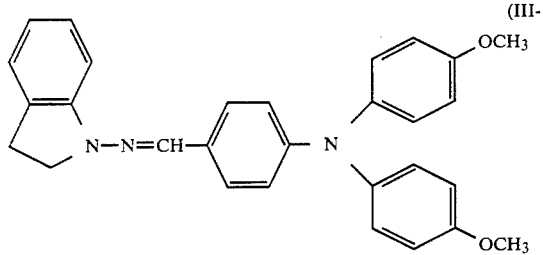 (III-15)
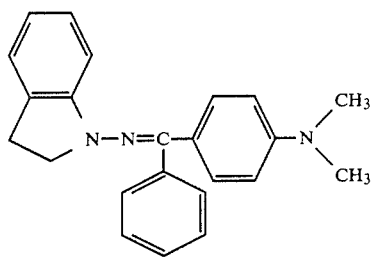 (III-21)
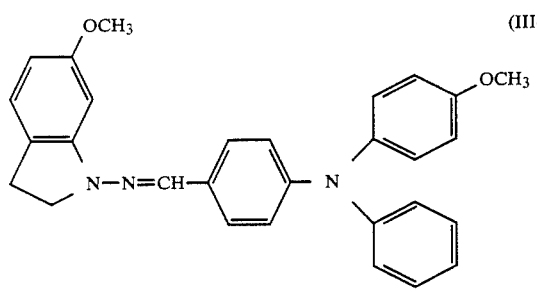 (III-16)
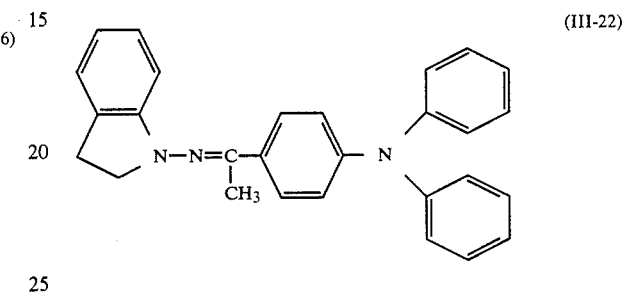 (III-22)
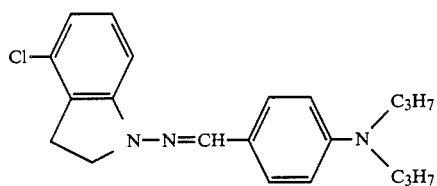 (III-17)
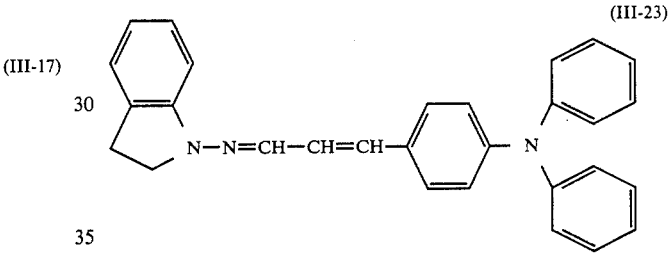 (III-23)
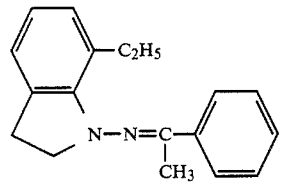 (III-18)
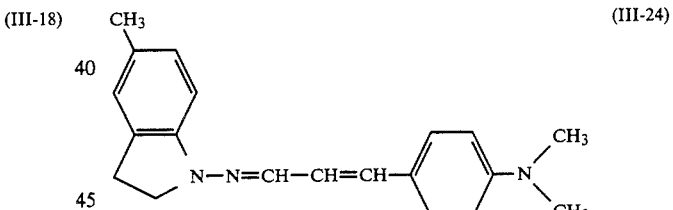 (III-24)
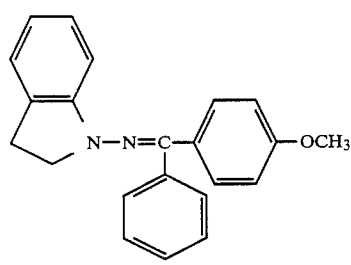 (III-19)
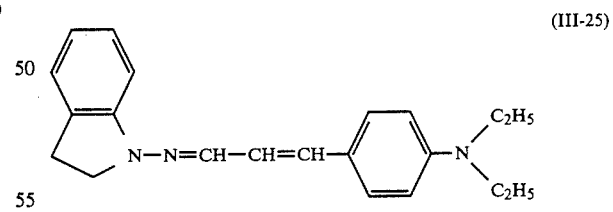 (III-25)
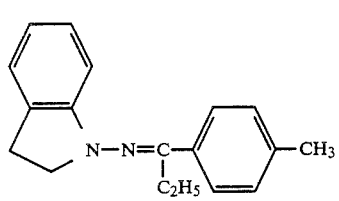 (III-20)
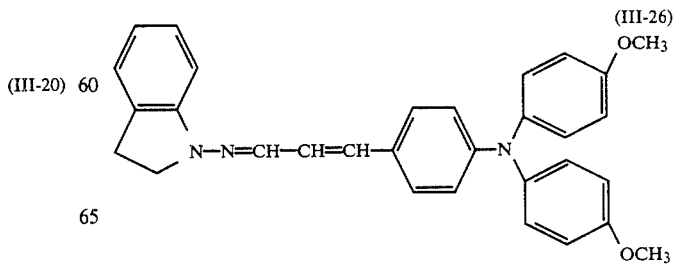 (III-26)

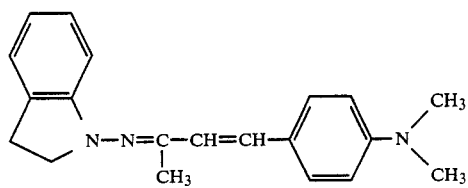 (III-27)
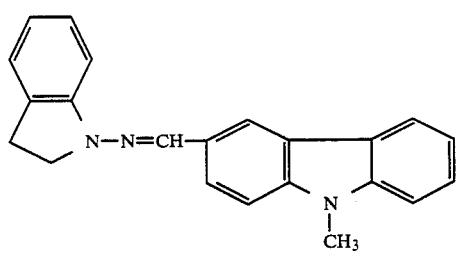 (III-28)
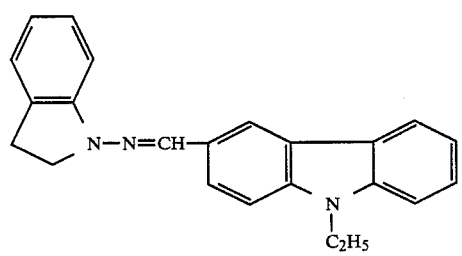 (III-29)
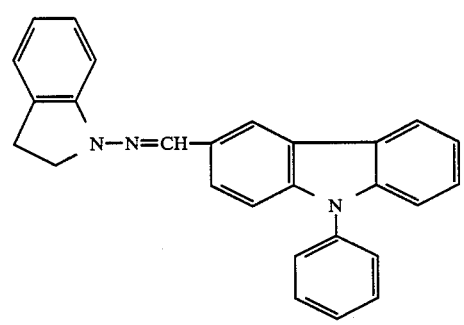 (III-30)
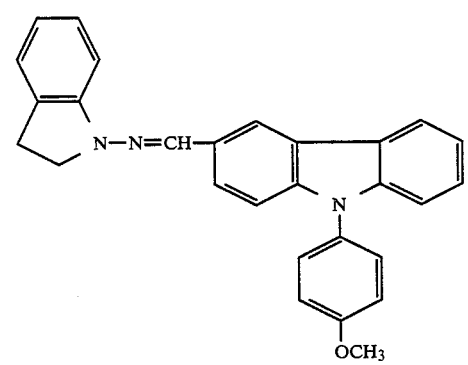 (III-31)
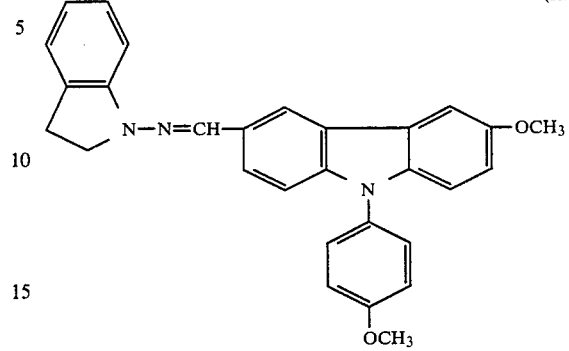 (III-32)
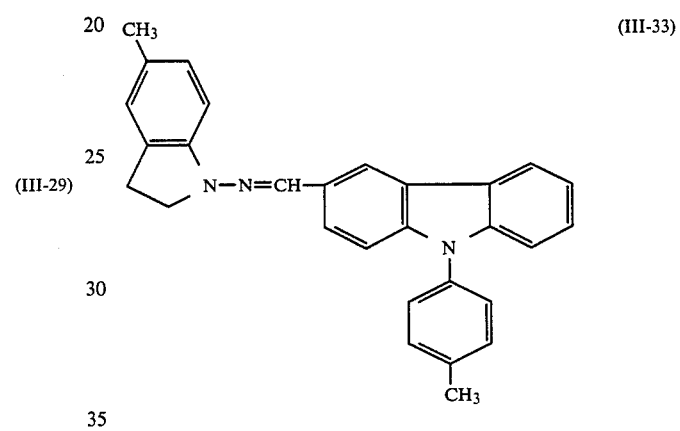 (III-33)
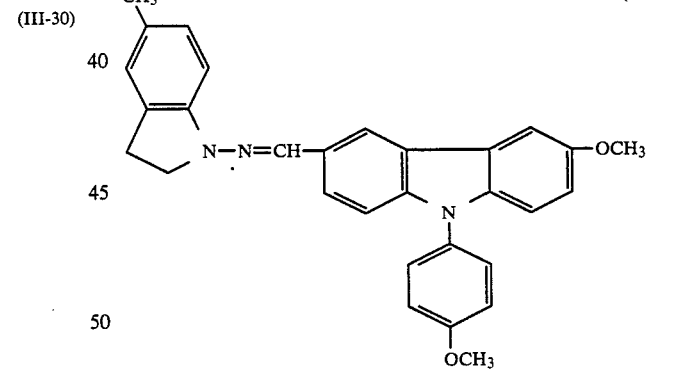 (III-34)
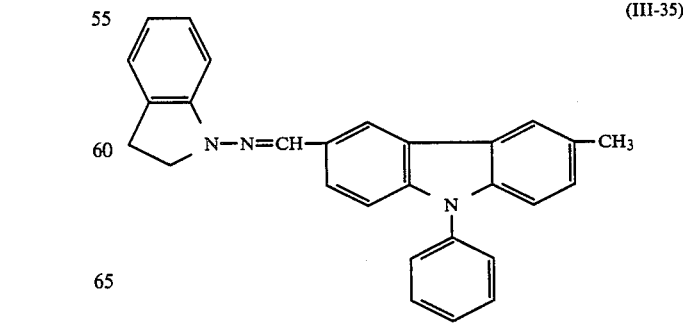 (III-35)

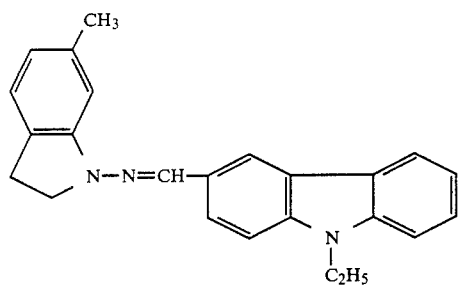 (III-36)
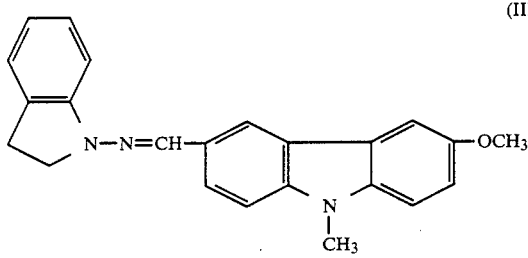 (III-37)
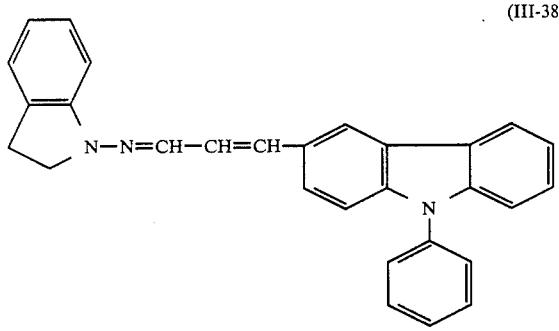 (III-38)
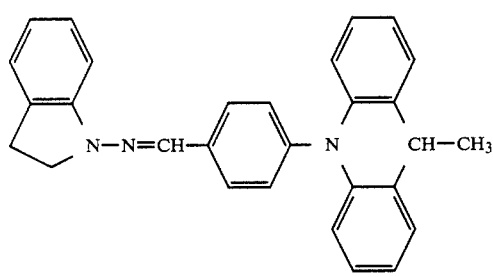 (III-39)
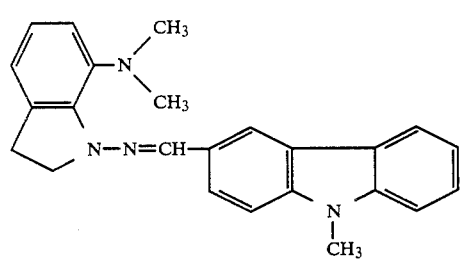 (III-40)
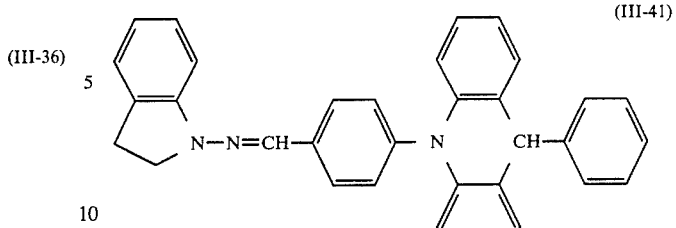 (III-41)
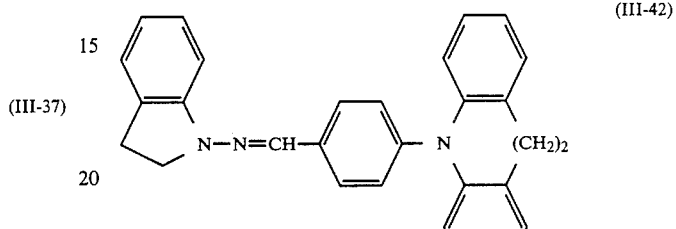 (III-42)
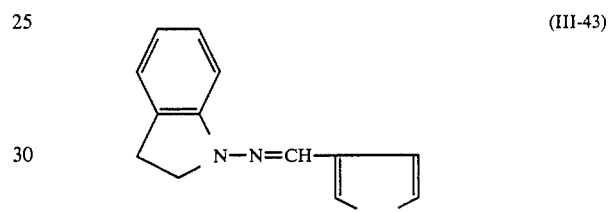 (III-43)
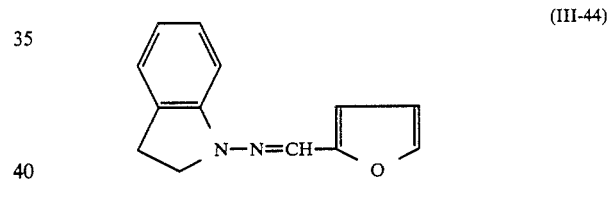 (III-44)
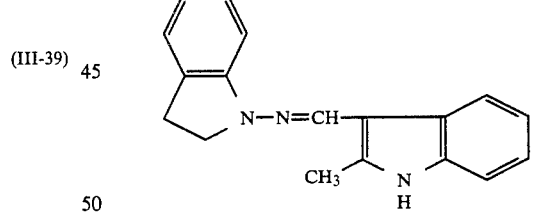 (III-45)
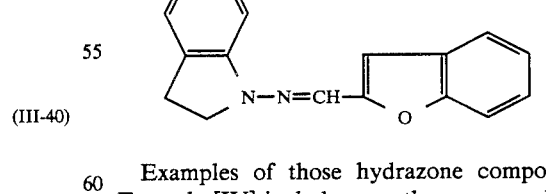 (III-46)
Examples of those hydrazone compounds having Formula [IV] include, e.g., the compounds having the following structural formulas, but are not limited thereto.

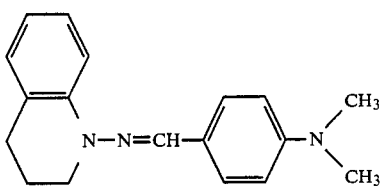 (IV-1)
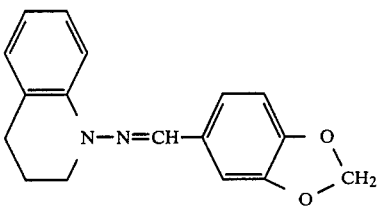 (IV-8)
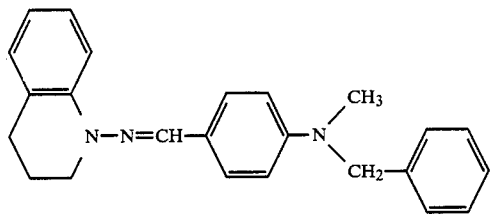 (IV-2)
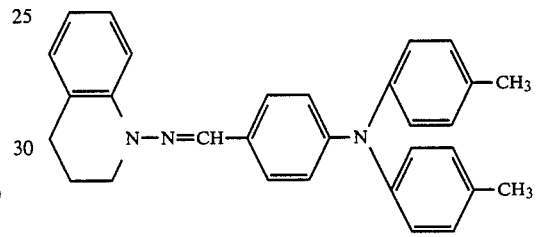 (IV-9)
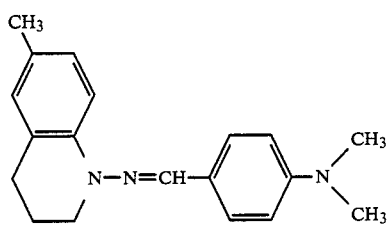 (IV-3)
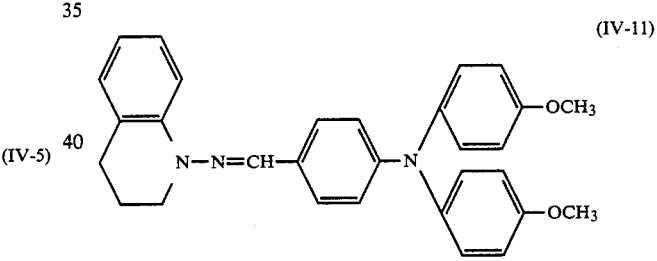 (IV-10)
(IV-4)
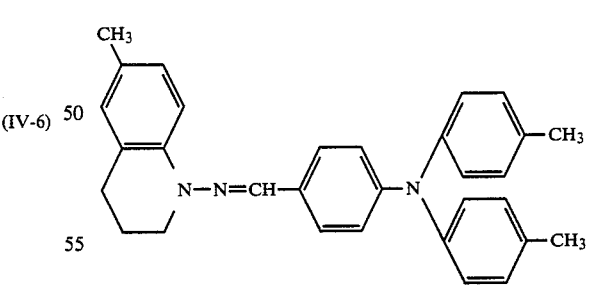 (IV-11)
(IV-5)
(IV-12)
(IV-6)
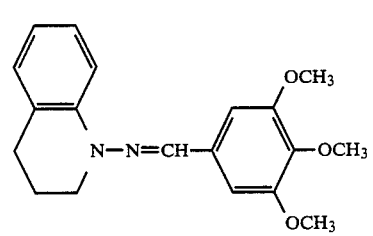 (IV-7)
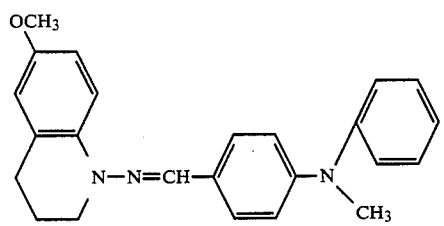 (IV-13)

-continued
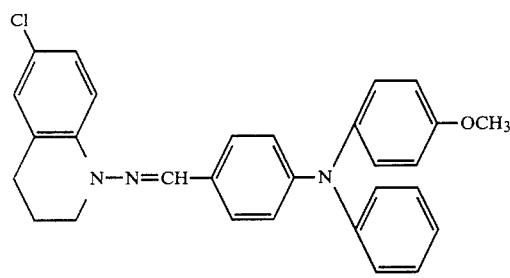 (IV-14)
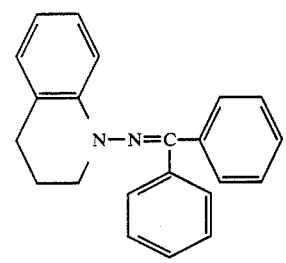 (IV-15)
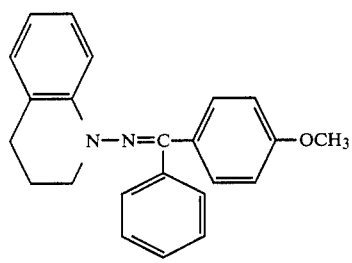 (IV-16)
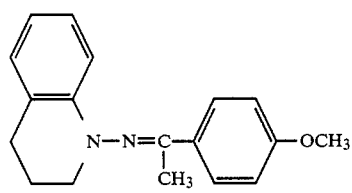 (IV-17)
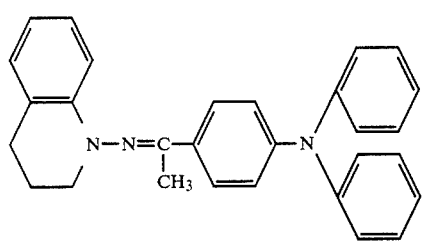 (IV-18)
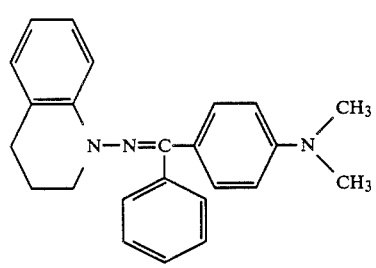 (IV-19)
-continued
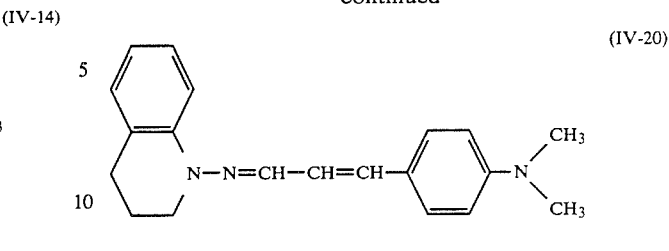 (IV-20)
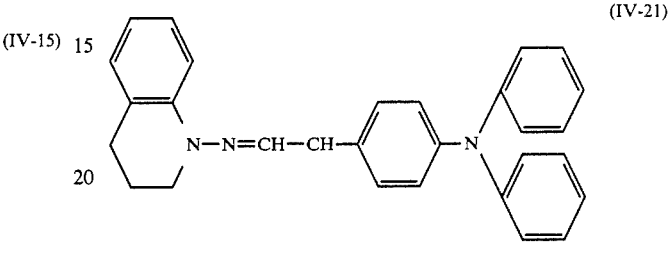 (IV-21)
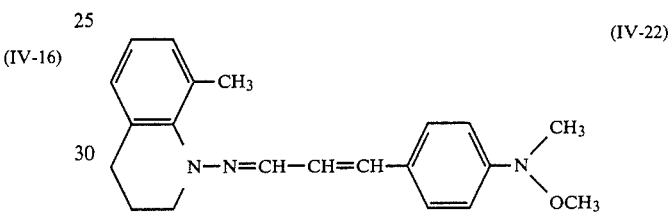 (IV-22)
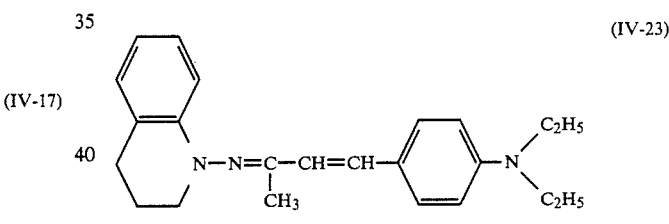 (IV-23)
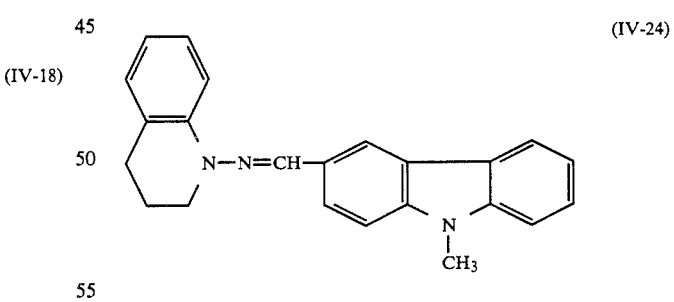 (IV-24)
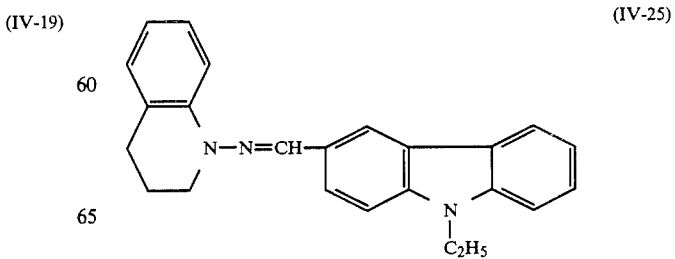 (IV-25)

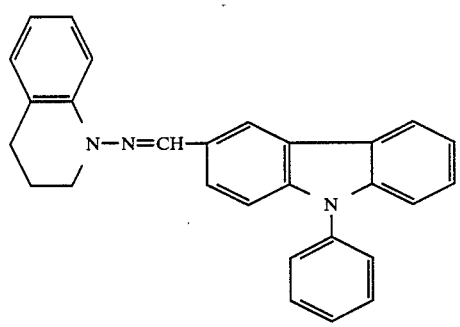
(IV-26)
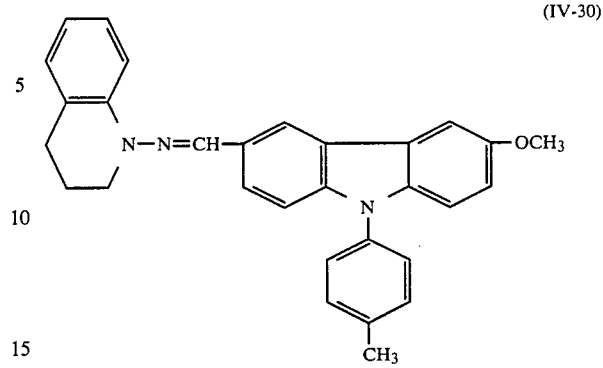
(IV-30)
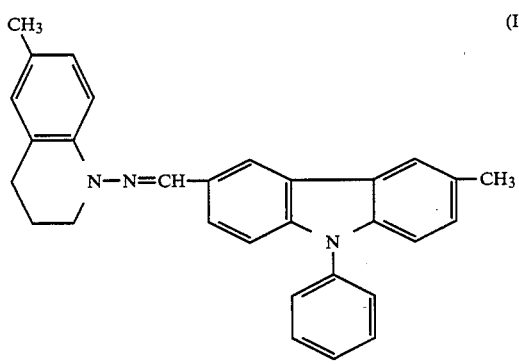
(IV-27)
(IV-31)
(IV-32)
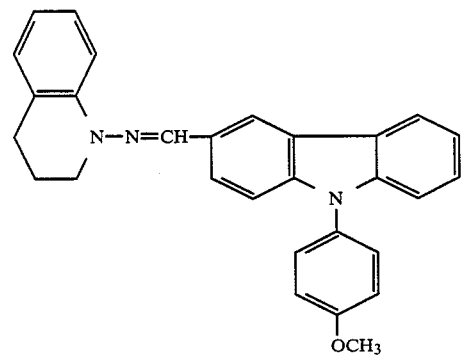
(IV-28)
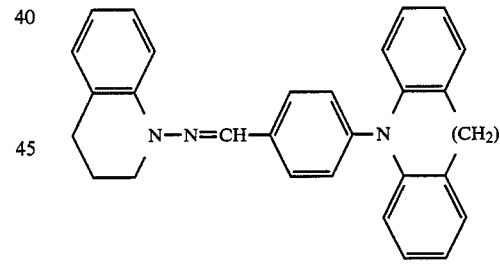
(IV-33)
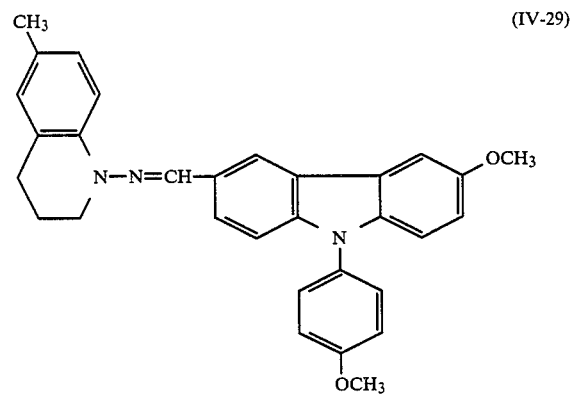
(IV-29)
(IV-34)
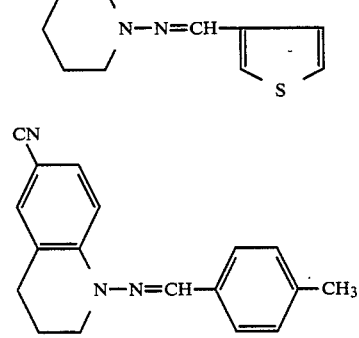
(IV-35)

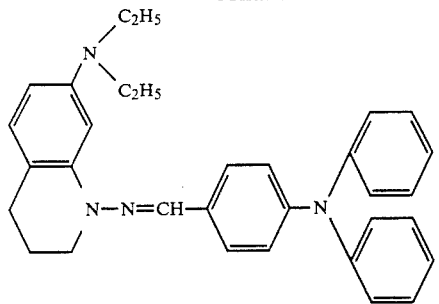
(IV-36)
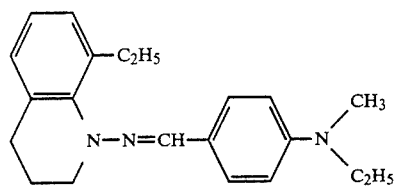
(IV-37)
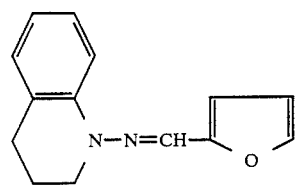
(IV-38)
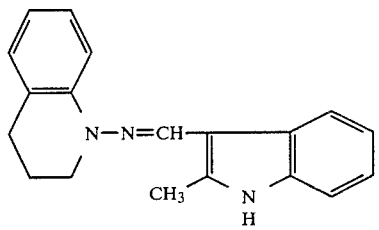
(IV-39)
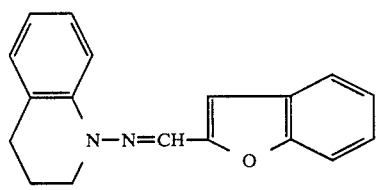
(IV-40)
Those pyrazoline compounds having Formula [V] include, e.g., the compounds having the following structural formulas.
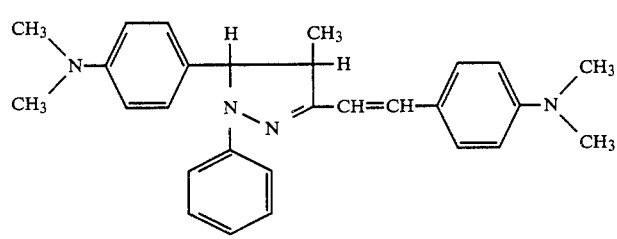
(V-1)
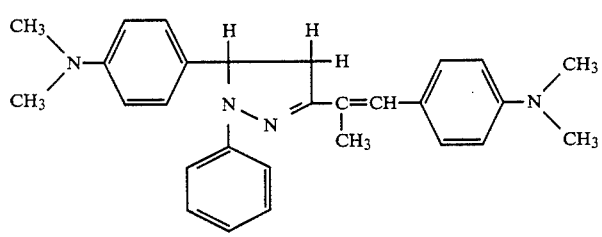
(V-2)
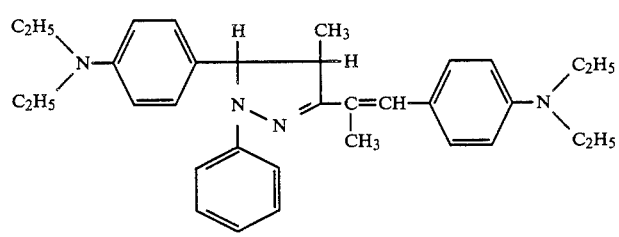
(V-3)

-continued
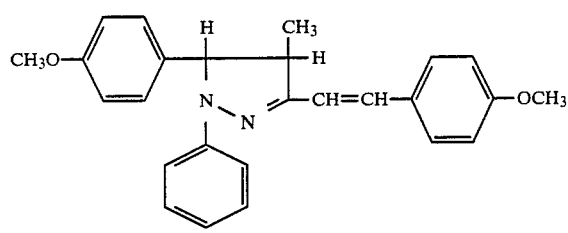
(V-4)
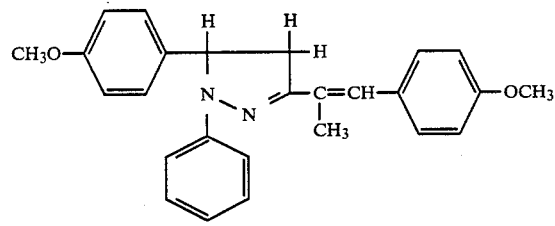
(V-5)
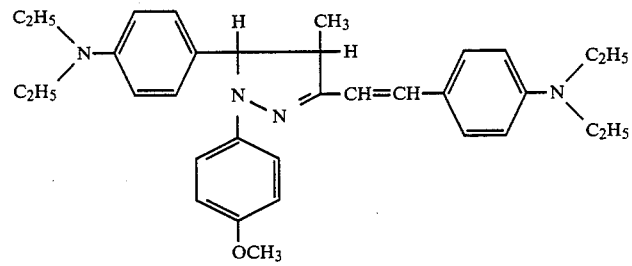
(V-6)
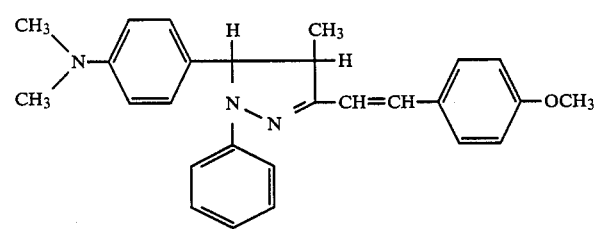
(V-7)
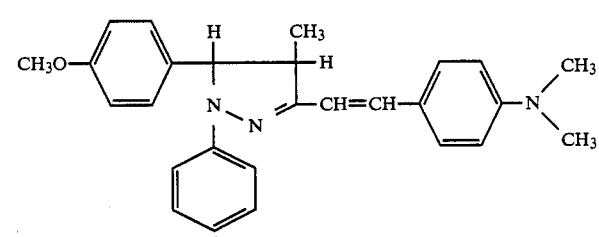
(V-8)
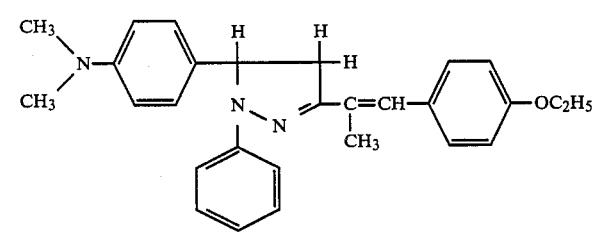
(V-9)

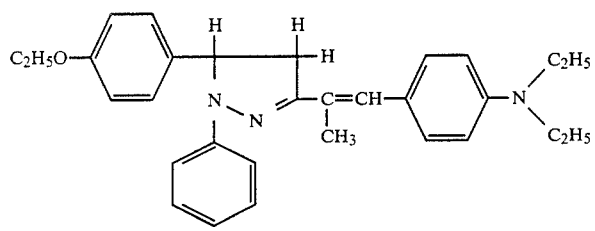
(V-10)
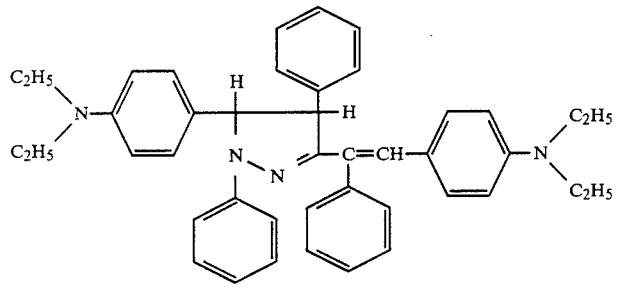
(V-11)
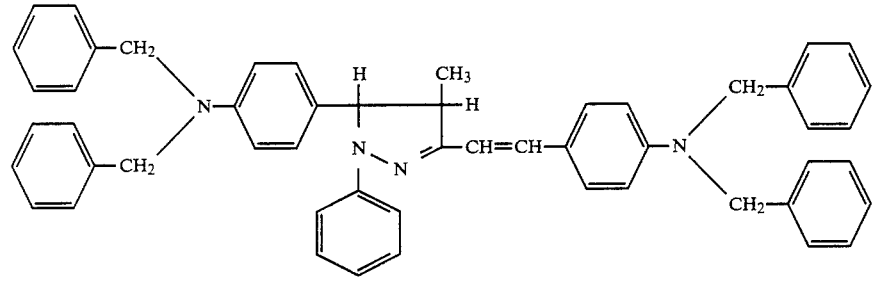
(V-12)
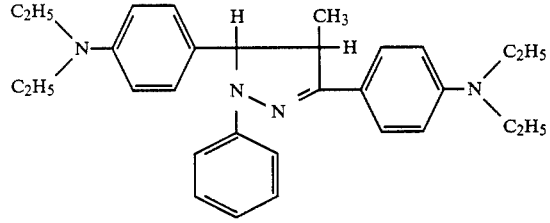
(V-13)
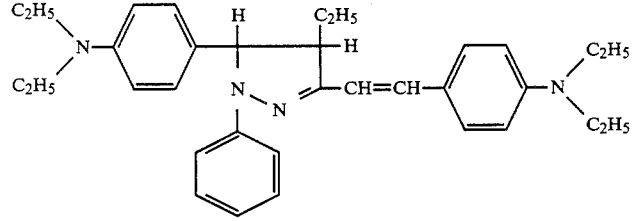
(V-14)
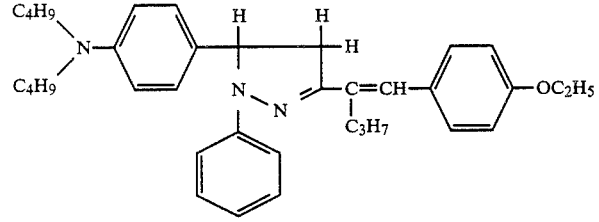
(V-15)

(V-16)

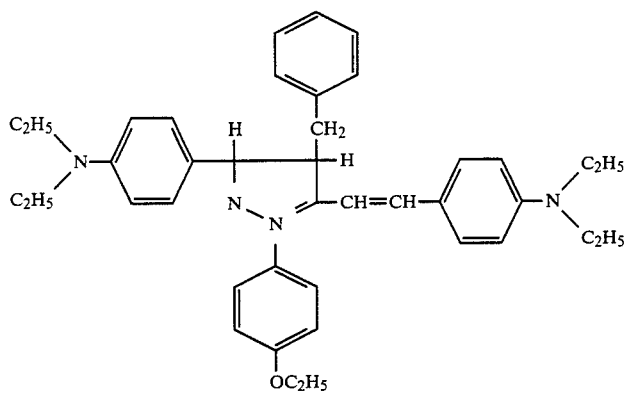

(V-17)

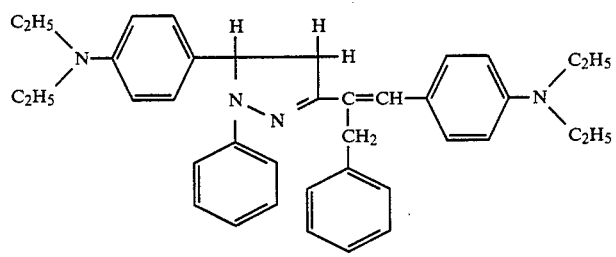

(V-18)

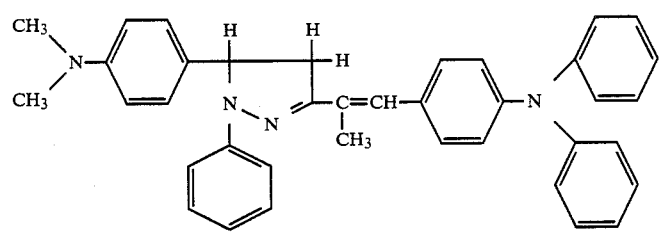

(V-19)

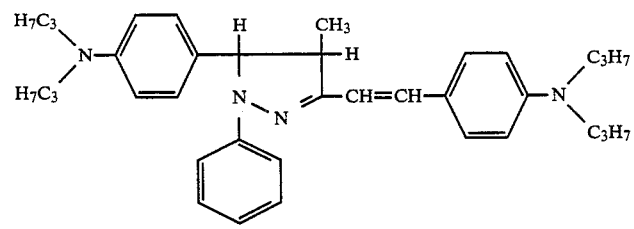

(V-20)

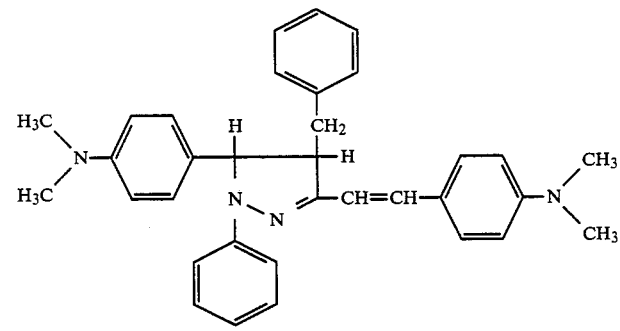

Any of the above-enumerated pyrazoline compounds usable in this invention may be synthesized by a known method; for example, by the dehydration-condensation reaction in the presence of an acid catalyst of α,β-unsaturated ketone with phenylhydrazine.

Examples of those styryl compounds having Formula [VI] include, e.g., the compounds having the following structural formulas, but are not limited thereto.

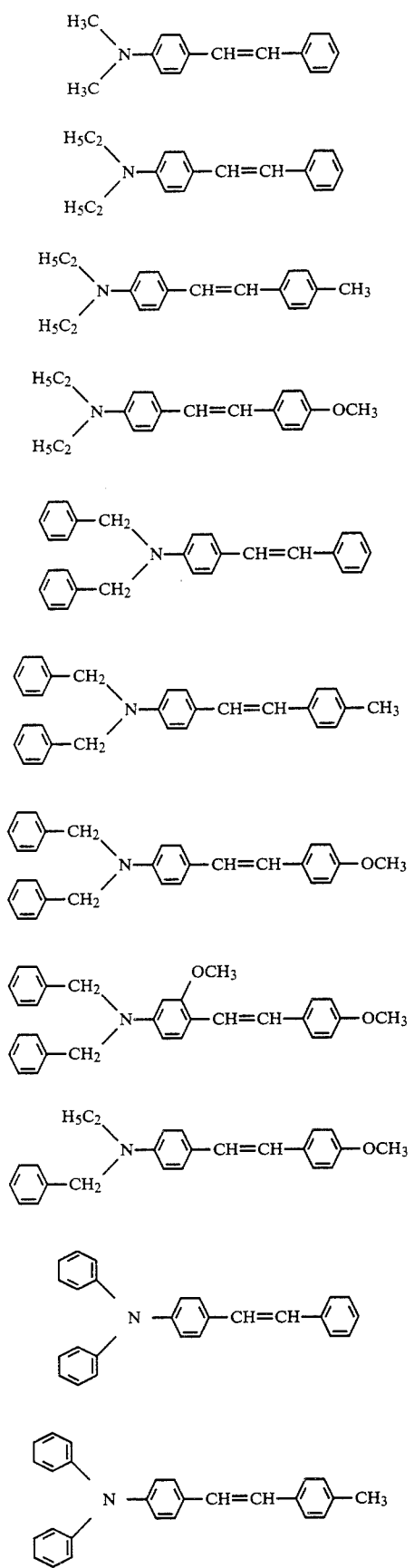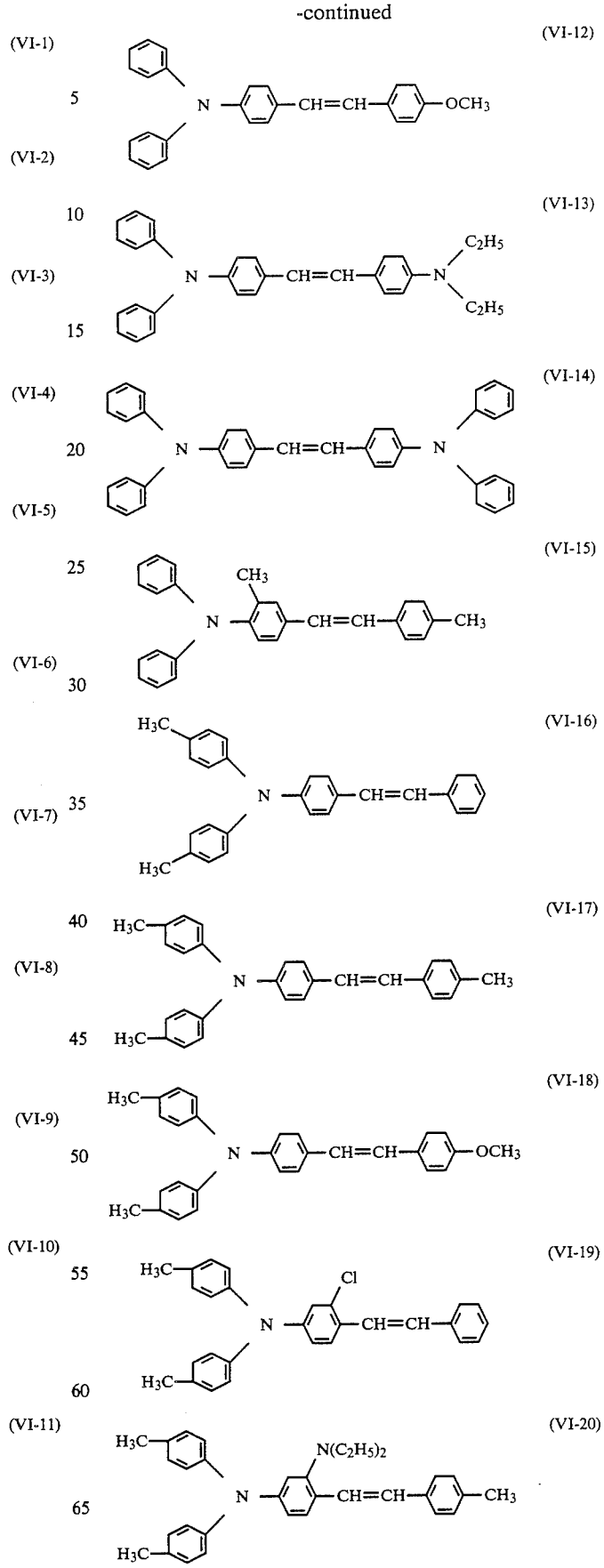

-continued
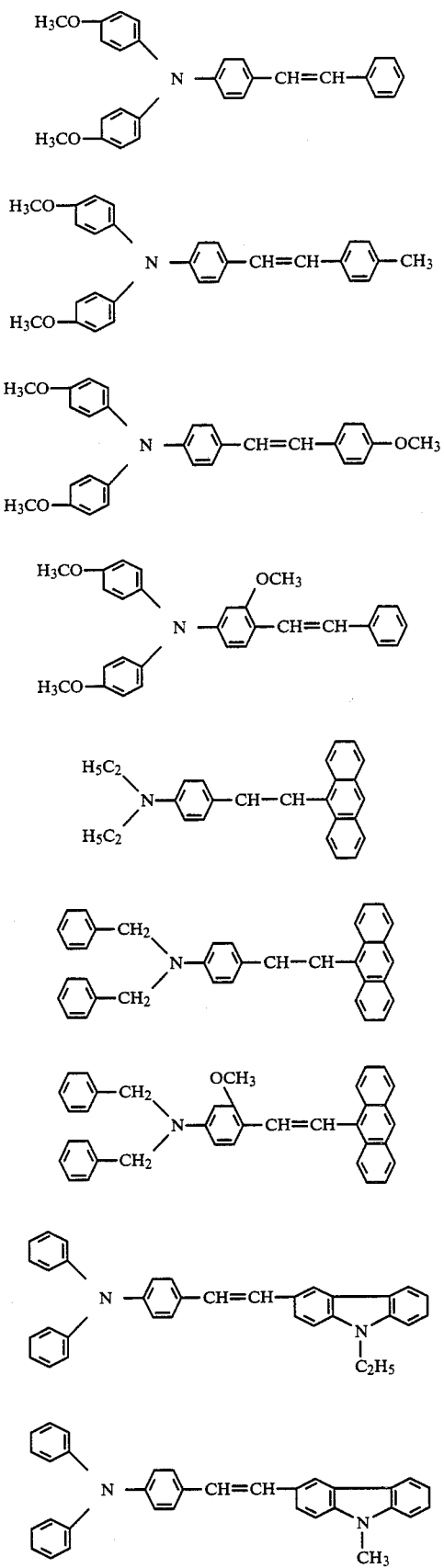
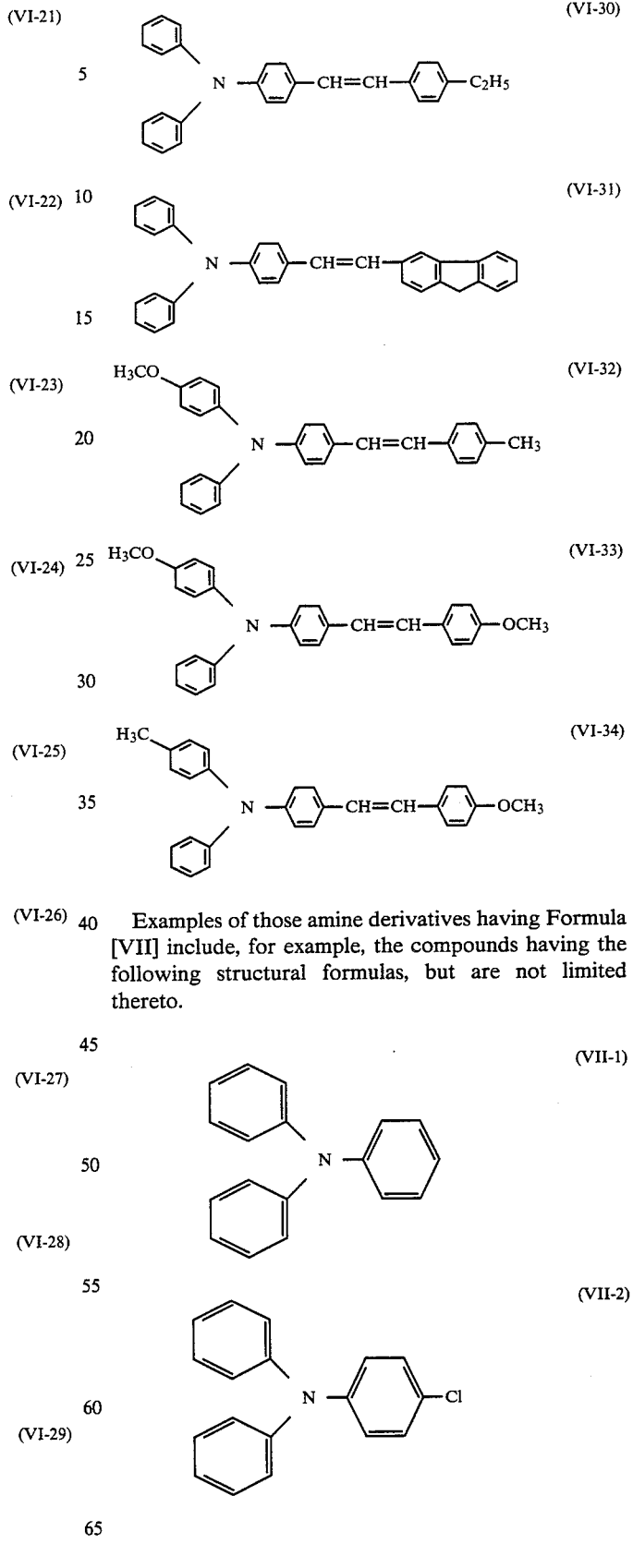
Examples of those amine derivatives having Formula [VII] include, for example, the compounds having the following structural formulas, but are not limited thereto.

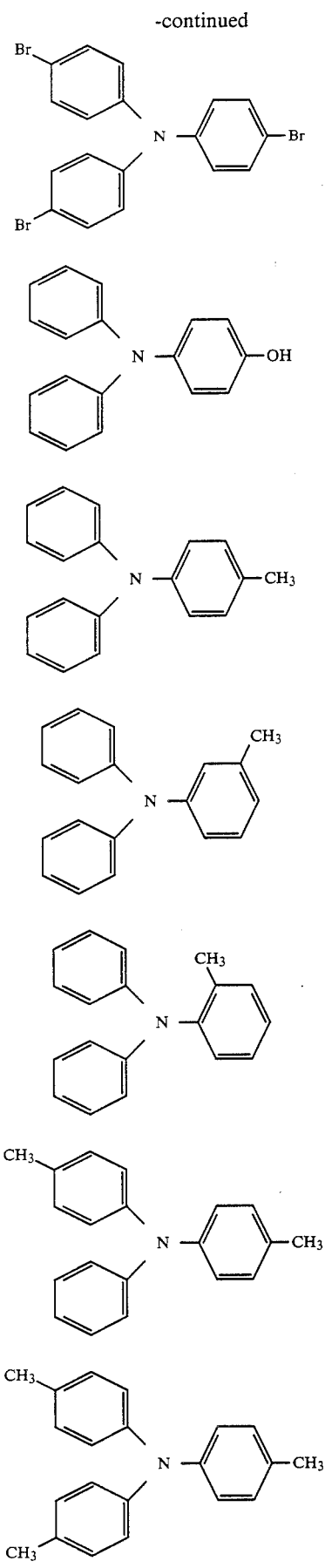
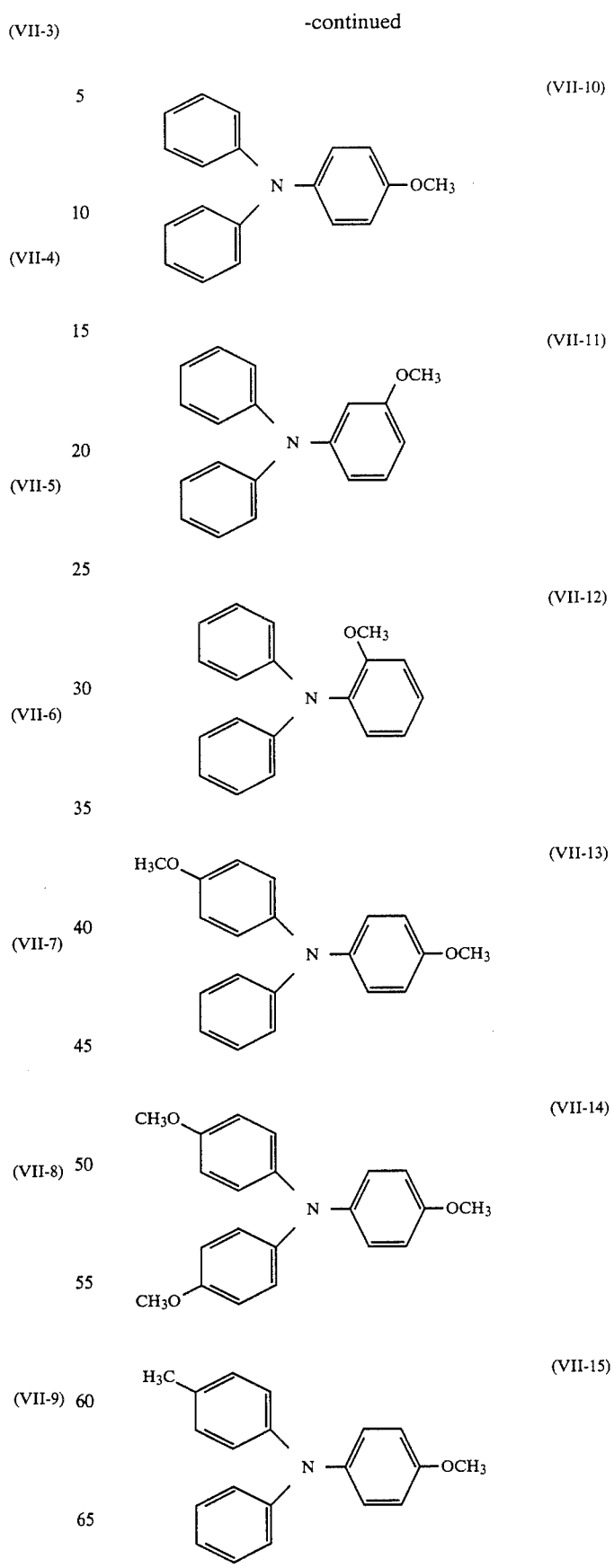

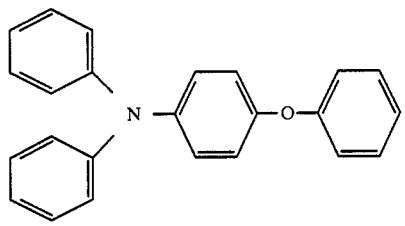 (VII-16)
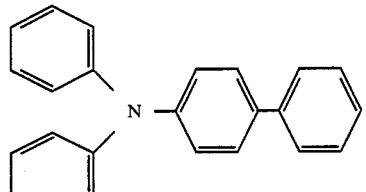 (VII-17)
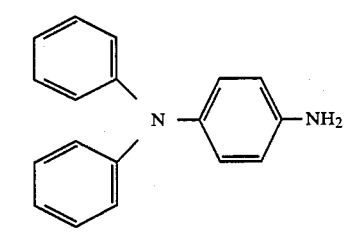 (VII-18)
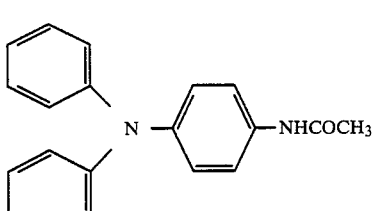 (VII-19)
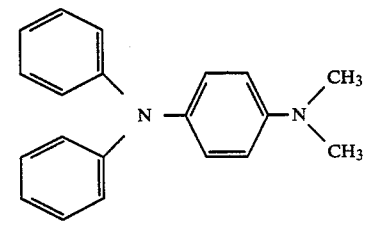 (VII-20)
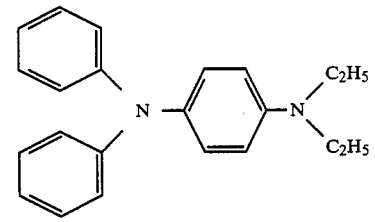 (VII-21)
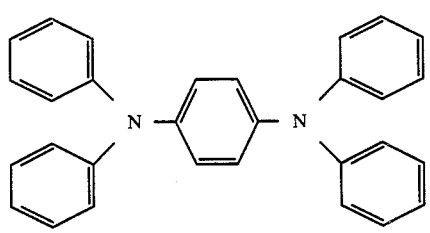 (VII-22)
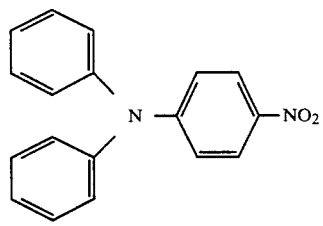 (VII-23)
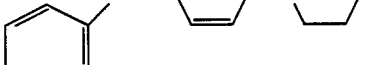 (VII-24)
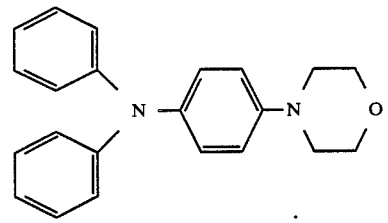 (VII-25)
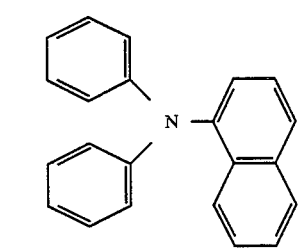 (VII-26)
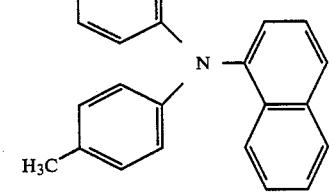 (VII-27)
(VII-28)

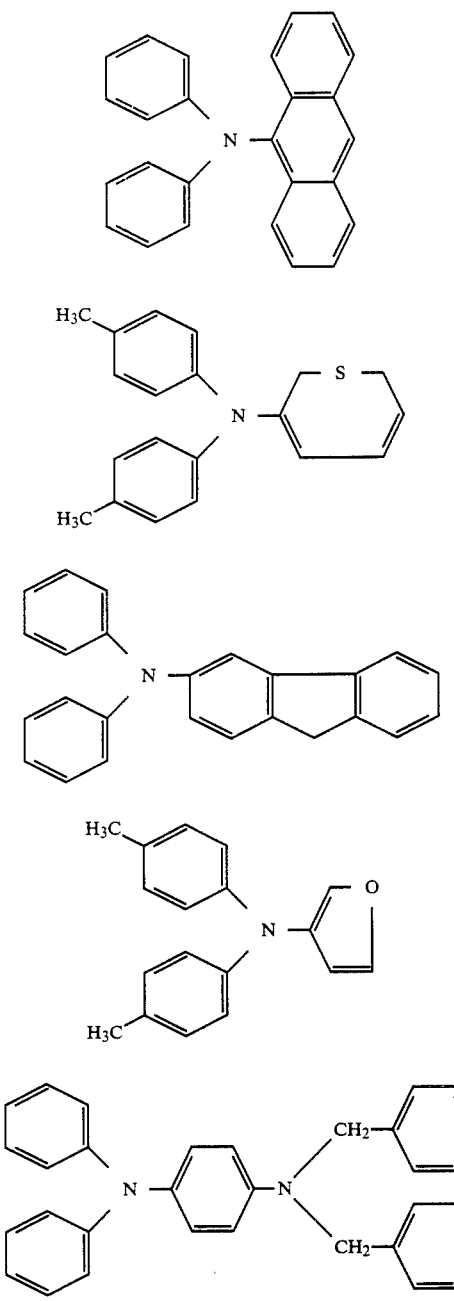

(VII-29)

(VII-30)

(VII-31)

(VII-32)

(VII-33)

Next, the electron generating material (CGM) of the electron generating layer (CGL) includes those polycyclic quinone pigments having Formulas [VIII], [IX] and [X].

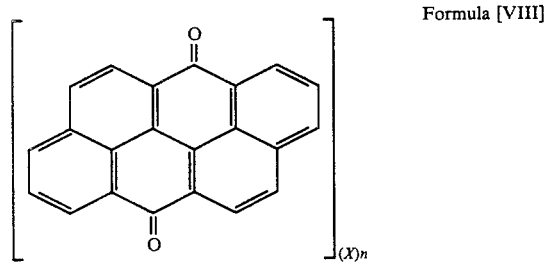

Formula [VIII]

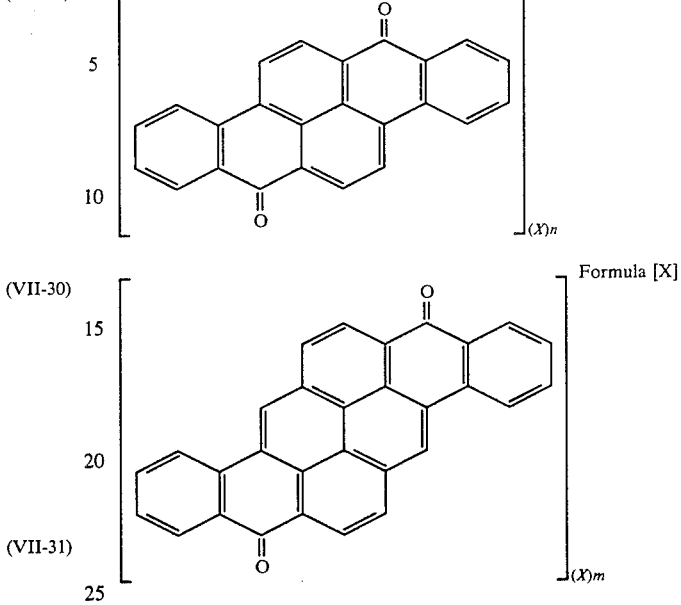

Formula [IX]

Formula [X]

In the above formulas, X is a halogen atom, a nitro, cyano, acyl or carboxyl group; n is an integer of from zero to 4; and m is an integer of from zero to 6.

The use of the above-mentioned polycyclic quinone pigment as photoconductive particles enables to obtain a high-speed, uniform-quality and hardly scratchable photosensitive layer, unlike in the case of those conventional inorganic-type particles or perylene-type pigments. Also, the use of a polycyclic quinone pigment refined by sublimation enables to obtain a photoreceptor of which the sensitivity is higher and in which the accumulated residual electric potential is smaller even when repeatedly used to make a large number of copies, resulting in the electric potential rise on the image area's surface being smaller, than that obtained by use of an unrefined organic pigment, and therefore enables to obtain a fog-free, clear copy image. The sublimated pigment, however, tends to cause a trouble because its particle size is large. The sublimated polycyclic quinone pigment is desirable to be incorporated with its mean particle size of not more than 2 $\mu$m into the photosensitive layer. That is, it has now been found that making the mean particle size of the above pigment (since the polycyclic pigment is in the needle crystal form, its longitudinal dimension is regarded herein as the mean particle size) so minute as to be not more than 2 $\mu$m enables to prevent the influence by the particle size upon the surface of the photoreceptor, to smooth the surface of the photoreceptor and also to stabilize the pigment dispersing agent. If the mean particle size of the polycyclic quinone pigment exceeds 2 $\mu$m, protrusions tend to appear on the surface, while if the size is not more than 2 $\mu$m, a smooth surface substantially free of protrusions can be obtained, and, further, the sedimentation of the particles in the dispersed liquid can be minimized to thereby stabilize the liquid. As a result, a satisfactory photoreceptor free from destruction by discharge as well as from toner filming can be obtained.

The mean particle size of the polycyclic pigment is preferably not more than 2 $\mu$m, more preferably not more than 1 $\mu$m, and most preferably not more than 0.5 $\mu$m, provided, however, if the mean particle size is extremely small, on the contrary, crystal defects increase to deteriorate the sensitivity and repeatability of the resulting photoreceptor. Also because there is a limit to making the particles minute, the lower limit of the mean particle size is desirable to be settled to 0.01 μm.

In order to obtain a polycyclic quinon pigment having such the mean particle size, it is desirable that the crystal particles, after being grown in sublimation, be thoroughly pulverized by means of a pulverizer, the pulverizer including, for example, the ball mill, hammer mill, sand grinder, centrifugal mill, colloid mill, jet mill, turbo mill, and the like.

The liquid for use in the formation of the photosensitive layer of this invention can be obtained by dispersing photoconductive particles of a mean particle size of not more than 2 μm consisting of the above polycyclic quinone pigment into an appropriate organic solvent (which is allowed to contain a binder resin). Before and/or after this dispersing process, a carrier transport material may, if necessary, be added to thereby improve the electron transport function of the photo-carrier generating layer itself. In addition, the suitably applicable means to the dispersion includes, e.g., the ball mill, homogenizer, sand grinder, colloid mill, supersonic wave, and the like.

The following are examples of those anthoanthrone-type pigment compounds having the foregoing Formula [VIII].

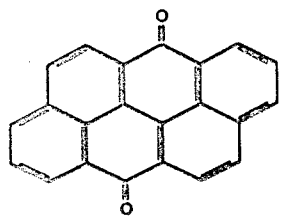
(VIII-1)

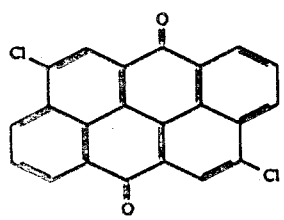
(VIII-2)

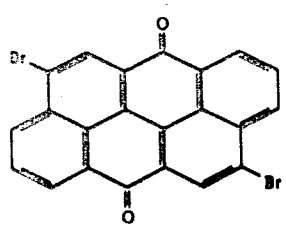
(VIII-3)

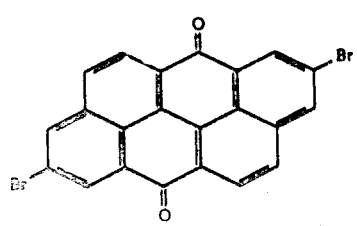
(VIII-4)

-continued

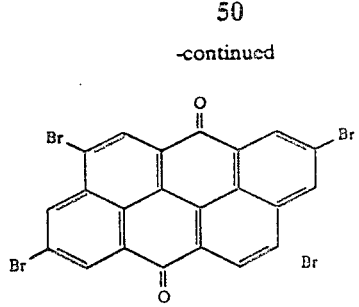
(VIII-5)

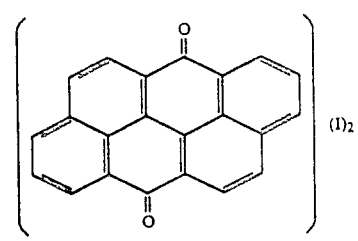
(VIII-6) $(I)_2$

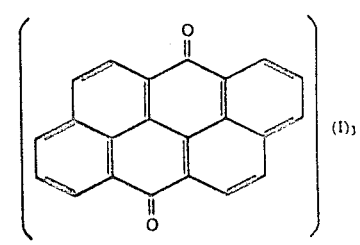
(VIII-7) $(I)_3$

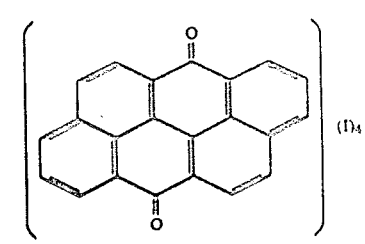
(VIII-8) $(I)_4$

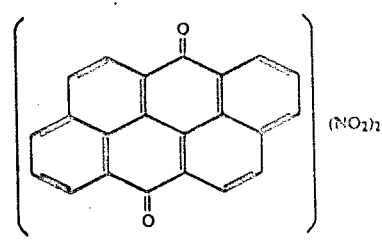
(VIII-9) $(NO_2)_2$

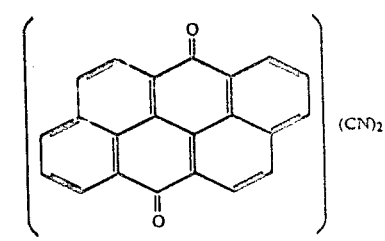
(VIII-10) $(CN)_2$

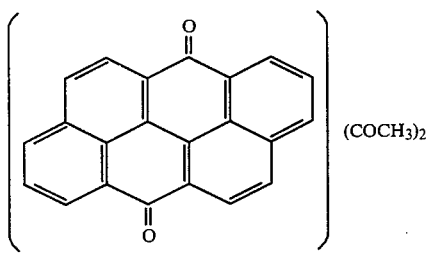
(VIII-11) (COCH₃)₂
The following are examples of those dibenzopyrenequinone-type pigment compounds having the foregoing Formula [IX].
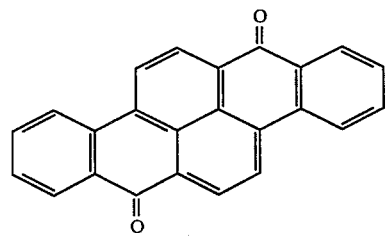
(IX-1)
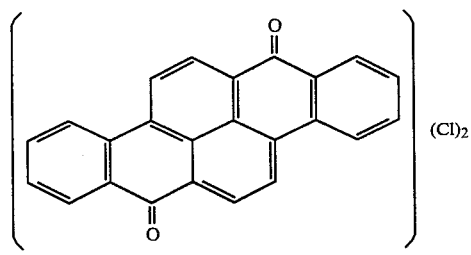
(IX-2) (Cl)₂
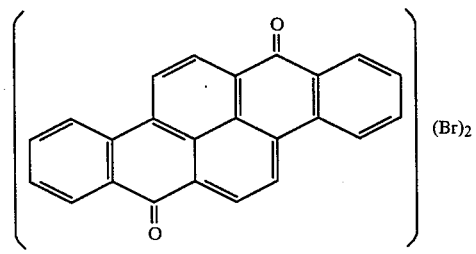
(IX-3) (Br)₂
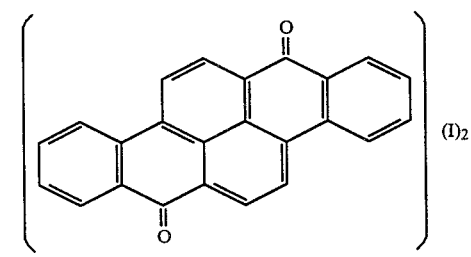
(IX-4) (I)₂
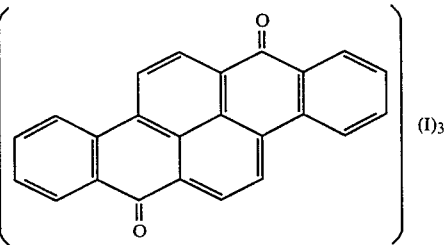
(IX-5) (I)₃
(IX-6) (I)₄
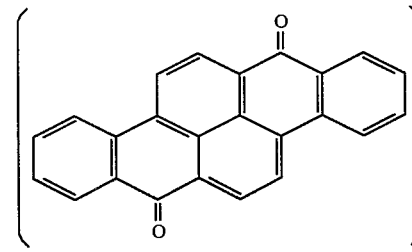
(IX-7) (NO₂)₂
(IX-8) (CN)₂
(IX-9) (COC₆H₅)₂
The following are examples of those pyranethrone-type pigment compounds having the foregoing Formula [X]
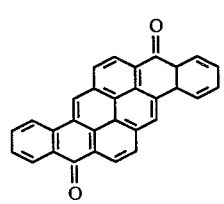
(X-1)

-continued (X-2) 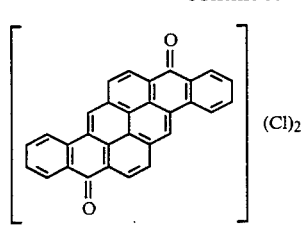

(X-3) 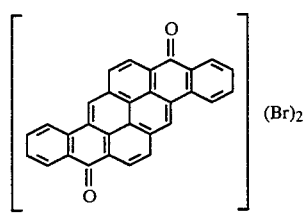

(X-4) 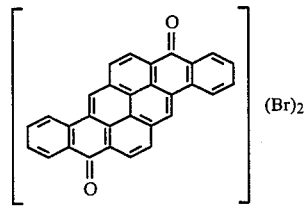

(X-5) 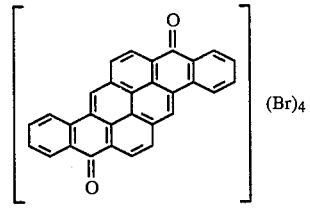

(X-6) 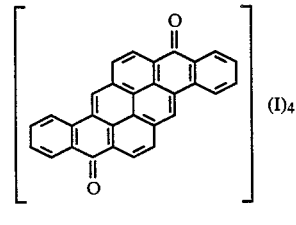

(X-7) 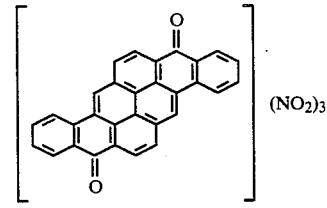

(X-8) 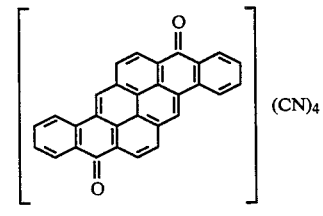

-continued (X-9) 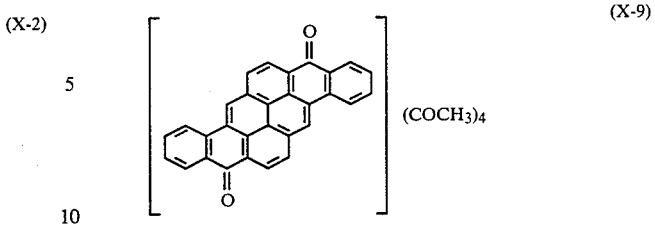

Examples of the usable different CGM includes those bisazo compounds having the following Formula [XI].

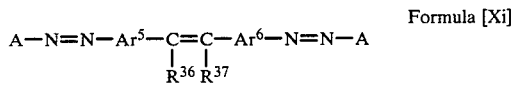

wherein $Ar^5$ and $Ar^6$ each is a substituted or unsubstituted carbocyclic aromatic cyclic group or a substituted or unsubstituted heterocyclic aromatic cyclic group; $R^{36}$ and $R^{37}$ each is an electron-attractive group or a hydrogen atom (wherein at least one of the $R^{36}$ and $R^{37}$ is an electron-attractive group such as —CN, a halogen such as —Cl, —NO₂, or the like); A is

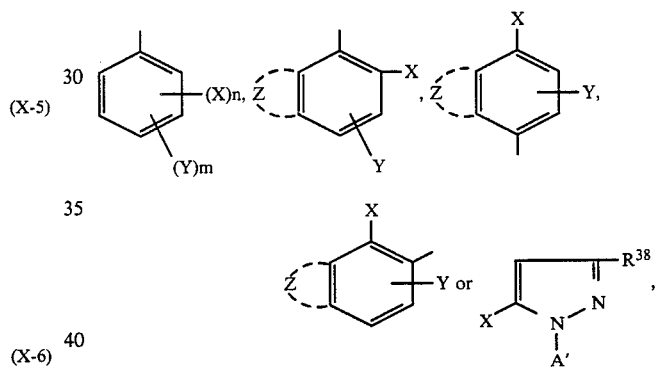

(wherein X is a hydroxyl, $$-N\begin{matrix}R^{39}\\R^{40}\end{matrix},$$

or —NHSO₂—$R^{41}$, wherein $R^{39}$ and $R^{40}$ each is a hydrogen atom, a substituted or unsubstituted alkyl group, $R^{41}$ is a substituted or unsubstituted alkyl group or a substituted or unsubstituted aryl group); Y is a hydrogen atom, a halogen atom, a substituted or unsubstituted alkyl group, an alkoxy or carboxyl or sulfo group, a substituted or unsubstituted carbamoyl group or a substituted or unsubstituted sulfamoyl group, (provided when m is not less than 2, they are allowed to be different from one another); Z is a group of atoms necessary to form a substituted or unsubstituted carbocyclic aromatic cyclic ring or a substituted or unsubstituted heterocyclic aromatic ring; $R^{38}$ is a hydrogen atom, a substituted or unsubstituted amino group, a substituted or unsubstituted carbamoyl group, or a carboxyl group or an ester group thereof; A' is a substituted or unsubstituted aryl group; n is an integer of 1 or 2; and m is an integer of from zero to 4.

Those compounds having Formula [XI] will be exemplified.

The preferred among those bisazo compounds having Formula [XI] are those having the following Formula [XIa].

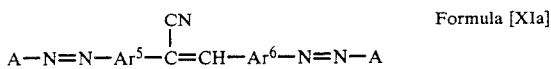

Formula [XIa]

wherein $Ar^5$, $Ar^6$ and A are as defined in Formula [XI]. The more preferred are those compounds in which the $Ar^5$ and $Ar^6$ each in Formula [XIa] is a substituted or unsubstituted phenyl group, provided the substituent thereof is one selected from the class consisting of an alkyl group such as methyl, ethyl, etc., an alkoxy group such as methoxy, ethoxy, etc., a halogen atom such as a chlorine atom, a bromine atom, etc., a hydroxyl group and a cyano group.

Examples of those bisazo compounds having Formula [XI] include the ones having the following structural formulas, but are not limited thereto.

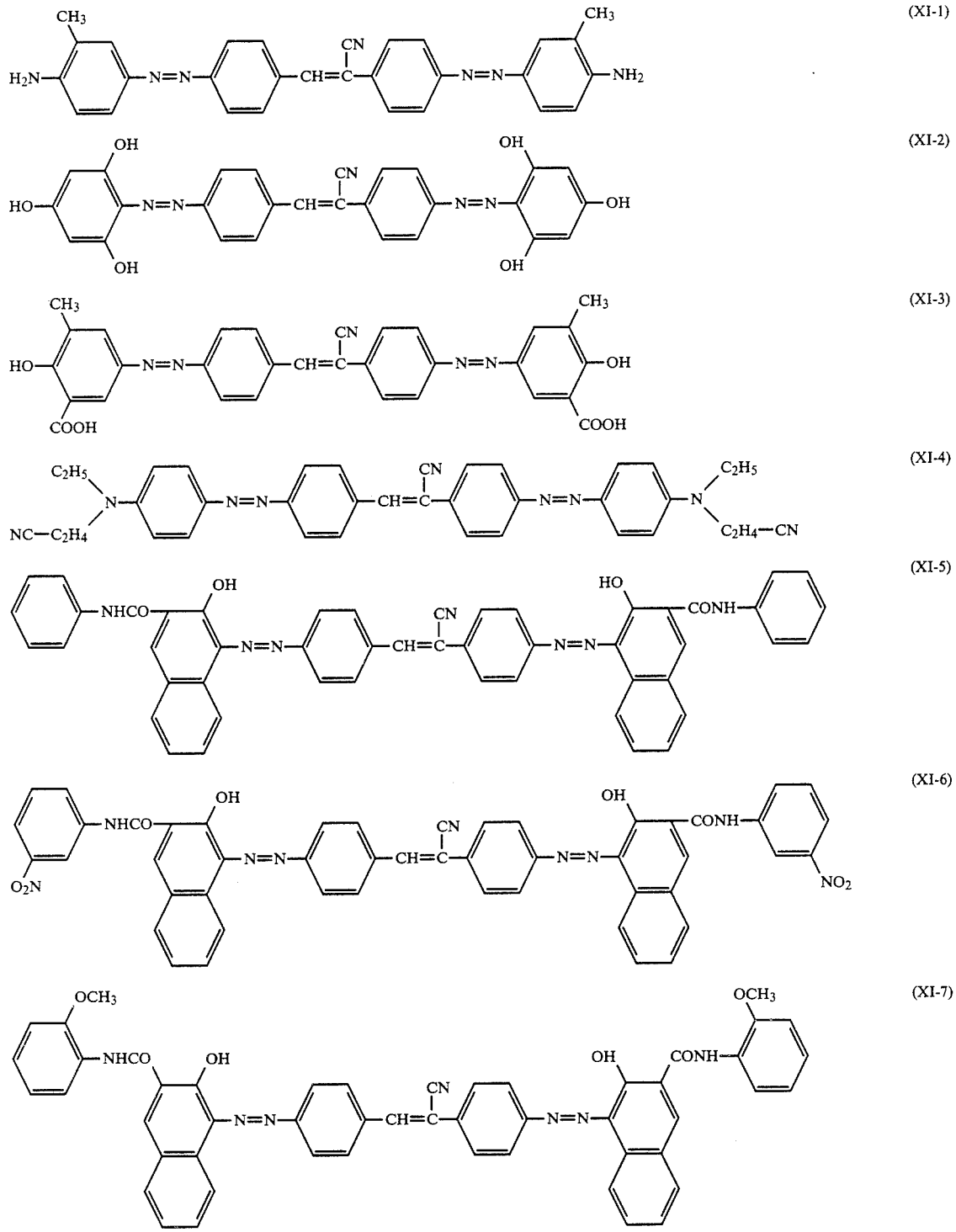

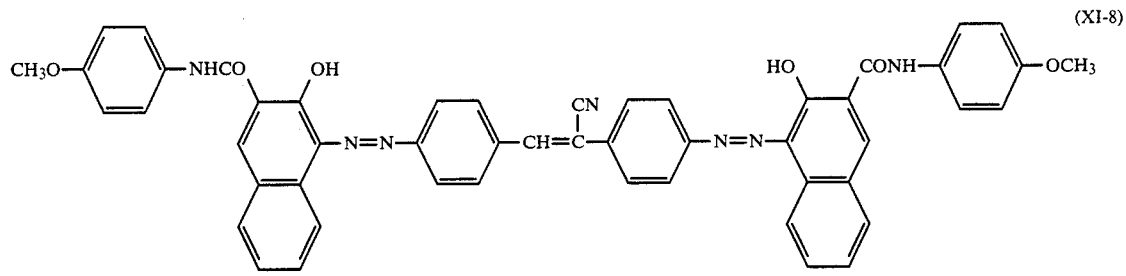
(XI-8)
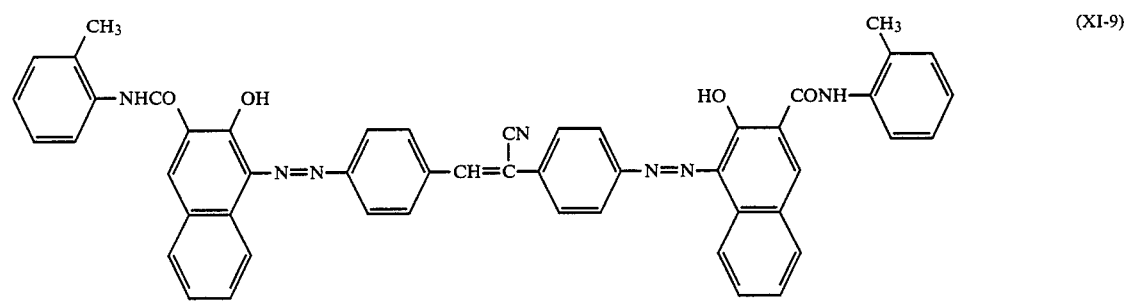
(XI-9)
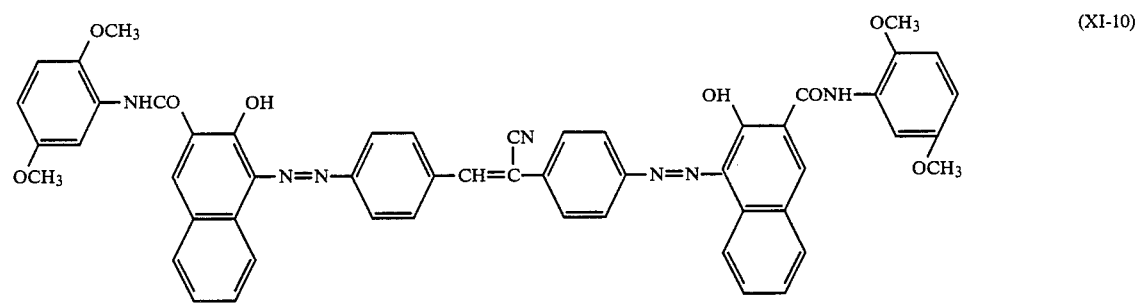
(XI-10)
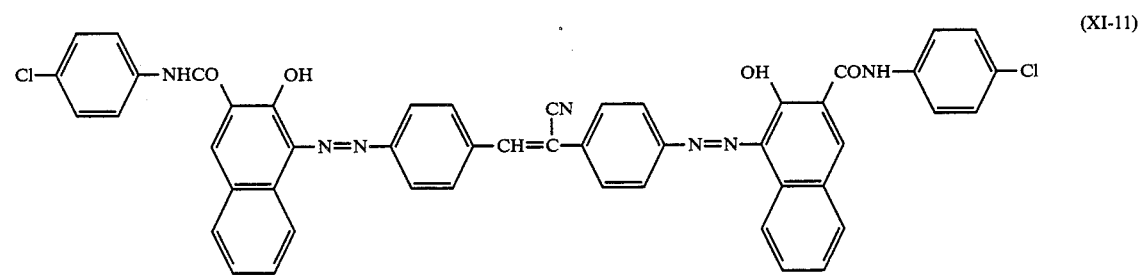
(XI-11)
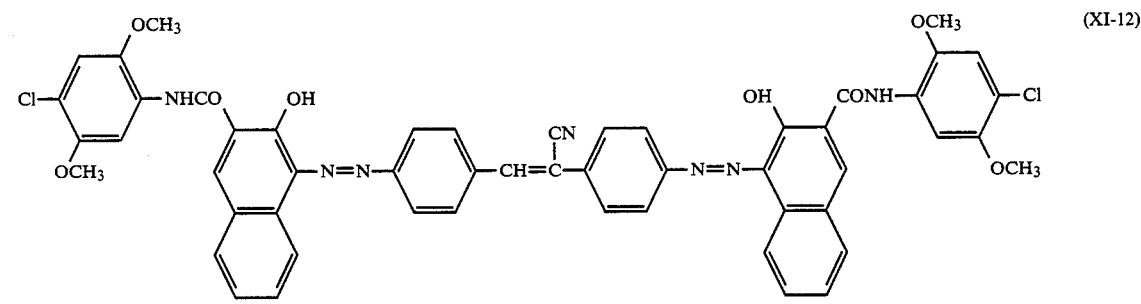
(XI-12)

-continued
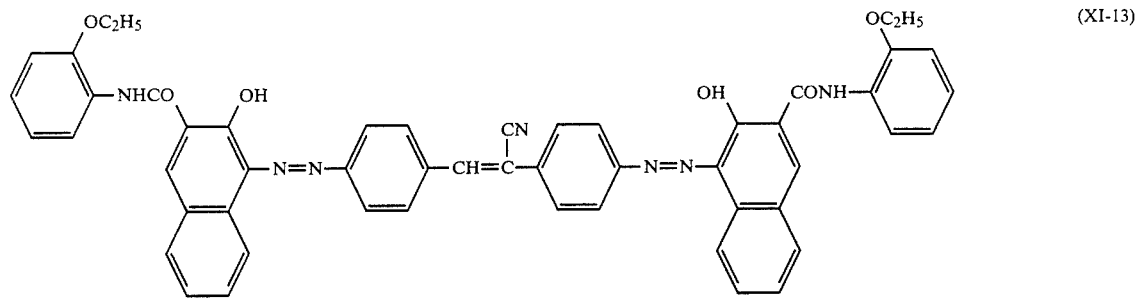
(XI-13)
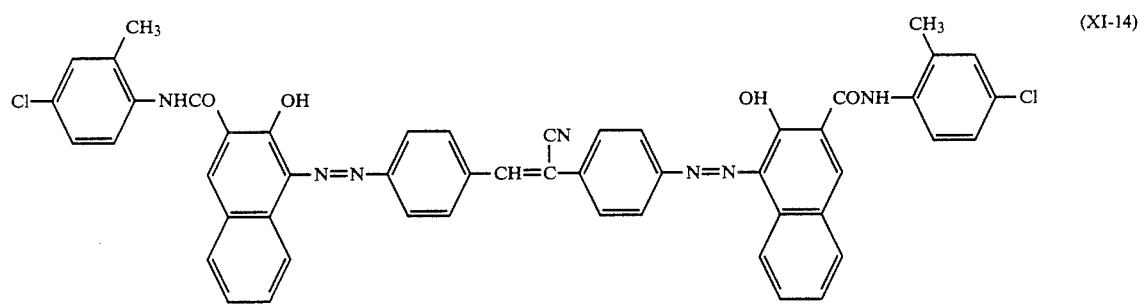
(XI-14)
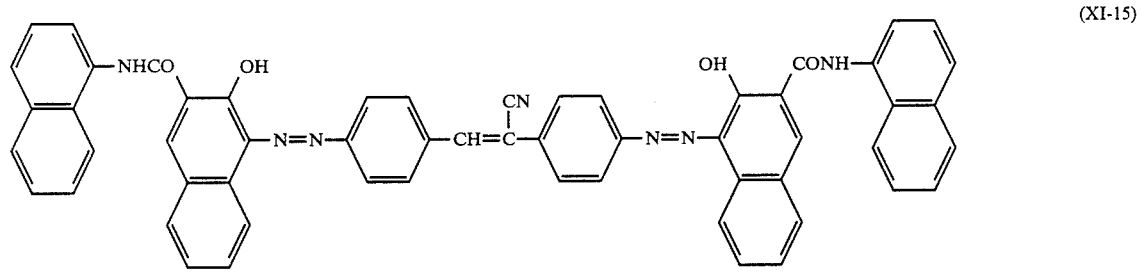
(XI-15)
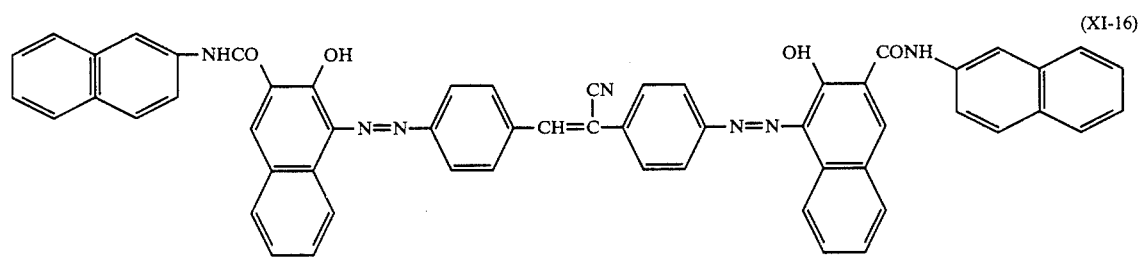
(XI-16)
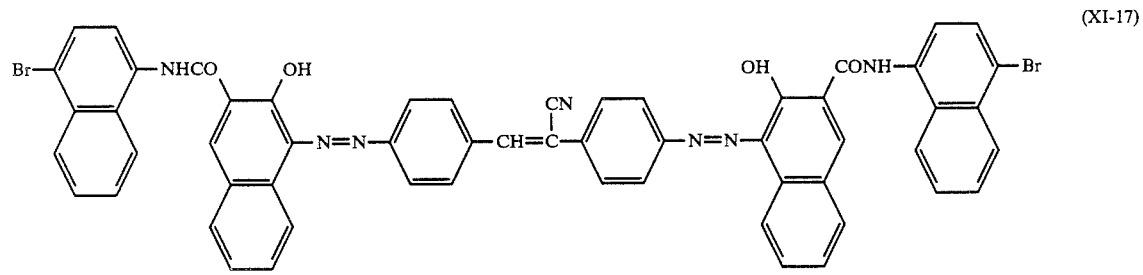
(XI-17)

-continued
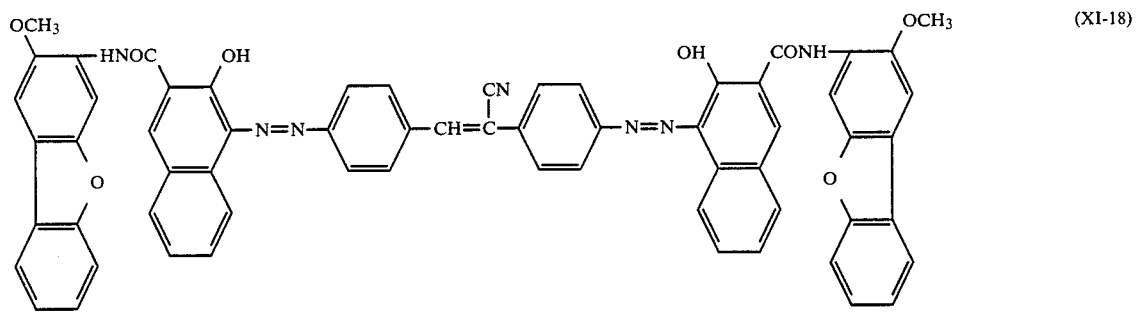
(XI-18)
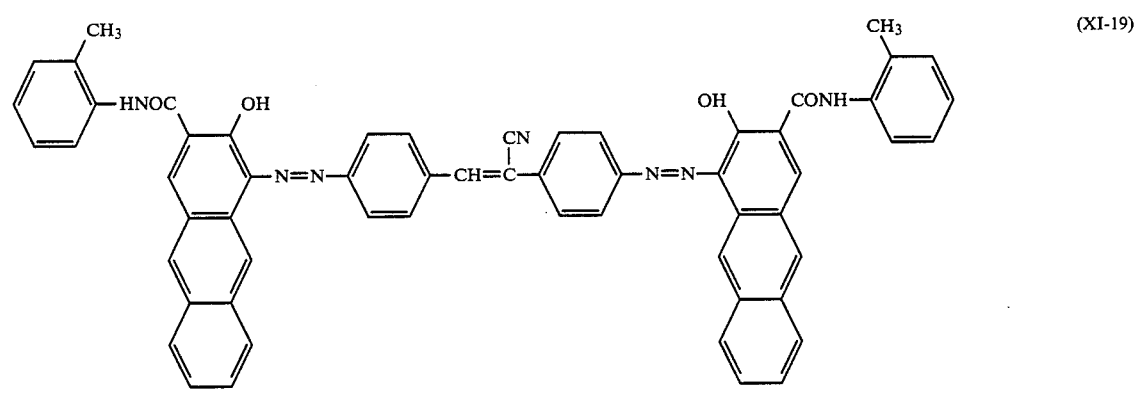
(XI-19)
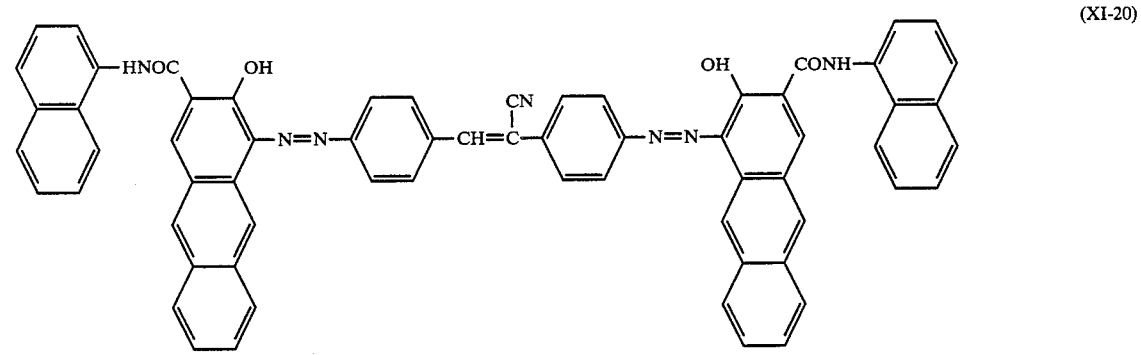
(XI-20)
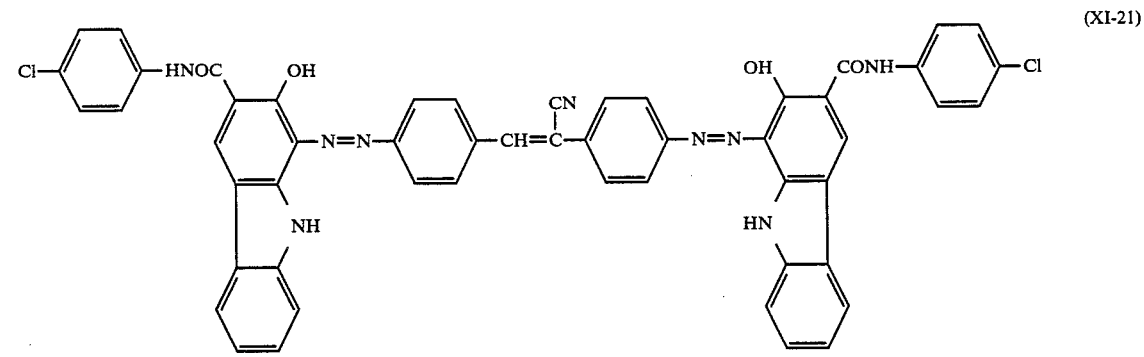
(XI-21)

-continued
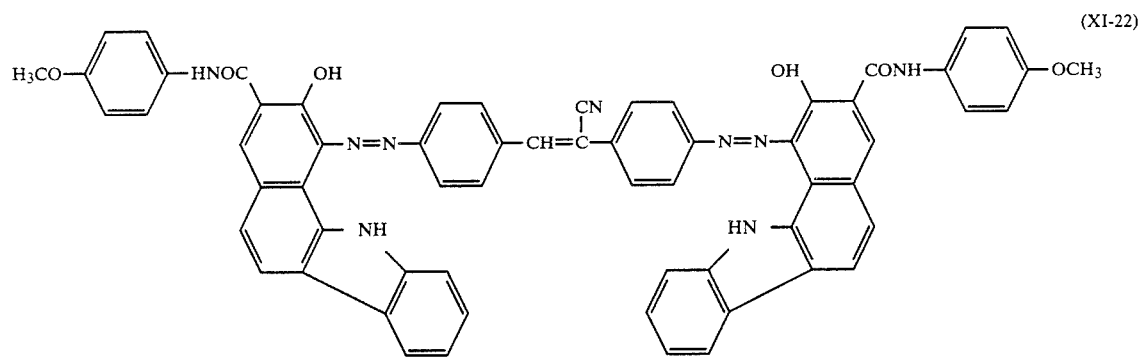 (XI-22)
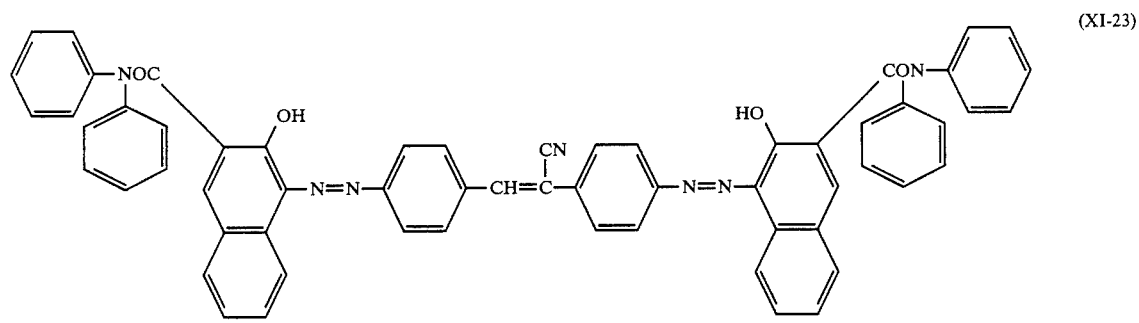 (XI-23)
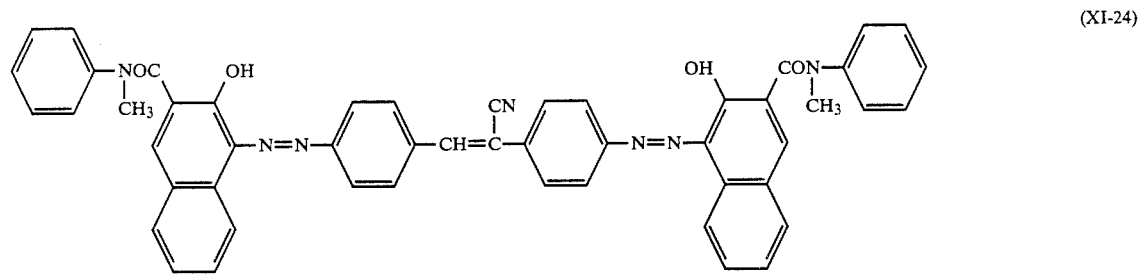 (XI-24)
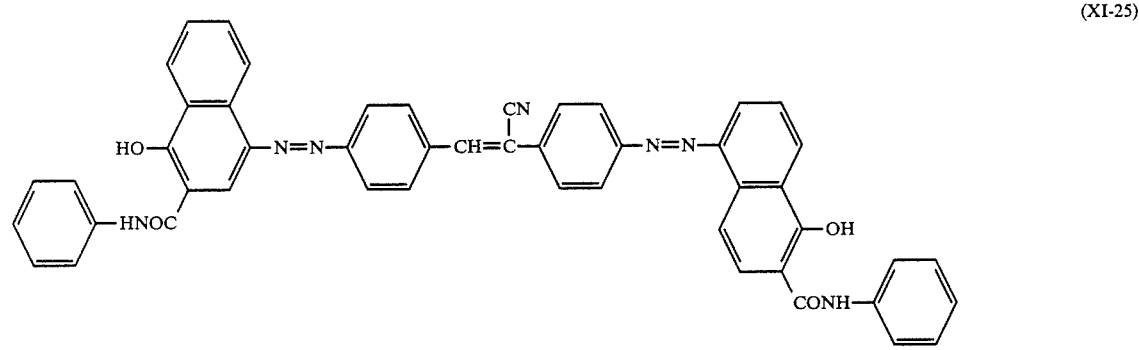 (XI-25)
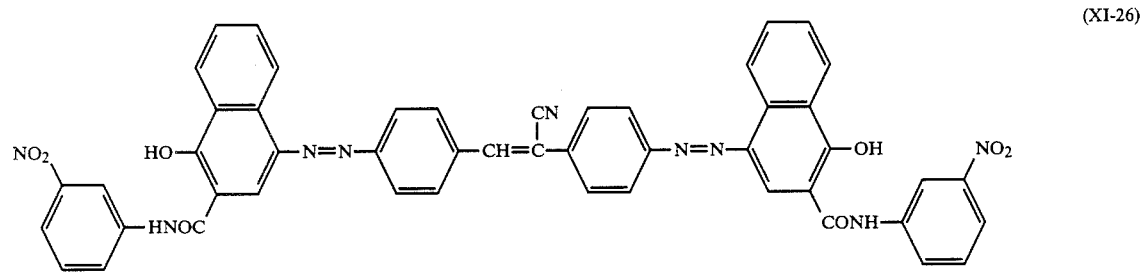 (XI-26)

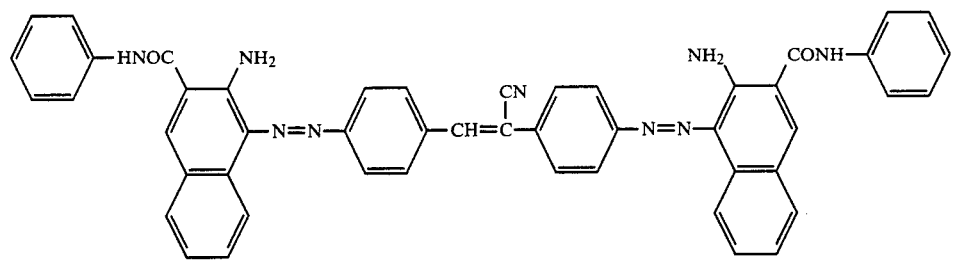
(XI-27)
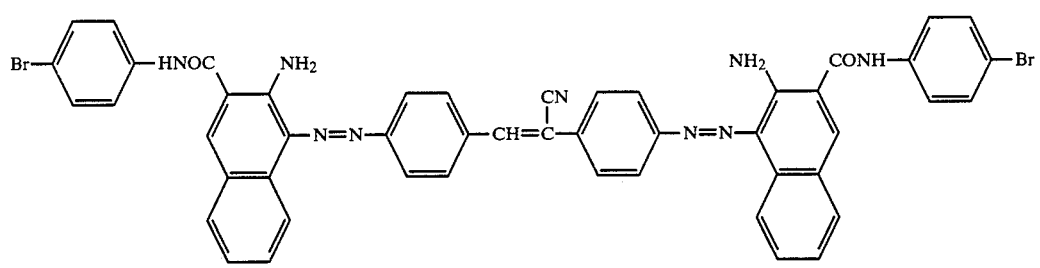
(XI-28)
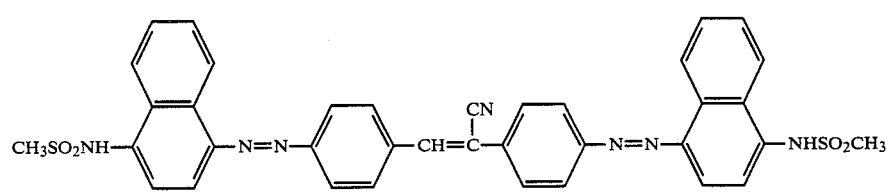
(XI-29)
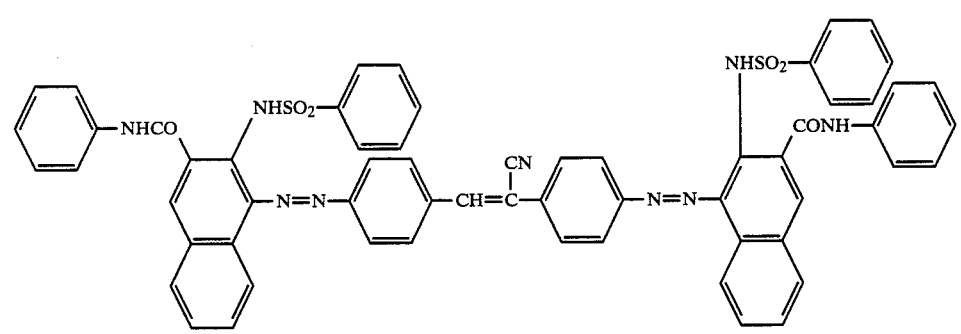
(XI-30)
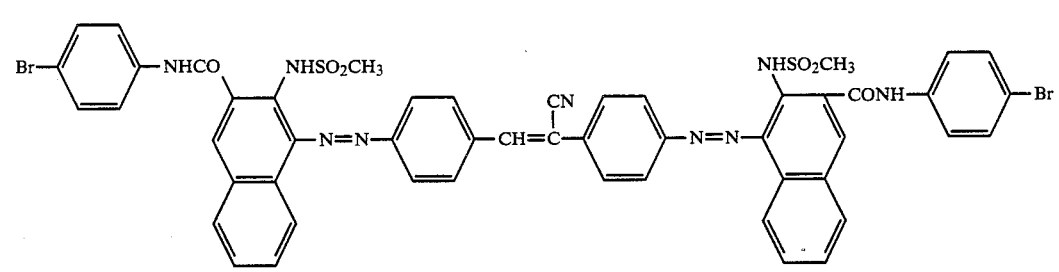
(XI-31)
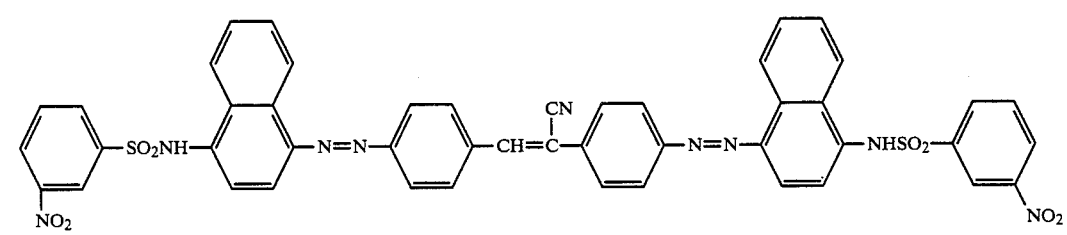
(XI-32)

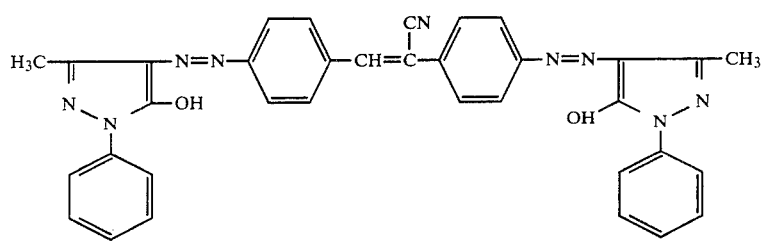
(XI-33)
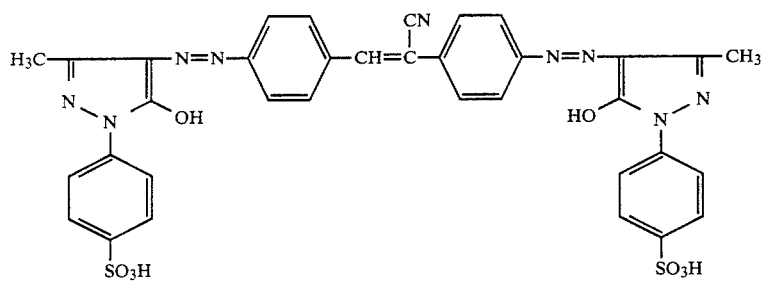
(XI-34)
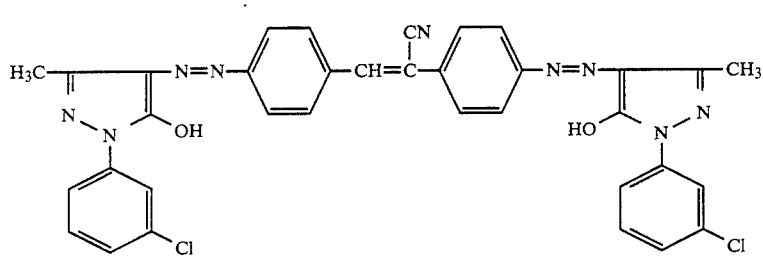
(XI-35)
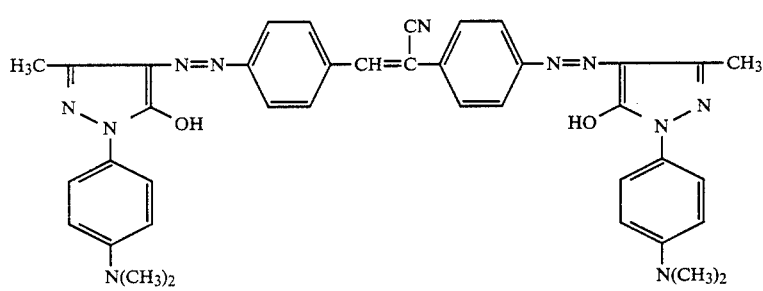
(XI-36)
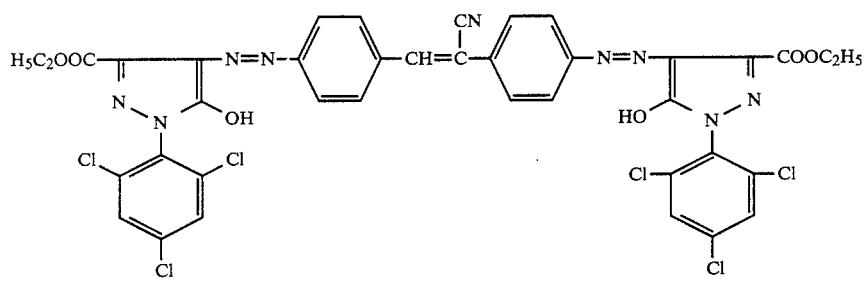
(XI-37)
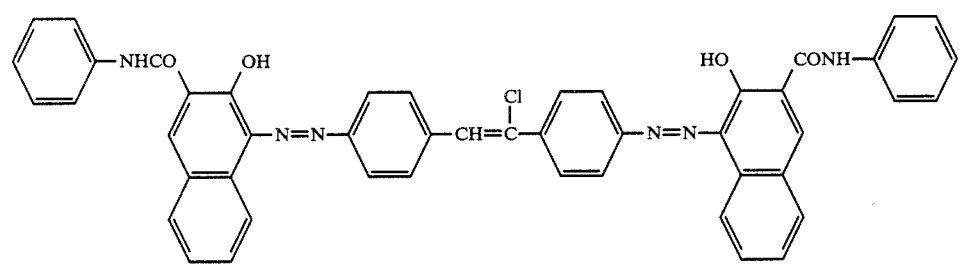
(XI-38)

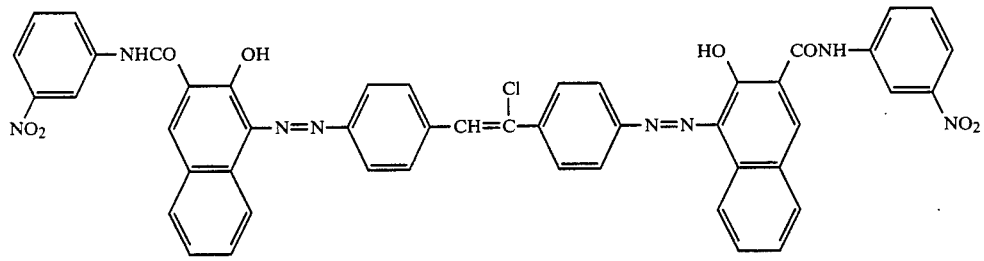
(XI-39)
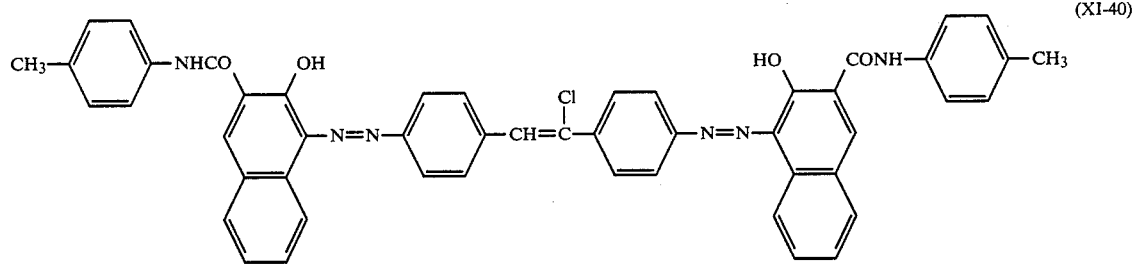
(XI-40)
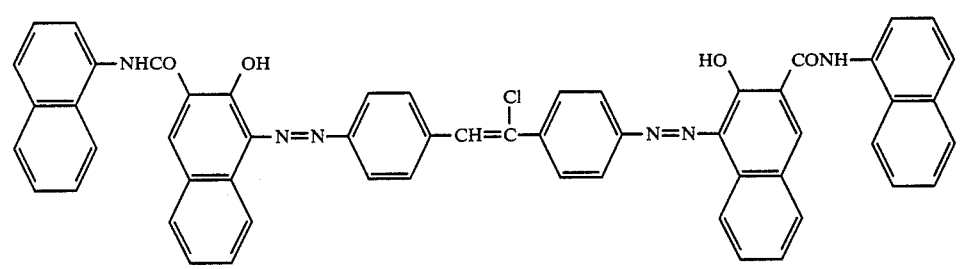
(XI-41)
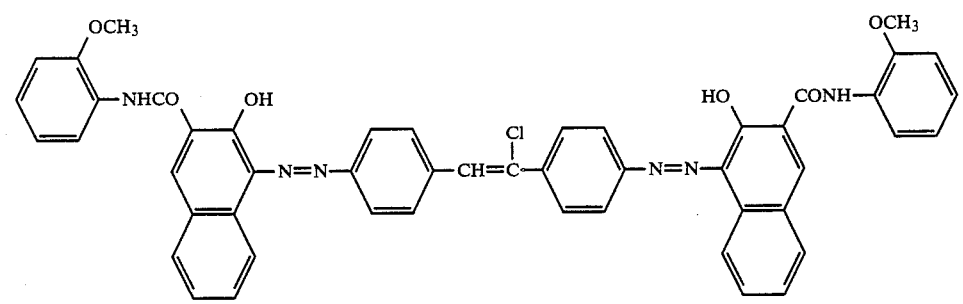
(XI-42)
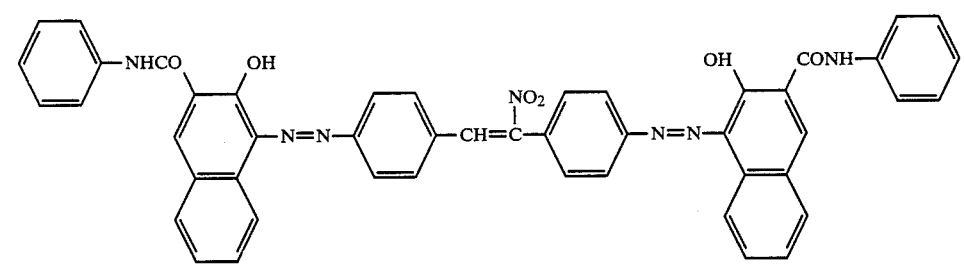
(XI-43)

-continued
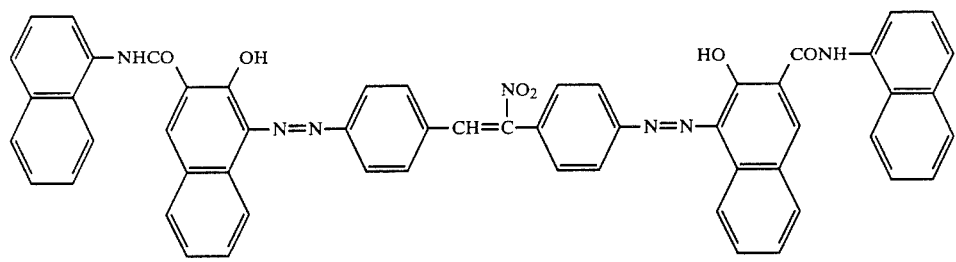
(XI-44)
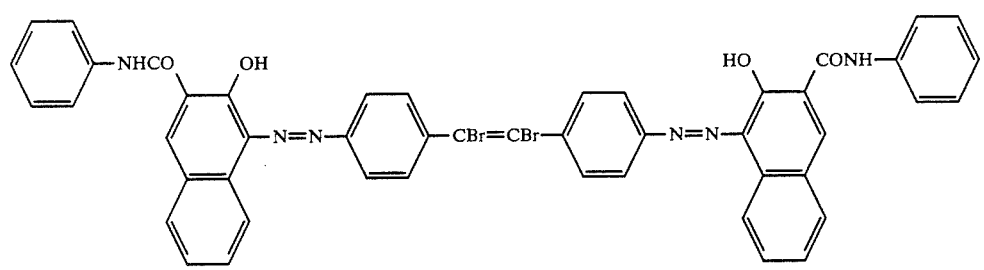
(XI-45)
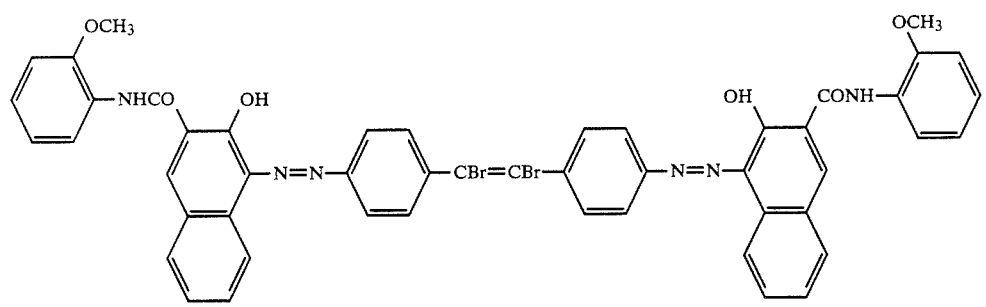
(XI-46)
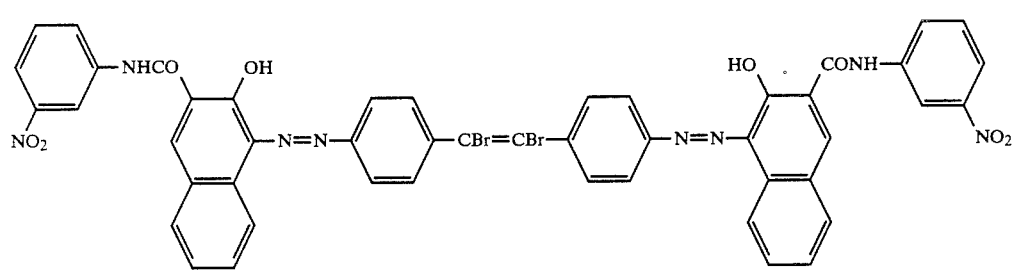
(XI-47)
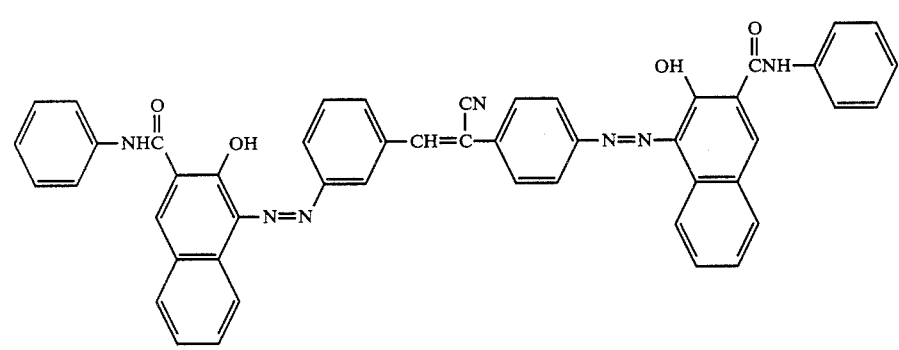
(XI-48)

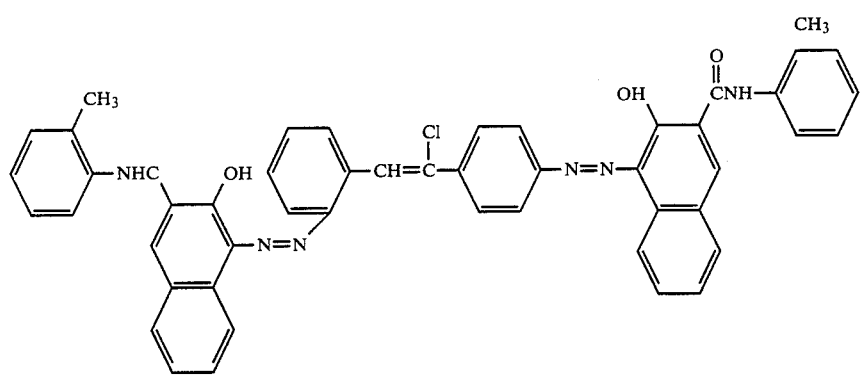
(XI-49)
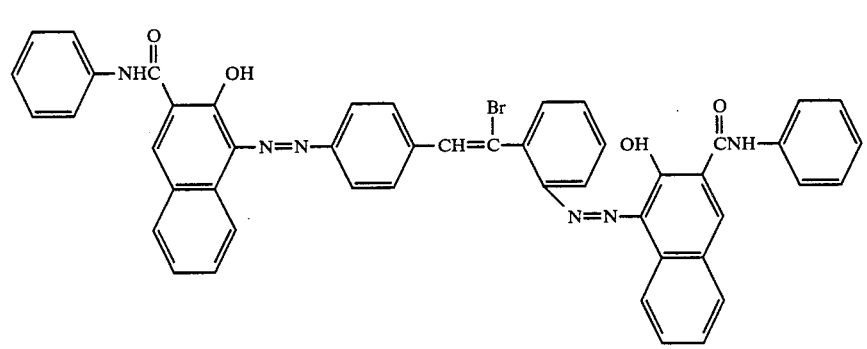
(XI-50)
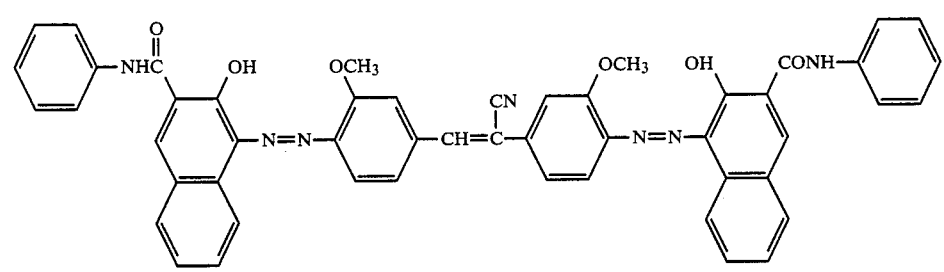
(XI-51)
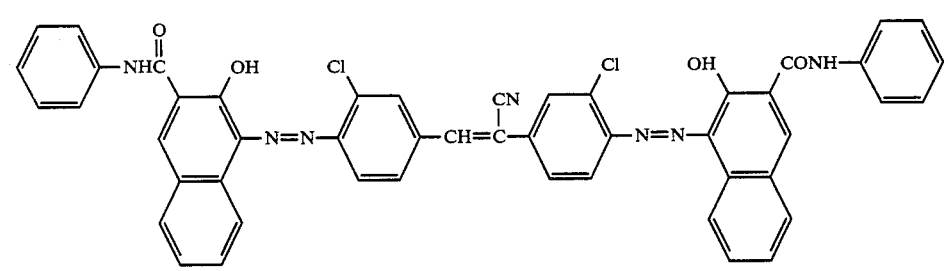
(XI-52)
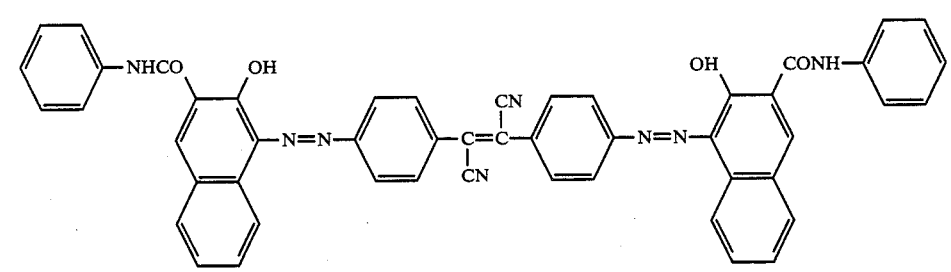
(XI-53)

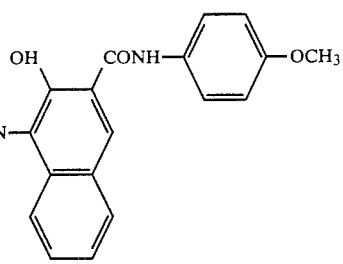
(XI-54)
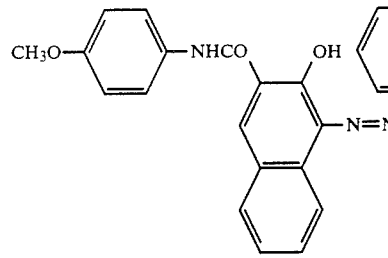
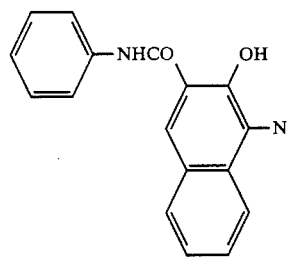 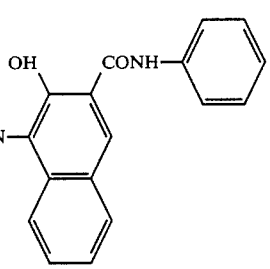
(XI-55)
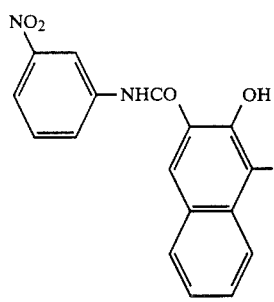 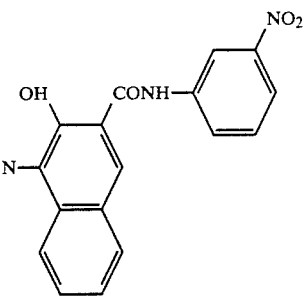
(XI-56)
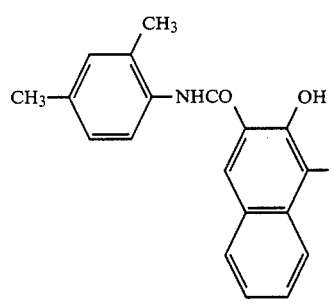 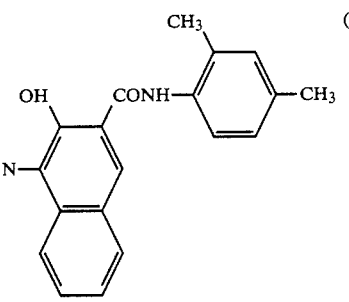
(XI-57)
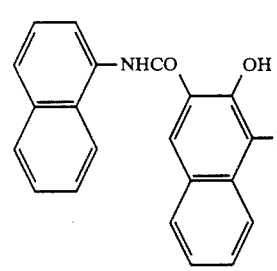 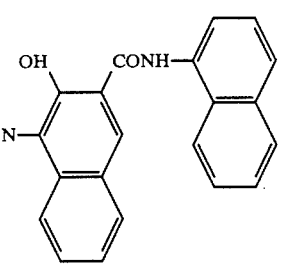
(XI-58)

-continued
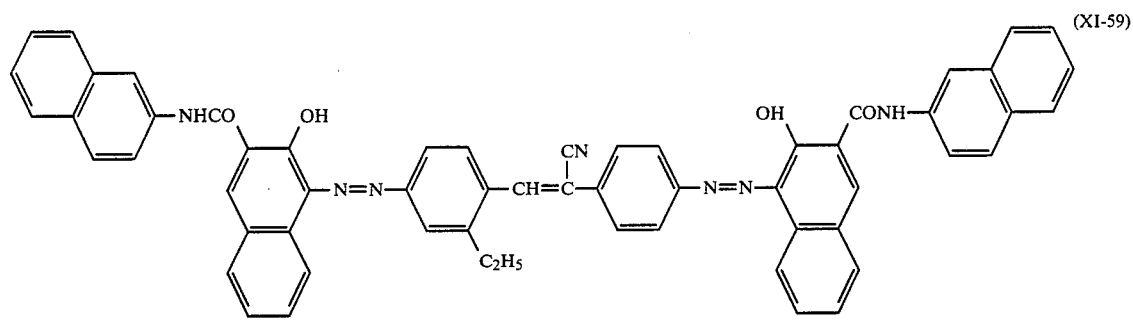
(XI-59)
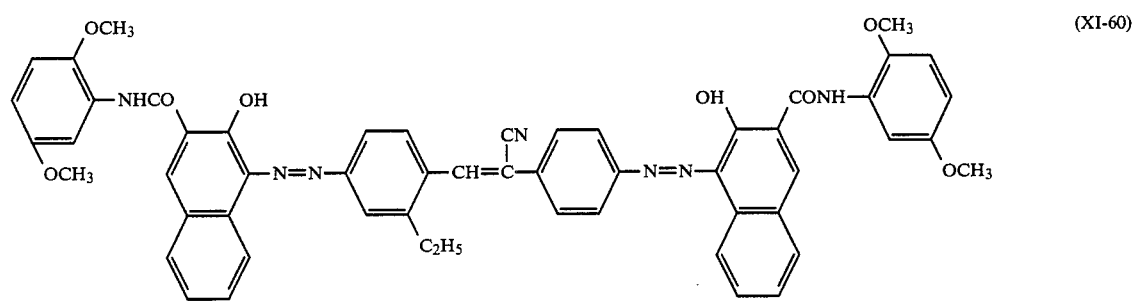
(XI-60)
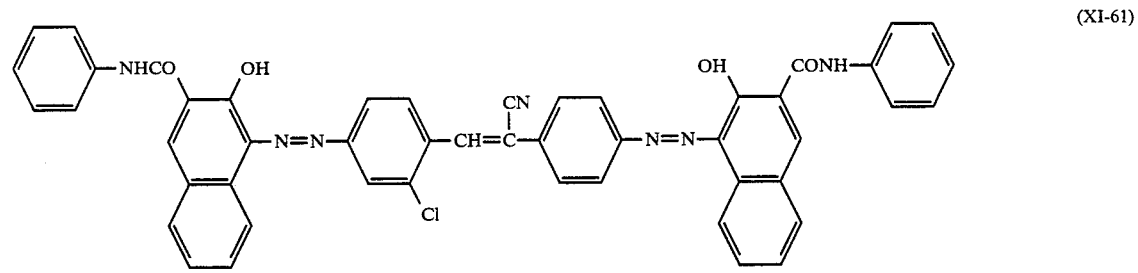
(XI-61)
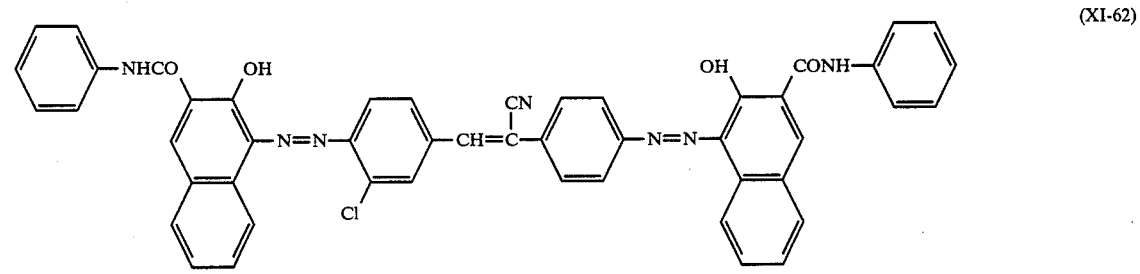
(XI-62)
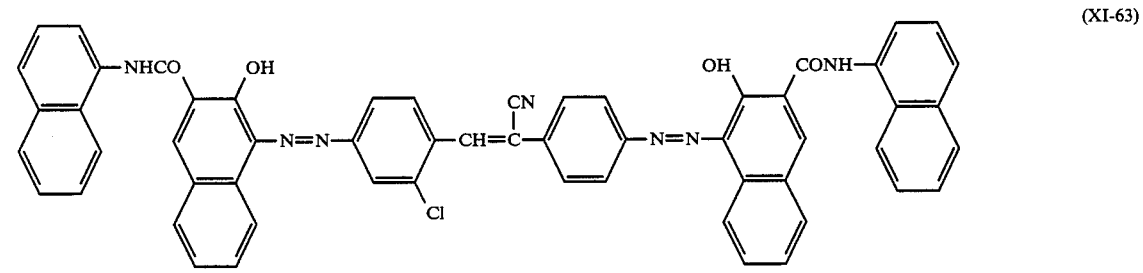
(XI-63)

-continued
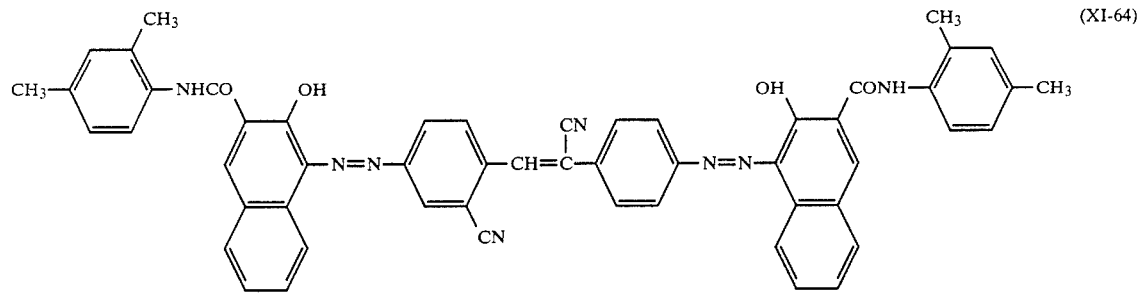
(XI-64)
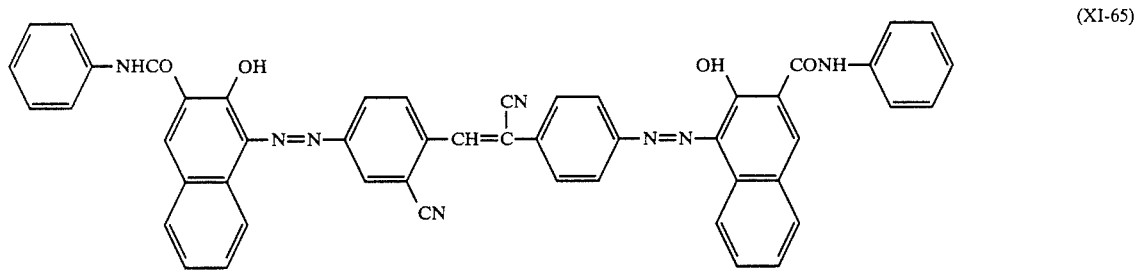
(XI-65)
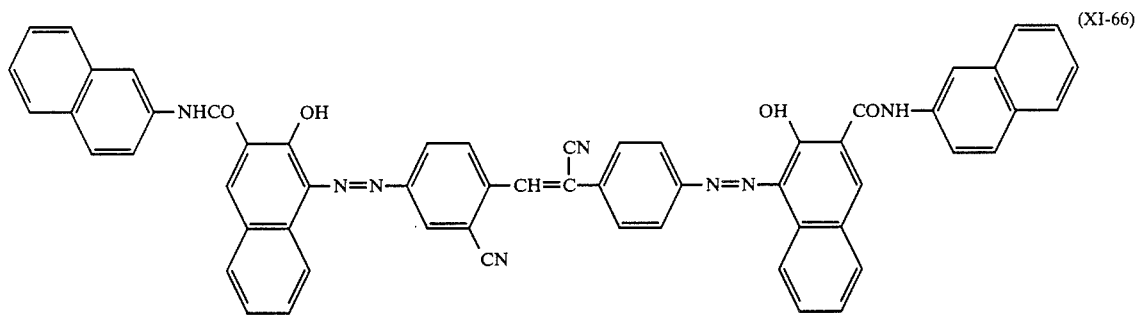
(XI-66)
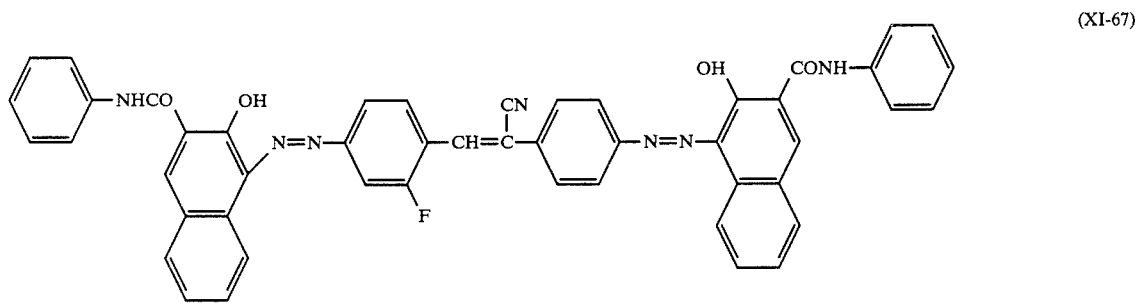
(XI-67)
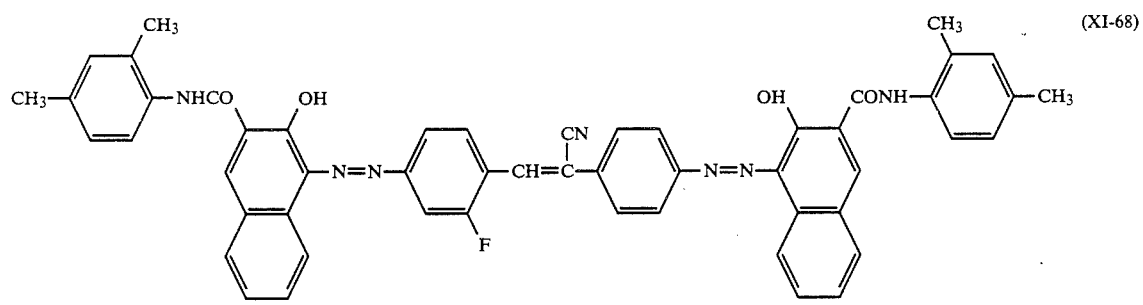
(XI-68)

-continued
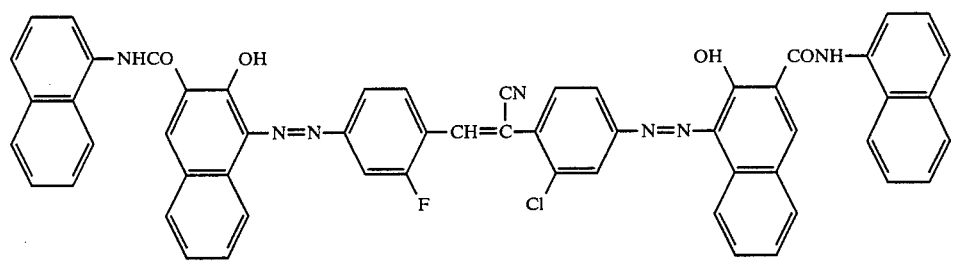
(XI-69)
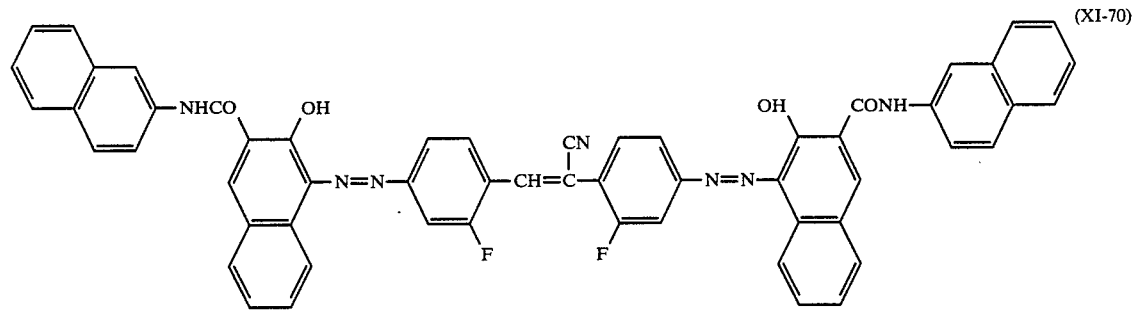
(XI-70)
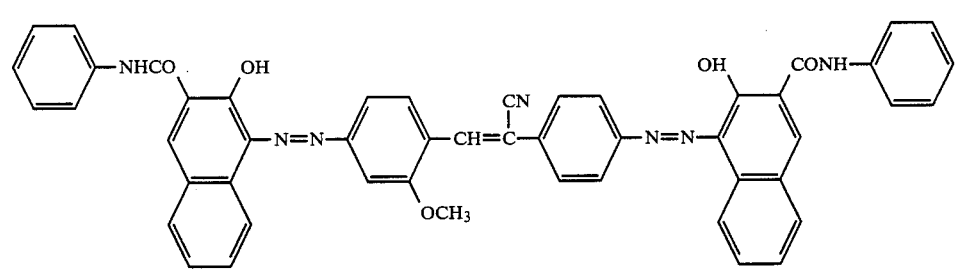
(XI-71)
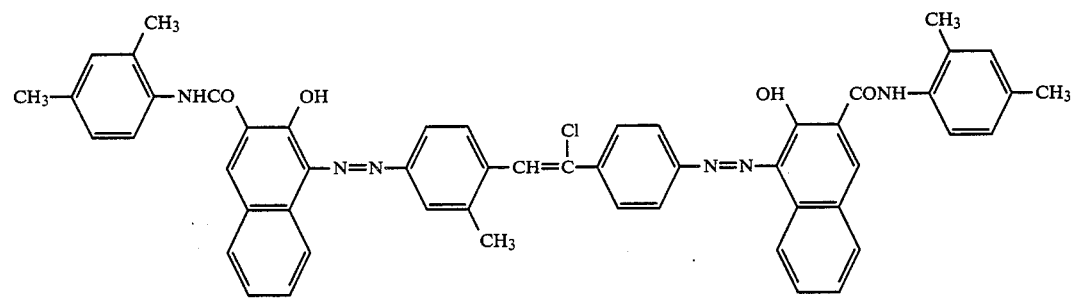
(XI-72)
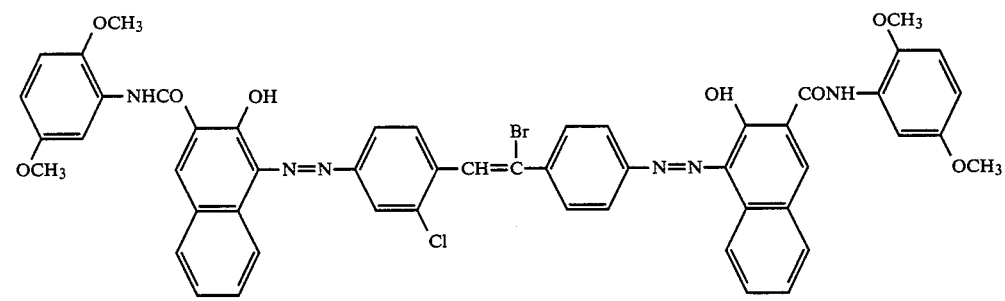
(XI-73)

-continued
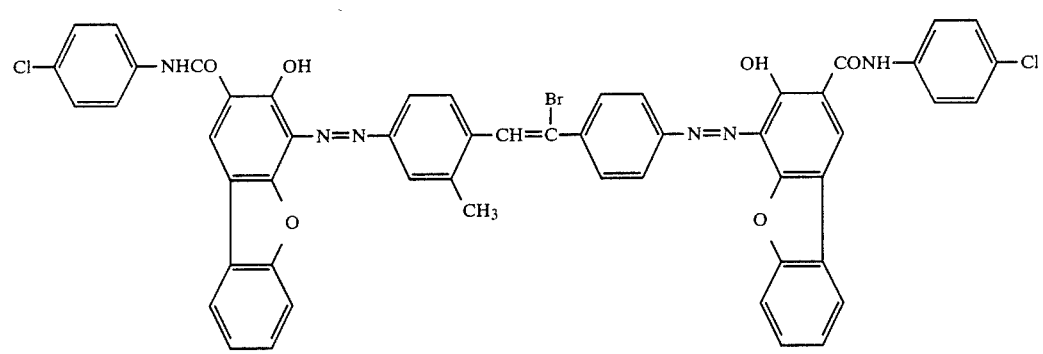
(XI-74)
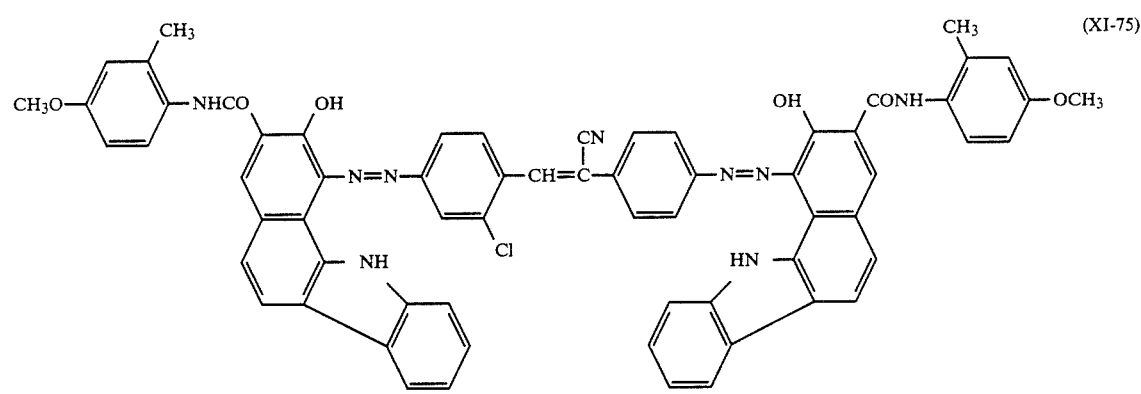
(XI-75)
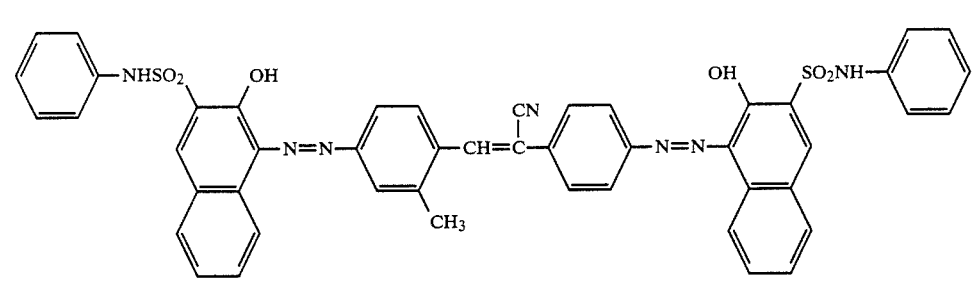
(XI-76)
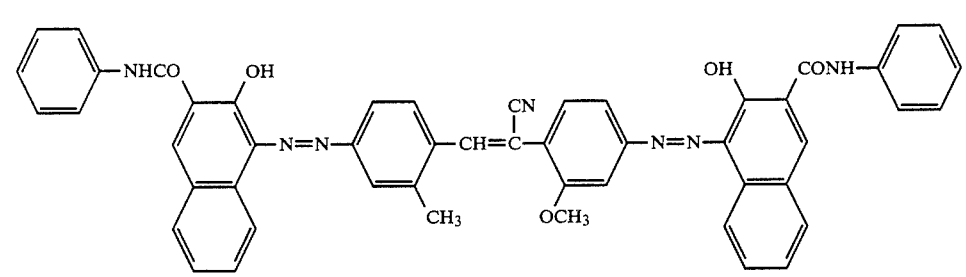
(XI-77)
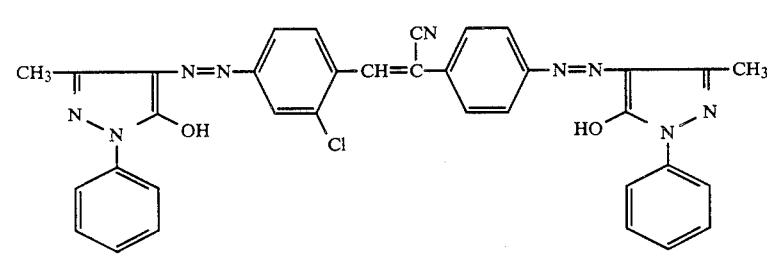
(XI-78)

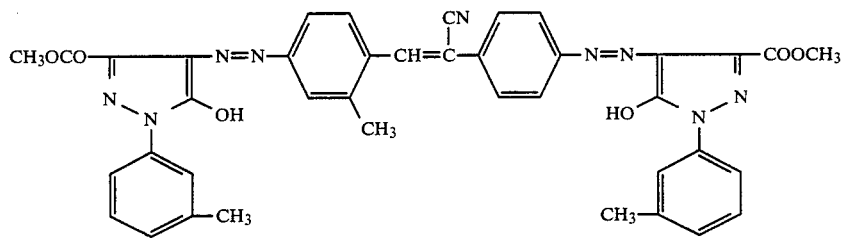 (XI-79)

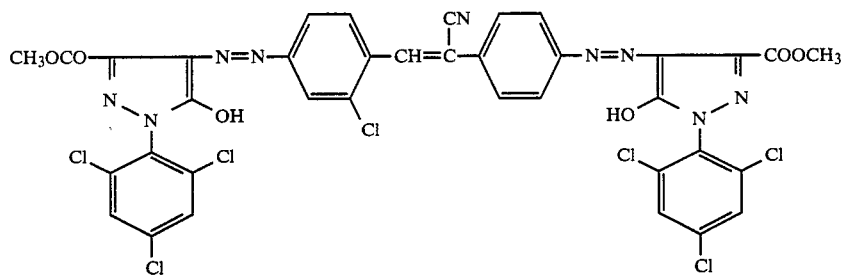 (XI-80)

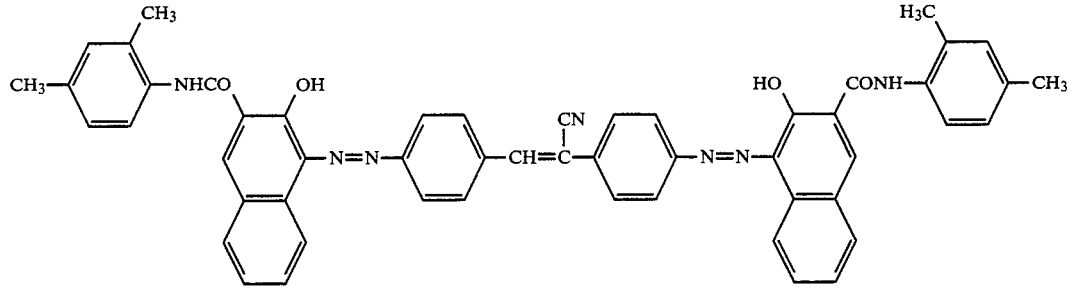 (XI-81)

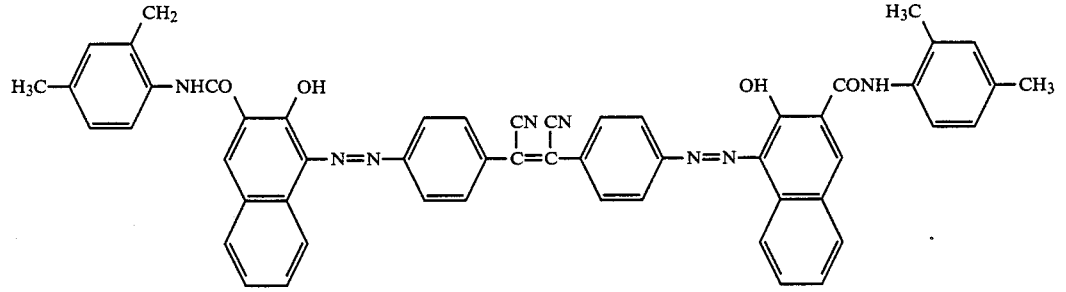 (XI-82)

Those bisazo compounds having the following Formula [XII] may also be used as the CGM.

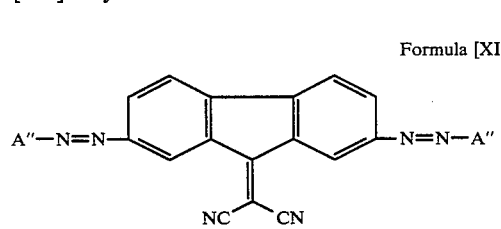

Formula [XII]

wherein A" is

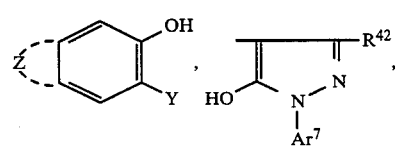

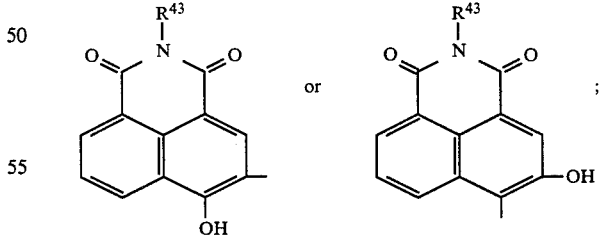

Z is a group of atoms necessary to form a substituted or unsubstituted aromatic carbocyclic ring or a substituted or unsubstituted aromatic heterocyclic ring; Y is a hydrogen atom, a hydroxyl or carboxyl or ester group thereof, a sulfo group, a substituted or unsubstituted carbamoyl group or a substituted or unsubstituted sulfamoyl group; $R^{42}$ is a hydrogen atom, a substituted or unsubstituted alkyl group, a substituted or unsubstituted amino group, a substituted or unsubstituted carbamoyl group, a carboxyl group or an ester group thereof or a cyano group; Ar⁷ is a substituted or unsubstituted aryl group; and R⁴³ is a substituted or unsubstituted alkyl group, a substituted or unsubstituted aralkyl group or a substituted or unsubstituted aryl group.

Among the bisazo compounds having the above Formula [XII], those carbazole group-containing bisazo compounds having the following Formula [XII'] are useful.

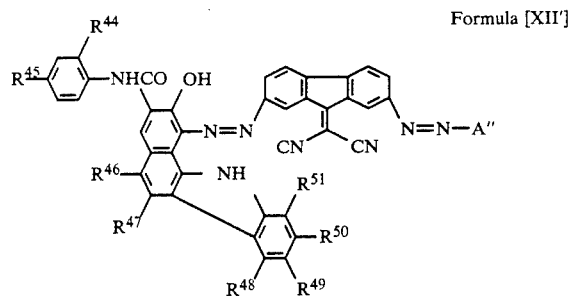

Formula [XII']

wherein $R^{44}$ and $R^{45}$ each is an alkyl, alkoxy or aryl group; $R^{46}, R^{47}, R^{48}, R^{49}, R^{50}$, and $R^{51}$ each is a hydrogen atom, a halogen atom, an alkyl, alkoxy, amino, hydroxyl or aryl group.

In the bisazo compound of Formula [XII'], the carbazole group thereinside is considered contributing to the sensitization of the photoreceptor, and provides an excellent sensitivity particularly in a longer wavelength region, and, in combination with the carbamoyl group portion inside the same molecule, functions effectively as a coupler to display a satisfactory sensitivity over an extensive wavelength range, thus displaying excellent characteristics as the photorecepto for semiconductor laser use.

Examples of the bisazo compounds having Formula [XII] usable in this invention include, e.g., the compounds having the following structural formulas, but are not limited thereto.

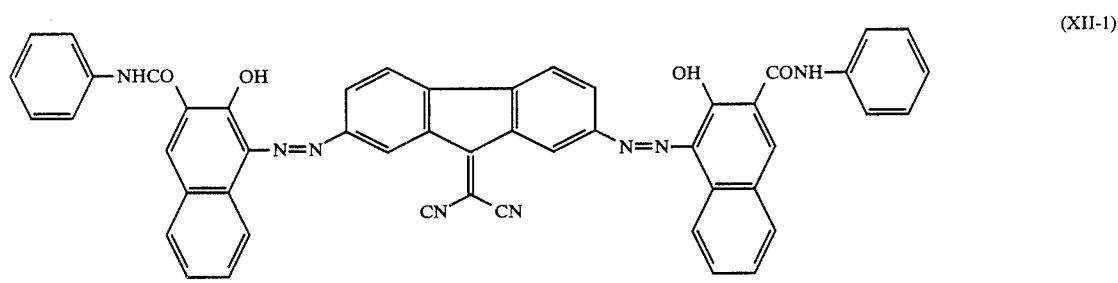

(XII-1)

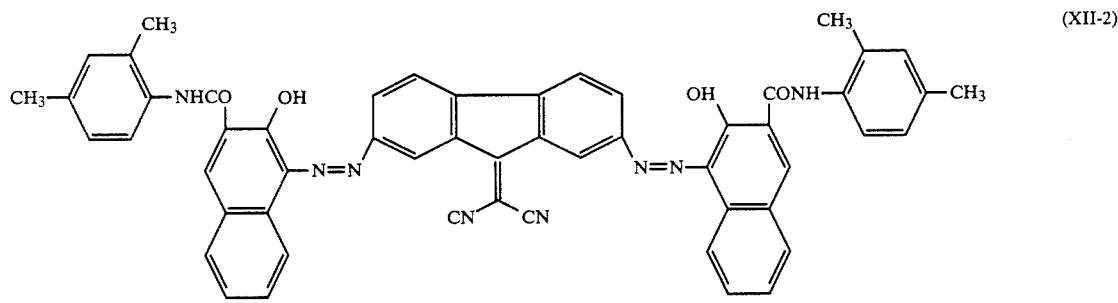

(XII-2)

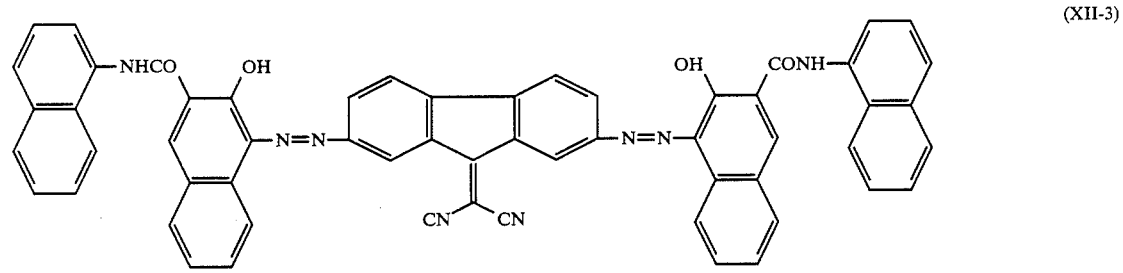

(XII-3)

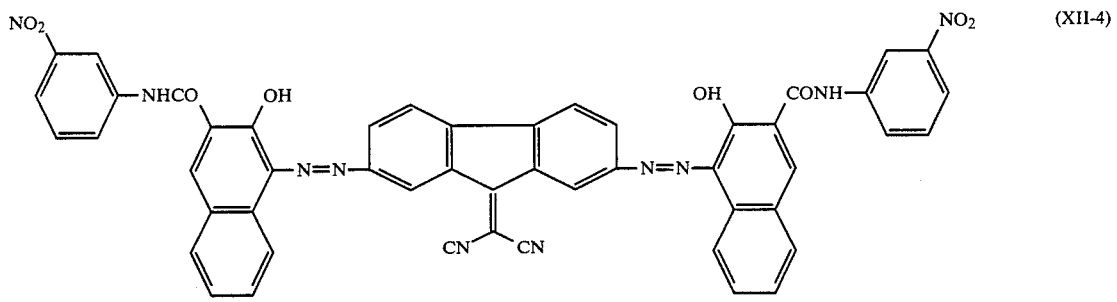 (XII-4)
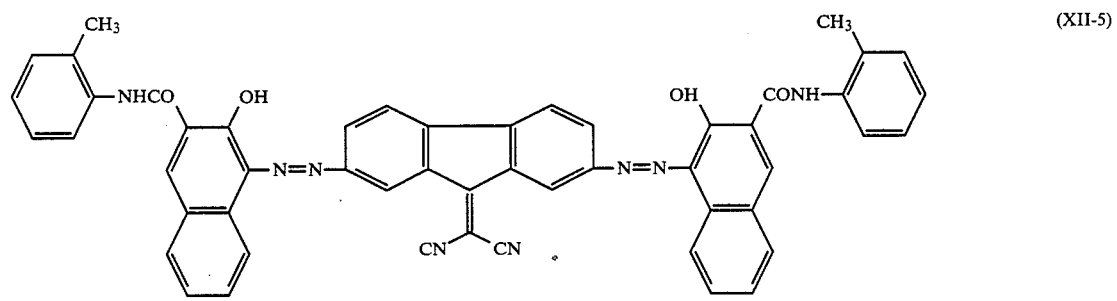 (XII-5)
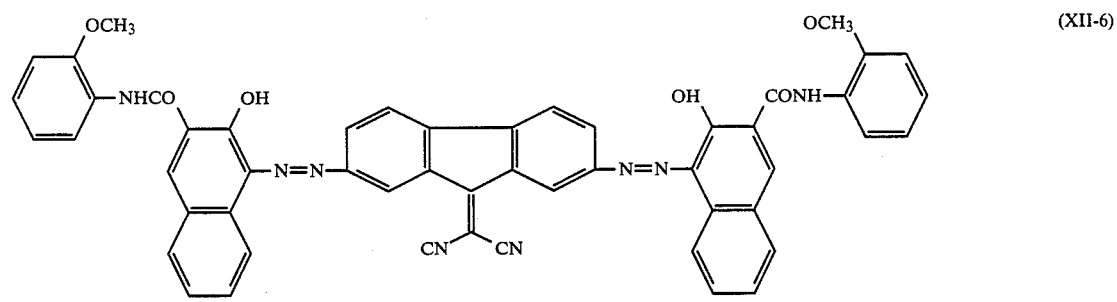 (XII-6)
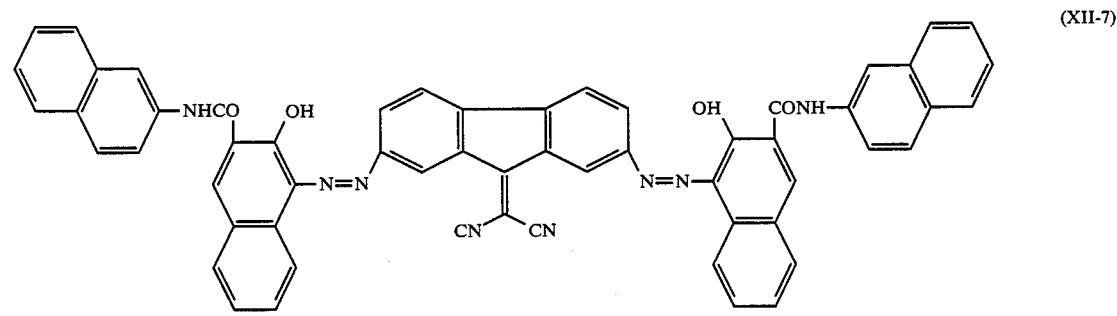 (XII-7)
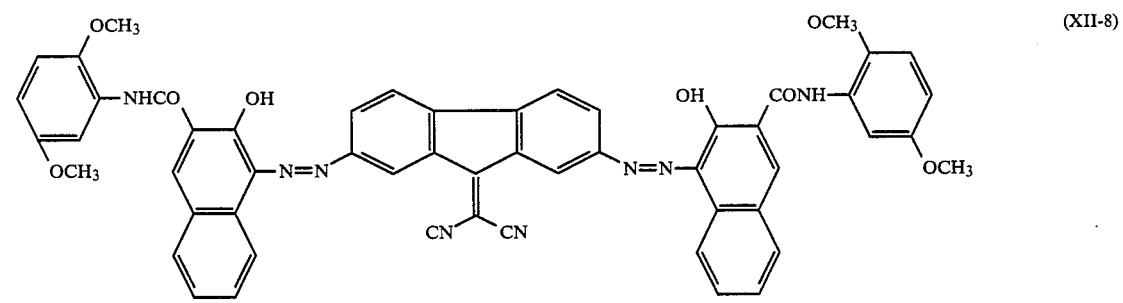 (XII-8)

-continued
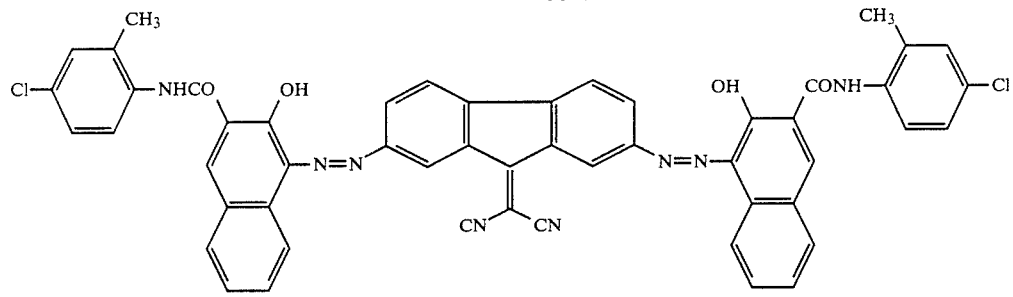
(XII-9)
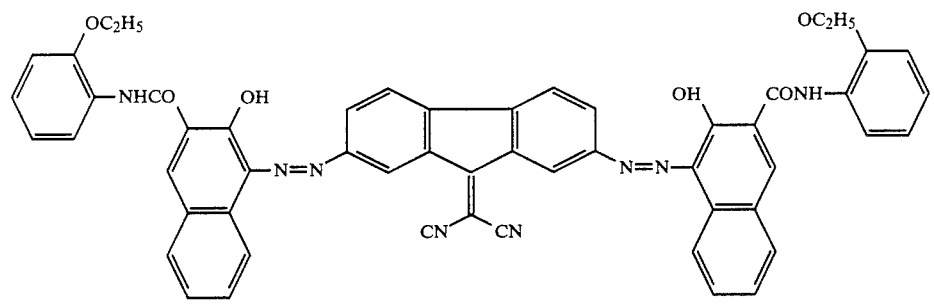
(XII-10)
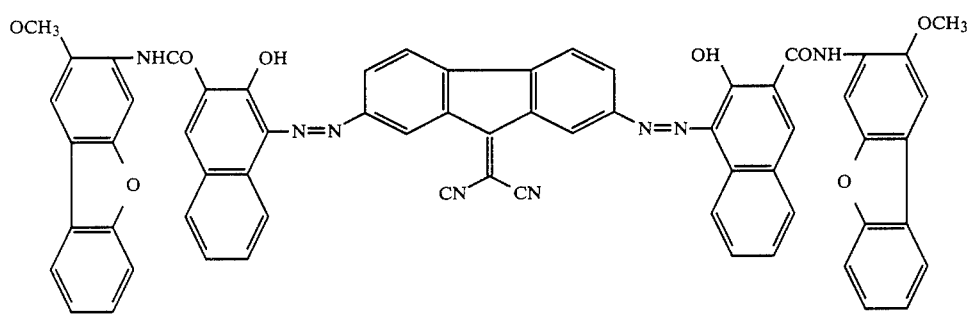
(XII-11)
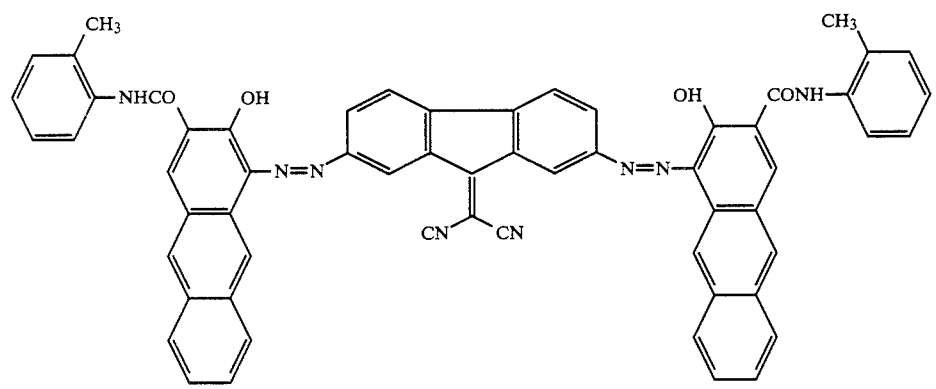
(XII-12)
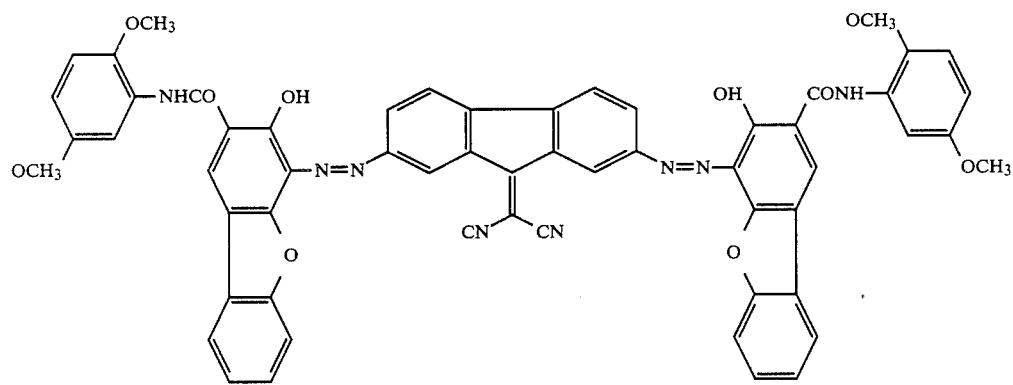
(XII-13)

-continued
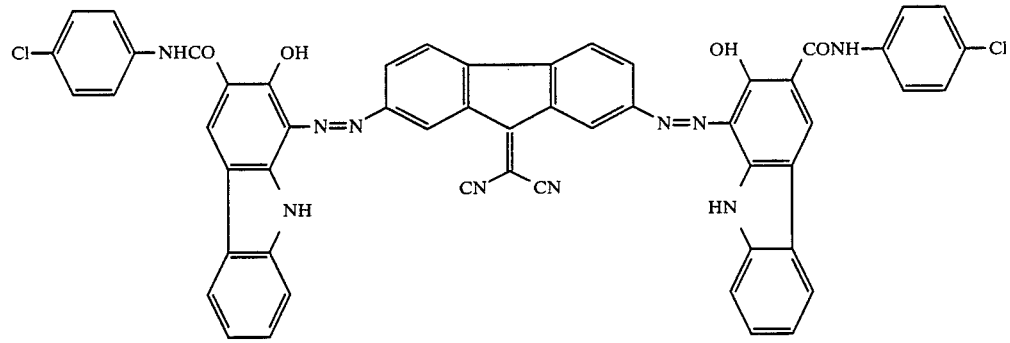
(XII-14)
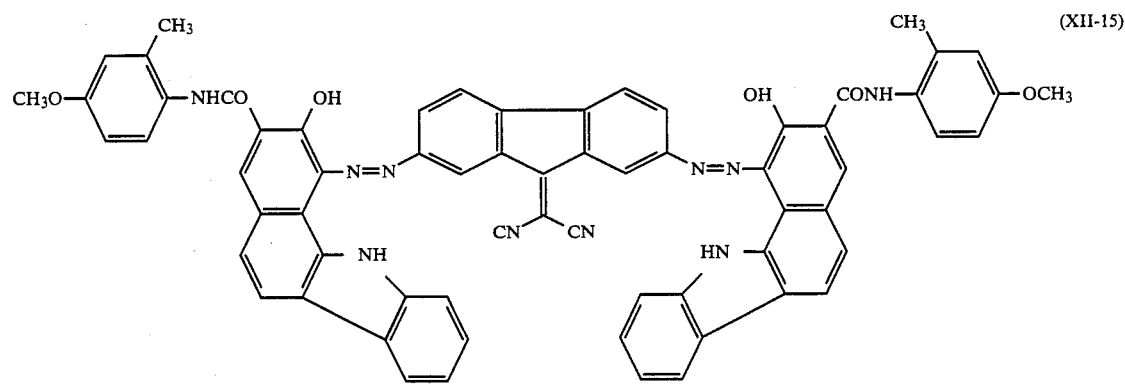
(XII-15)
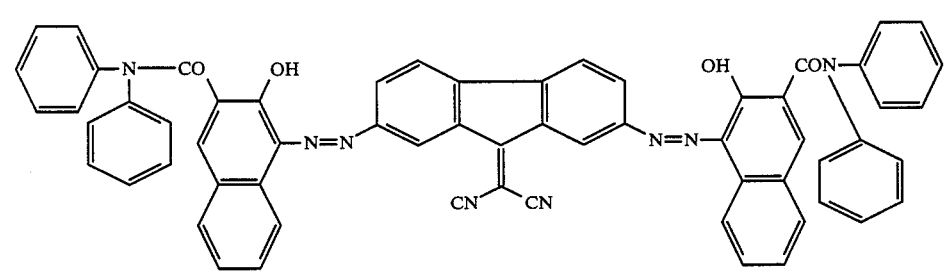
(XII-16)
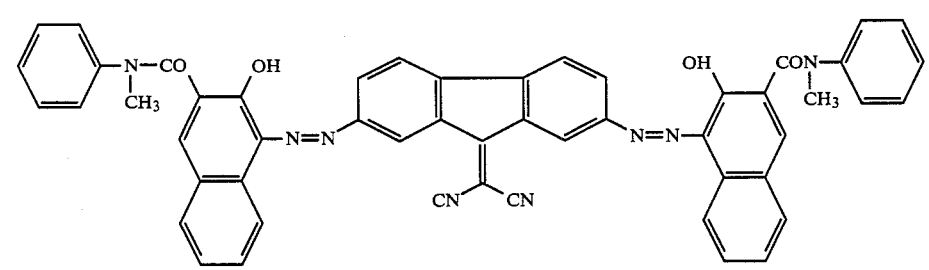
(XII-17)
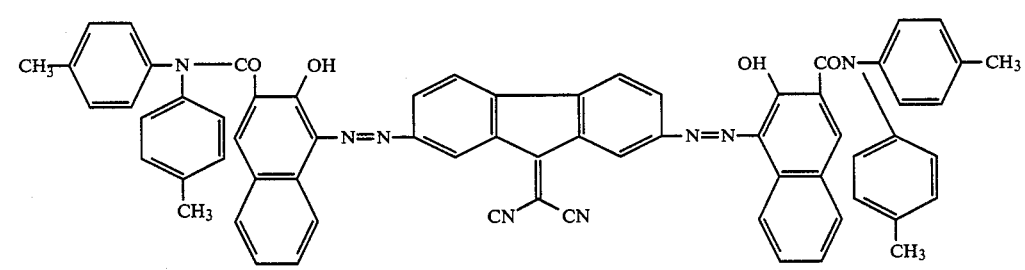
(XII-18)

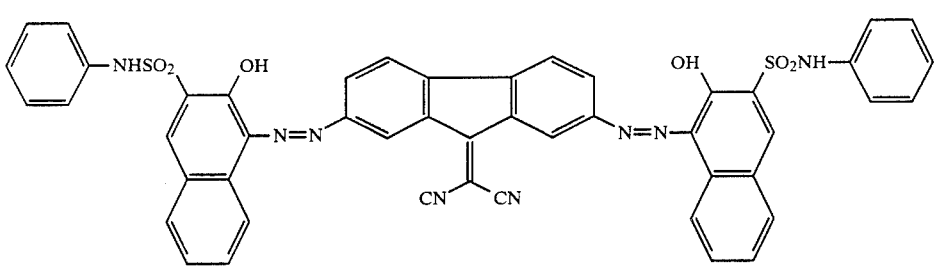
(XII-19)
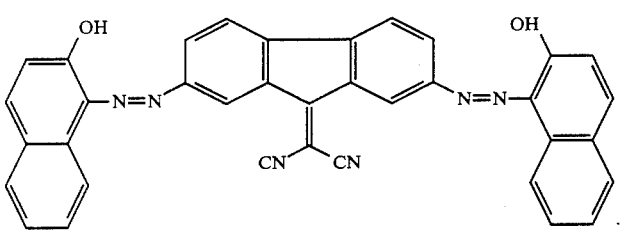
(XII-20)
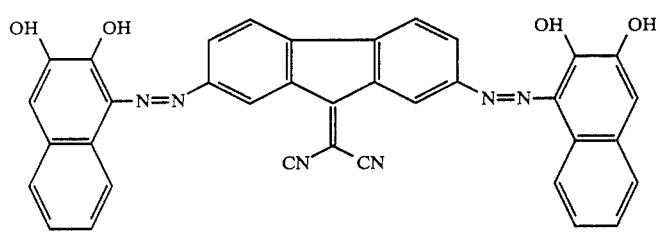
(XII-21)
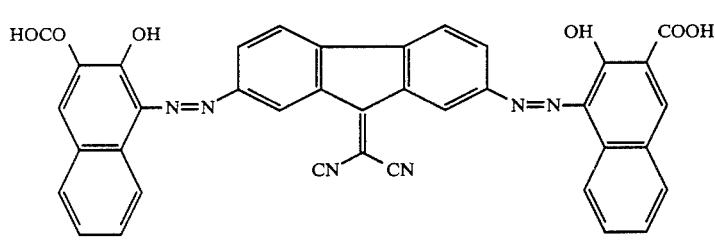
(XII-22)
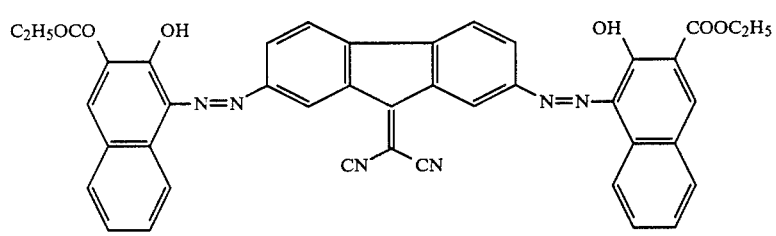
(XII-23)
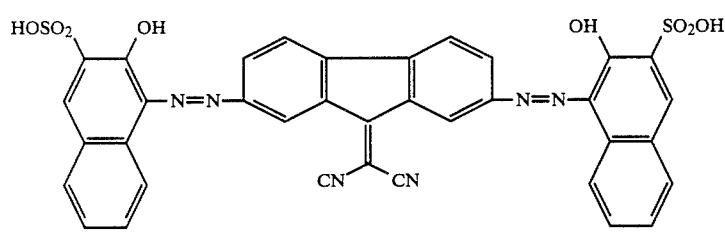
(XII-24)

-continued
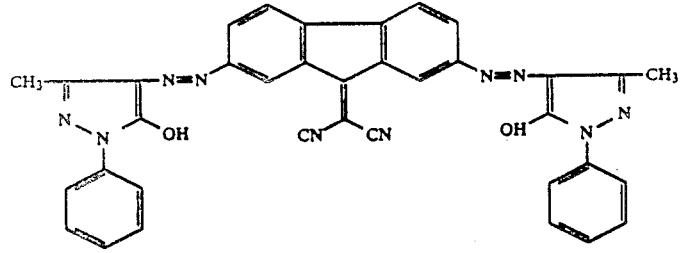
(XII-25)
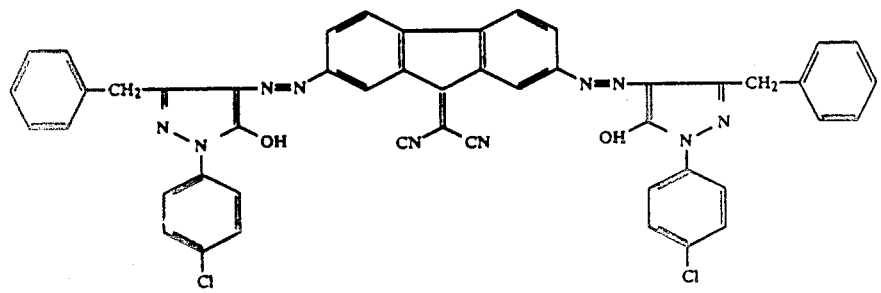
(XII-26)
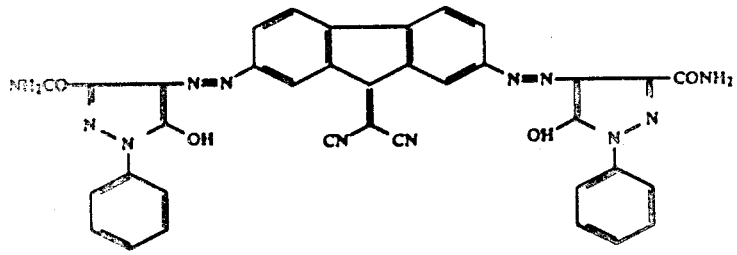
(XII-27)
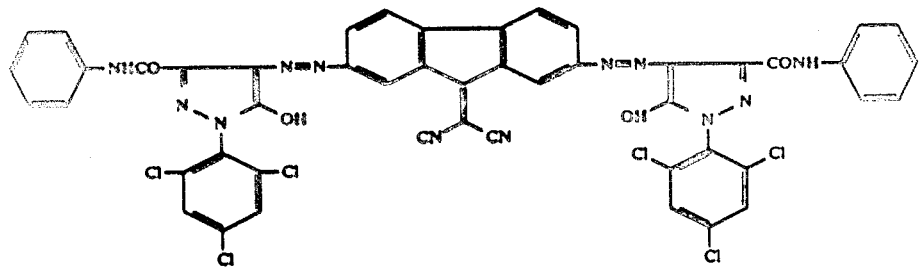
(XII-28)
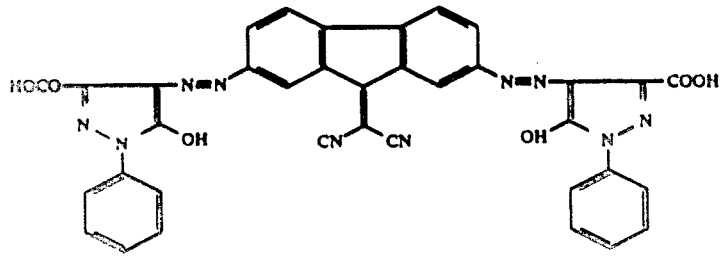
(XII-29)

-continued
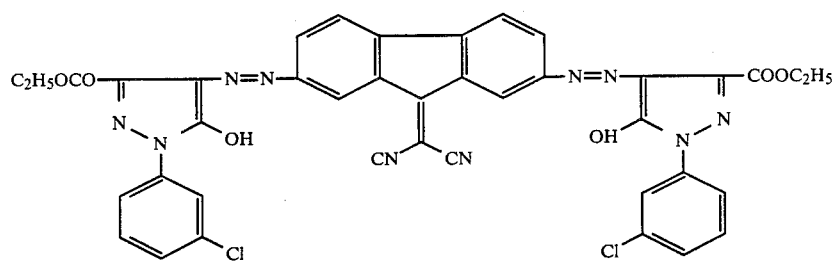
(XII-30)
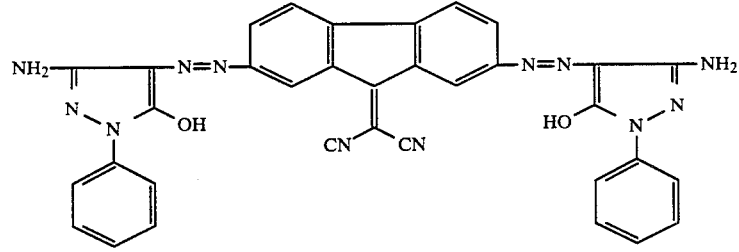
(XII-31)
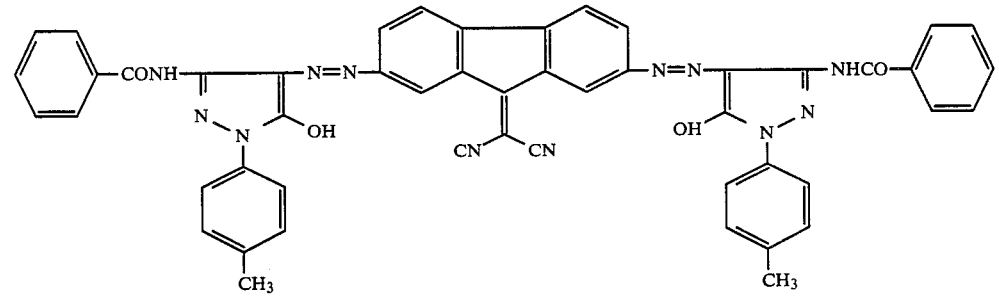
(XII-32)
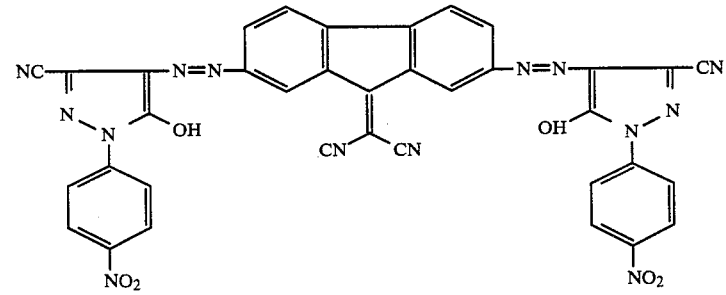
(XII-33)
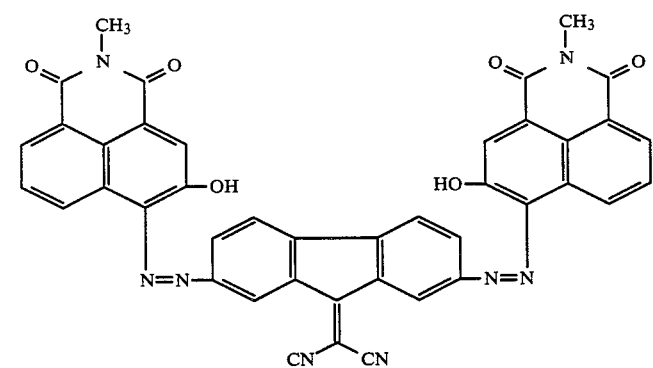
(XII-34)

-continued
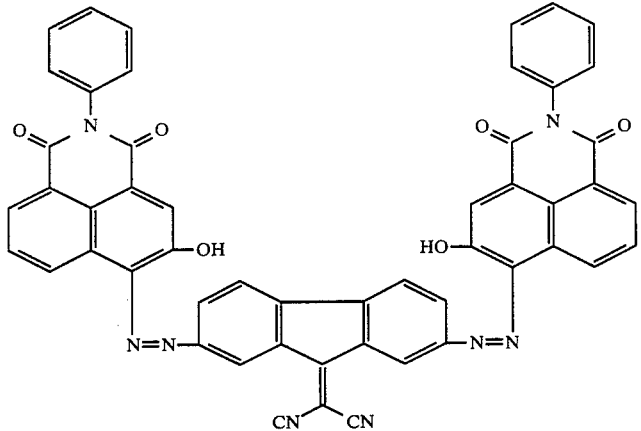
(XII-35)
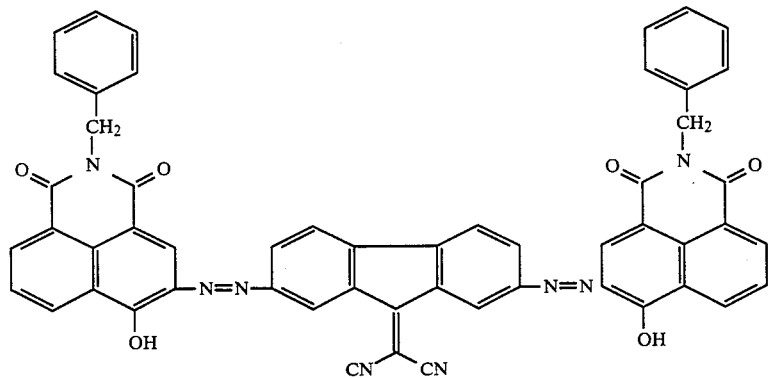
(XII-36)
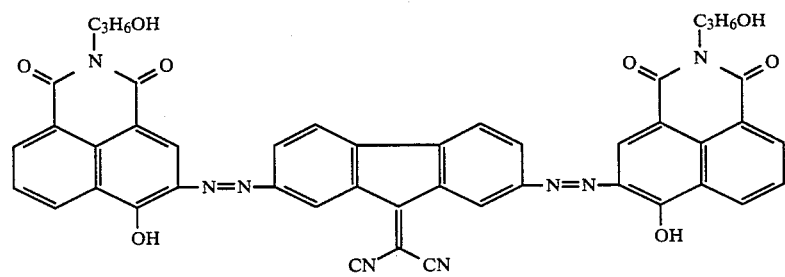
(XII-37)
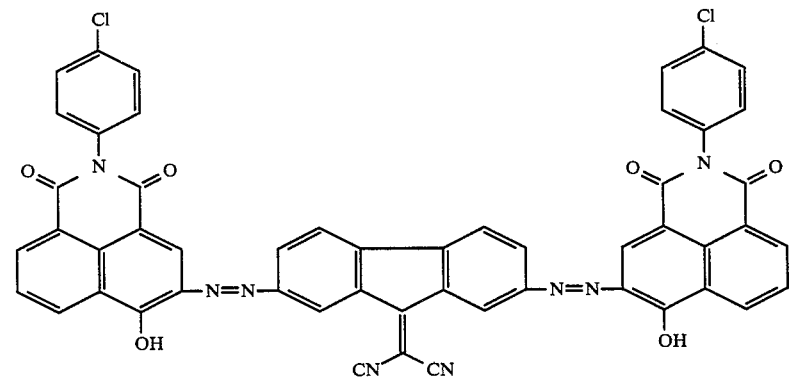
(XII-38)

-continued
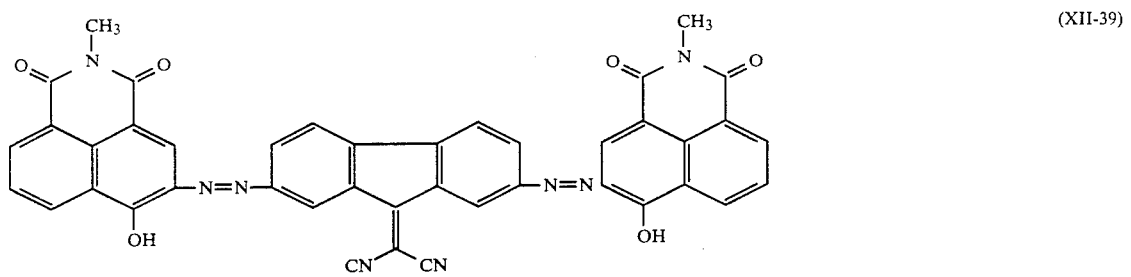 (XII-39)
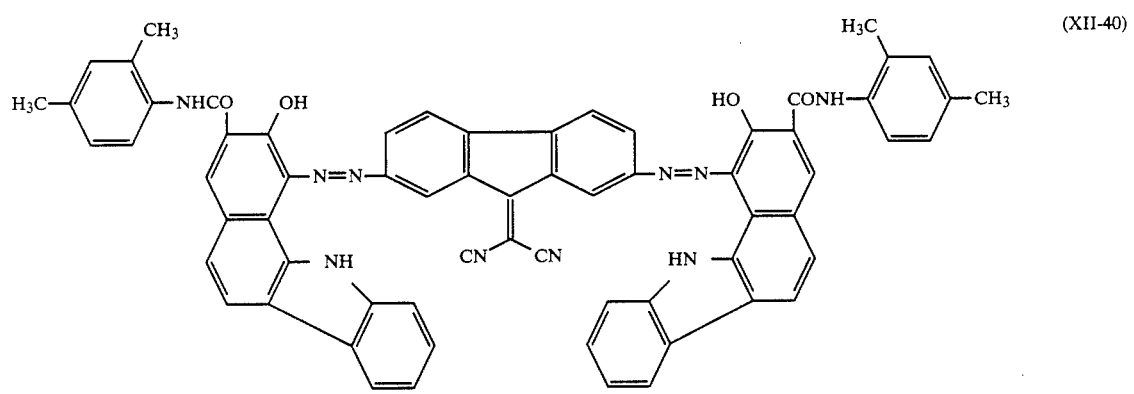 (XII-40)
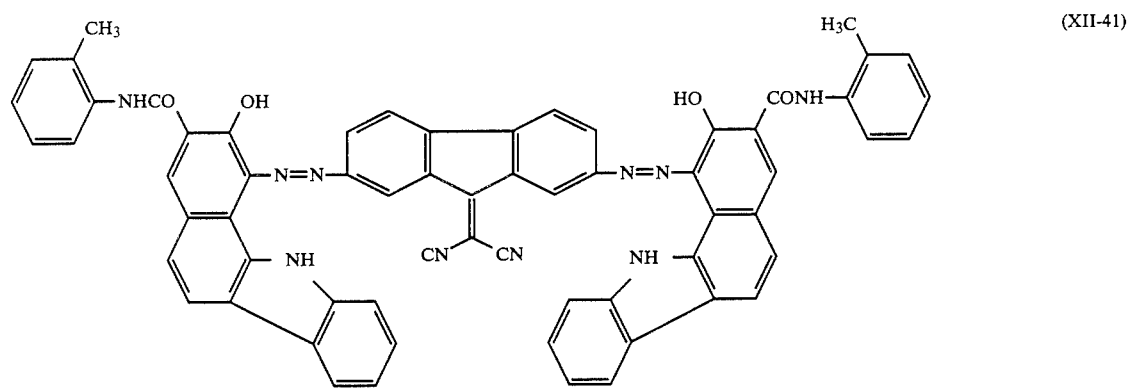 (XII-41)
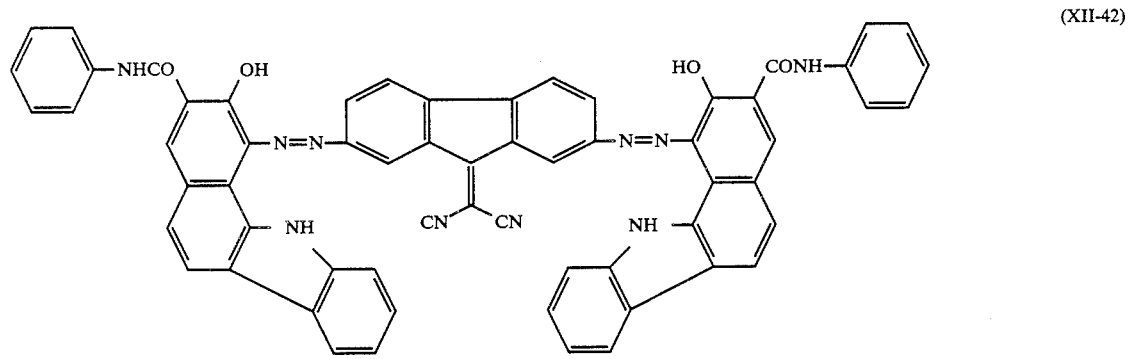 (XII-42)

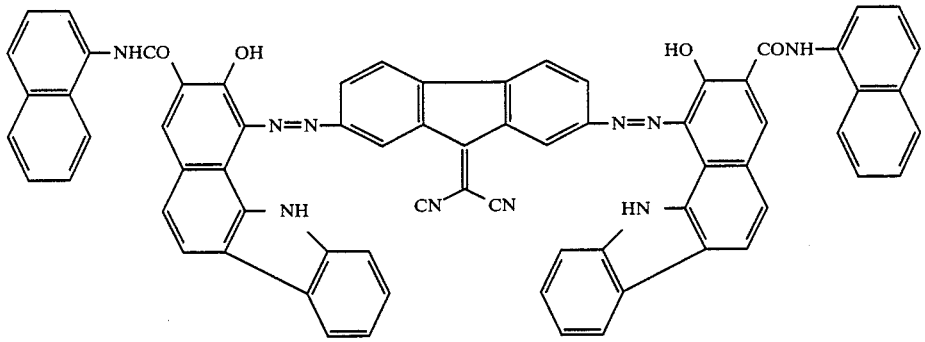

(XII-43)

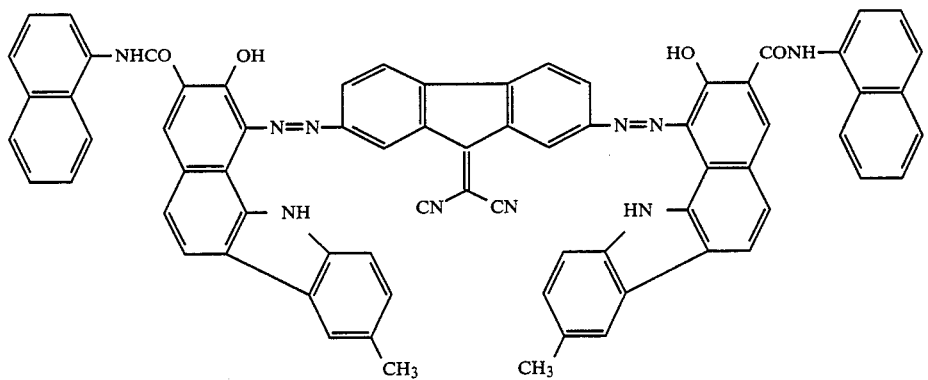

(XII-44)

Reference is now made to the drawings for illustrating the present invention.

The photoreceptor of this invention is constructed, for example, as is shown in FIG. 1. That is, on a conductive support 1 is formed a carrier generating layer 2 containing the previously mentioned CGM as the principal component thereof. And on the carrier generating layer 2 is superposedly provided a carrier transport layer 3 containing the previously mentioned CTM as the principal component thereof, and thus both carrier generating layer 2 and carrier transport layer 3 constitute a photosensitive layer 4.

Figure 2:
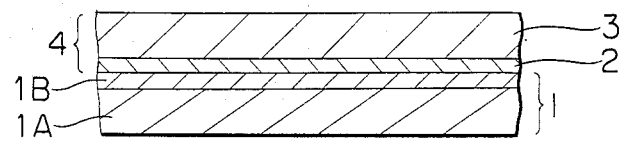

As the material of the conductive support 1 a sheet of metal such as, e.g., aluminum, nickel, copper, zinc, palladium, silver, indium, tin, platinum, gold, stainless steel, brass, or the like, may be used, but the usable materials are not limited to these. For example, as is shown in FIG. 2, on an insulating base 1A may be provided a conductive layer 1B to thereby form a conductive support 1. In this instance, as the base 1A those materials like a paper sheet, plastic sheet having flexibility as well as adequate strength against such stress as bending, tension, etc., are suitably usable. The formation of conductive layer 1B on the insulating base may be made by laminating a metal sheet, by the vacuum deposition of a metal, or by other methods.

The carrier generating layer 2 may be formed by the addition of an appropriate binder resin to the CGM or the further addition thereto of a material having a large transportability of a specific- or nonspecific-polarity carrier (i.e., carrier transport material).

In a practical manner, the carrier generating layer can be obtained by coating (or dipping) and drying a liquid prepared by dissolving or dispersing the CGM along or in combination with an appropriate binder resin into an appropriate solvent.

In this instance, a carrier transport material may also be added. The proportion by weight, in the addition, of the carrier generating material to the carrier transport material is 1 to 0–500, and particularly preferably 1 to 0–50.

The solvent or dispersion medium usable in the above procedure includes, e.g., n-butylamine, diethylamine, ethylenediamine, isopropanolamine, monoethanolamine, triethanolamine, triethylenediamine, N,N-dimethyl-formamide, acetone, methylethyl ketone, cyclohexanone, benzene, toluene, xylene, chloroform, 1,2-dichloroethane, dichloromethane, tetrahydrofuran, dioxane, methanol, ethanol, isopropanol, ethyl acetate, butyl acetate, dimethyl sulfoxide, and the like.

As the binder resin, although the previously mentioned polycarbonate of Formula [A] or [B] is suitable, other binder materials additionally usable include addition-polymerization-type resins, polyaddition-type resins, and polycondensation-type type resins, such as, e.g., polyethylene, polypropylene, acryl resin, methacryl resin, vinyl chloride resin, vinyl acetate resin, epoxy resin, phenol resin, polyurethane resin, polyester resin, alkyd resin, those polycarbonate resins other than the ones having Formulas [A] and [B], silicone resin, melamine resin, and the like, and further copolymerization-type resins containing not less than two repeat units of the above-resins, including insulating resins such as, e.g., vinyl chloride—vinyl acetate copolymer, vinyl chloride-vinyl acetate-maleic anhydride copolymer, and the like, and high-molecular organic semiconductors such as poly-N-vinyl carbazole, and the like. The binder resin is desirable to contain the polycarbonate of Formula [A] or [B] accounting for 15% by weight, and more preferably 30% by weight of the whole binder. And the proportion by weight of the binder resin to the CGM is preferably 1 to 0.1–0.01, and more preferably 1 to 0.1–10.

Further, the carrier generating layer may contain one or not less than two electron-receptive materials for the purpose of improving the sensitivity as well as for reducing the residual electric potential or fatigue of the layer when repeatedly used. The electron-receptive material usable herein includes, e.g., succinic anhydride, maleic anhydride, dibromomaleic anhydride, phthalic anhydride, tetrachlorophthalic anhydride, tetrabromophthalic anhydride, 3-nitrophthalic anhydride, 4-nitrophthalic anhydride, pyromellitic anhydride, mellitic anhydride, tetracyanoethylene, tetracyanoquinodimethane, o-dinitrobenzene, m-dinitrobenzene, 1,3,5-trinitrobenzene, paranitrobenzanitrile, picryl chloride, quinonechloroimide, chloranil, bromanil, dichlorodicyano-parabenzoquinone, anthraquinone, dinitroanthraquinone, 2,7-dinitrofluorenone, 2,4,7-trinitrofluorenone, 2,4,5,7-tetranitrofluorenone, 9-fluorenylidene[dicyanomethylenemalonodinitrile], polynitro-9-fluorenylidene-[dicyanomethylenemalonodinitrile], picric acid, o-nitrobenzoic acid, 3,5-dinitrobenzoic acid, pentafluorobenzoic acid, 5-nitrosalicylic acid, 3,5-dinitrosalicylic acid, phthalic acid, mellitic acid, and other large electron affinity-having compounds. The proportion by weight of the carrier generating material is 100 to 0.01–200, and preferably 100 to 0.1–100.

The thickness of the foregoing CGL2 thus formed is preferably from 0.005 to 20 μm, and particularly preferably from 0.05 to 5 μm. If the thickness is less than 0.005 μm, no adequate sensitivity can be obtained, while if it exceeds 20 μm, no adequate electron retainability can be obtained.

The foregoing CTL3 can be formed in the same manner as in the CGL2 (i.e., by coating and drying a liquid prepared by dissolving or dispersing the foregoing CTM alone or with a binder resin comprised principally of the foregoing polycarbonate). And different other CTMs may also be used in combination.

In this instance, the polycarbonate of Formula [A] or [B] should account for not less than 15% by weight, and preferably not less than 30% by weight of the whole binder. And the proportion by weight of the whole carrier transport material to the whole binder resin should be 1 to 0.1–100, and preferably 1 to 0.1–10.

Further, into the carrier transport layer may be incorporated the previously mentioned electron-receptive material for the purpose of improving the sensitivity and further reducing the residual electric potential or fatigue when repeatedly used. In the case of adding the electron-receptive material to both carrier generating and carrier transport layers, the respective electron-receptive materials to both layers are allowed to be either quite the same or partially the same, and, if necessary, may be quite different. In addition, the electron-receptive material is allowed to be added to either one of the carrier generating layer or the carrier transport layer.

The adding proportion by weight of the electron-receptive material to the whole carrier transport layer is 0.01–100 to 100, and preferably 0.1–50 to 100.

The thickness of the carrier transport layer 3 thus formed is from 2 to 100 μm, and preferably from 5 to 30 μm.

This invention has been illustrated in above, making reference to the embodiment in FIG. 1 or 2. In this invention, in effect, the incorporation of the above-described components will be quite enough for the carrier transport layer and the carrier generating layer to be combined therewith, and therefore the mechanical construction of them as of the electrophotographic photoreceptor is allowed to be arbitrarily selected.

Figure 3:
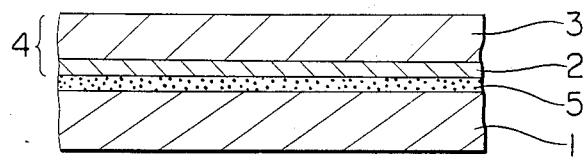

For example, as is shown in FIG. 3, on conductive support 1 may be provided an interlayer 5, on the interlayer is formed carrier generating layer 2, and on the carrier generating layer is further formed carrier transport layer 3. The interlayer 5 is allowed to function to prevent the pouring of the free carrier from conductive support 1 into the photosensitive layer 4 as well as to function as an adhesion layer to render the photosensitive layer 4 adhere to the conductive support. Materials applicable to interlayer 5 include metal oxides such as aluminum oxide, indium oxide, etc., and high molecular materials such as acryl resin, vinyl chloride resin, vinyl acetate resin, epoxy resin, polyurethane resin, phenol resin, polyester resin, alkyd resin, polycarbonate resin, silicone resin, melamine resin, vinyl chloride—vinyl acetate-maleic anhydride copolymer resin, and the like.

Figure 4:
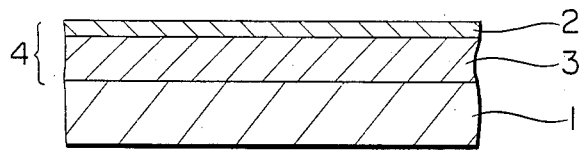

Also, as is shown in FIG. 4, on conductive support 1 may, through or without through the foregoing interlayer 5, be formed carrier transport layer 3, and on this layer is provided carrier generating layer 2 to thereby construct photosensitive layer 4.

Figure 5:
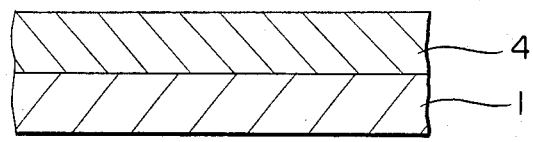

Further, FIG. 5 shows an example of the formation of a photosensitive layer consisting of a single layer prepared by dispersing the above carrier generating material into the above electron transport material-containing carrier transport phase (i.e., a mixture layer of the carrier generating and carrier transport phases). As the binder of this photosensitive layer the foregoing carbonate should be used in a quantity accounting for not less than 15% by weight, and preferably not less than 30% by weight of the whole binder.

In addition, the CGM and CTM usable in this invention are not limited to the above-described materials but include also those prior-art inorganic-type materials such as, e.g., zinc oxide, lead oxide, titanium oxide, zinc sulfide, lead sulfide, cadmium sulfide, mercury sulfide, and the like.

In the formation by coating of the foregoing CTL (or CGL), a liquid containing the CTM (or further CGM) and a binder comprised principally of the above polycarbonate is coated on a support (base) and then dried. In this instance, the binder concentration of the liquid should be not less than 5% by weight in accordance with this invention. The polycarbonate used in this invention, since it is less crystallizable, will not be crystallized during the formation by coating of a photosensitive layer even if the concentration thereof in the coating liquid is increased to more than 5% by weight or even if the solvent used is a weak solvent. The increase in the polycarbonate concentration to more than 5% by weight itself is a novel construction which is beyond the expectation in the prior art, and at the same time enables the improvement on the mechanical strength and impressions, etc., of the photosensitive layer because of the increase in the polycarbonate ratio (content). However, in order to perfectly avoid the crystallization (or deposition) of the polycarbonate, the upper limit of the binder concentration should be set to 30% by weight. Also, the viscosity($\eta$) of the liquid should be from 0.5 to 1000 cp, and more preferably from 3 to 300 cp.

The solvent usable herein includes ethylene chloride, tetrachloroethane, tetrahydrofuran, dioxane, chloroform, and the like. These solvents are relatively weak solvents, but, since the polycarbonate of this invention is used as the binder, no crystallization of it will be produced in these solvents nor will the brushing of the coated layer due to the dew concentration possibly caused in the case of using a strong solvent be produced.

Next, the method for the preparation of the foregoing photoreceptor, e.g., the photoreceptor as shown in FIG. 1 will be described particularly with respect to the CTM (the method may be applied to the CGM as well).

Figure 6:
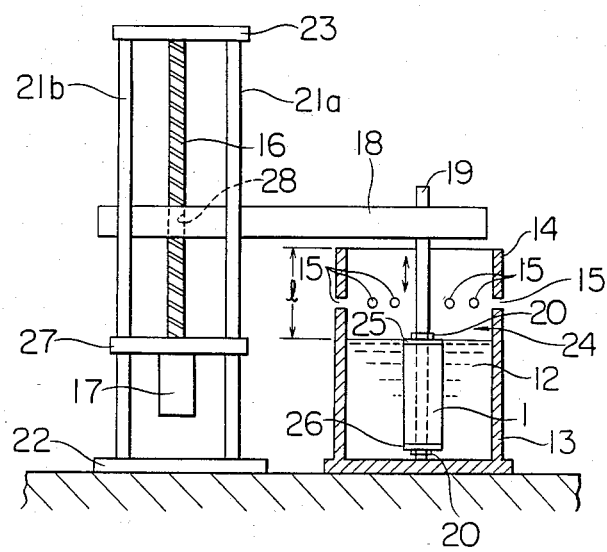
FIG. 6 is a schematic cross-sectional view of the immersion coating and drying apparatus.

In practicing this method, an immersion coating and drying apparatus that is shown in FIG. 6 may be used.

Figure 7:
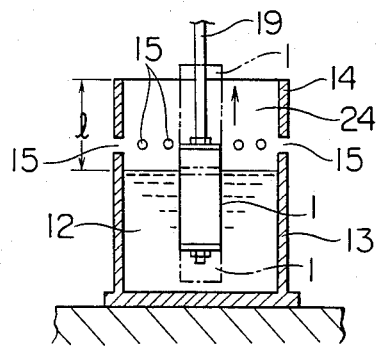
FIG. 7 is a schematic cross-sectional view of the apparatus when immersion coating.

A base, for example, a drum-like base 1, is vertically movably arranged inside a coating container 13 that contains a coating liquid 12 (e.g., a liquid containing the above CTM and binder), the base being held by a support rod 19 provided so as to pierce into the liquid. FIG. 6 shows a condition in which the base 1 is in the down position to be sufficiently immersed in the coating liquid 12. Provided above abutting on the container 13 is a cylindrical cover member 14, the diameter of which is almost equal to that of the container 13 and which has pierced holes 15 in the side wall thereof for the purpose of controlling the solvent vapor concentration distribution and the inside of which is a drying region 24. Accordingly, as is shown in FIG. 7, the construction is such that, by lifting up an arm 18, to which is fixed the support rod 19, from the immersion position as in FIG. 6 (in FIG. 7 the position is shown with the alternate long-and-short-dash line), the base 1 is taken up from the coating liquid 12 as shown with the solid line and further with the alternate long-and-two-short-dashes line of FIG. 7, and then passes at a give speed through the drying region 24. If a new base is lowered to the down position from the base 1's up position taken out of the drying region 24 (i.e., inside the cover member 14) and if the above-described operation is repeated, the immersion of the external surface of the base into the coating liquid 12 and the coating and drying of the liquid can be carried out again. In addition, in the case where the base 1 is in the simply cylindrical form, the top and bottom openings thereof should be covered with lids 25 and 26 tightened by nuts 20 to thereby prevent the coating liquid 12 from getting into the base 1 (however, the top lid 25 need not necessarily be provided depending on the depth of the base 1's immersion).

On the other hand, the up-down motion mechanism of the above arm 18 is such that struts 21a and 21b are fixed in the vertical position onto a base plate 22, and the top ends of the struts are fixed to an upper base plate 23. To the upper base 23 a vertically downwardly extending feed screw shaft 16 is rotatably fixed through a bearing. The bottom end of this feed screw shaft 16 pierces through the center hole of a fixed plate 27 that is fixed to the struts 21a and 21b to be integrated with the rotary shaft of a motor 17 that is fixed to the underneath of the fixed plate 27. In the above arm 18 is formed a female thread 28 corresponding to the thread of the feed screw shaft, and the feed screw shaft is pierced rotating with its thread spiralling through the arm 18, whereby the arm 18, being supported by the feed screw shaft 16, is moved up and down with the rotation of the feed screw shaft by motor 17.

EXAMPLES

Examples of the present invention will be illustrated in detail below:

Example 1

On an aluminum-vacuum-deposited, 100 μm-thick polyethylene terephthalate conductive support was provided an interlayer having a thickness of about 0.1 μm, comprised of a vinyl chloride—vinyl acetate—maleic anhydride copolymer "Eslec MF-10" (manufactured by Sekisui Chemical Industry Co., Ltd.). Subsequently, 2 g of a bisazo compound having the foregoing Formula (XI-5) and 100 ml of 1,2-dichloroethane were taken together to be dispersed spending 12 hours by means of a ball mill. The thus obtained dispersed liquid was then coated on the above-prepared interlayer by means of a doctor blade, and then completely dried, whereby a CGL having a thickness of about 0.3 μm was formed.

On the other hand, 11.25 g of a styryl compound having the foregoing Formula (VI-18) and 15 g of a polycarbonate having the foregoing Formula (B-2) were dissolved into 100 ml of 1,2-dichloroethane, and the obtained solution was then coated on the above-formed CGL by use of the doctor blade, and then dried at a temperature of 80° C. for an hour to form a CTL having a thickness of 15 μm, whereby an electrophotographic photoreceptor on the basis of this invention was produced. This was regarded as Sample 1.

Examples 2 through 5

Four different electrophotographic photoreceptor on the basis of this invention were prepared in quite the same manner as in Example 1 except that compounds having the foregoing Formulas (VIII-3), (IX-3), (X-4) and (XII-2) were used, respectively, in place of the (XI-5) used in the formation of the CGL of Example 1. These were regarded as Sample 2, Sample 3, Sample 4 and Sample 5, respectively.

Examples 6 and 7

Two different electrophotographic photoreceptors of this invention were prepared in quite the same manner as in Example 1 except that compounds having the foregoing Formulas (A-1) and (A-10) were used in place of the (B-2) used for the formation of the CTL of Example 1. These were regarded as Sample 6 and Sample 7.

Example 8

An electrophotographic photoreceptor of this invention was prepared in the same manner except that in the formation of CGL the same polycarbonate as that of the CTL of Example 2 was used as the binder, and a compound having the foregoing Formula (I-14) was used as the CTM. This was regarded as Sample 8.

Comparative Example 1

A comparative electrophotographic photoreceptor was prepared in the same manner as in Example 1 except that a known polycarbonate was used as the binder in place of the polycarbonate used in the formation of the CTL of Example 1. This was regarded as Comparative Sample 1.

The thus obtained electrophotographic photoreceptors (Samples 1 through 8 and Comparative Sample 1) each was examined with respect to the electrophotographic characteristics thereof by use of an Electrometer Model SP-428 (manufactured by Kawaguichi Denki Seisakusho K.K.). That is, an Exposure E ½(lux. sec) was examined which is necessary to attenuate to one half the electric potential $V_A(V)$ when the surface of each photoreceptor was charged for 5 seconds at a charging electric potential of $-6$ KV and the electric potential (initial electric potential) $V_1$ after the dark attenuation for 5 seconds of the photoreceptor. The examined results are as given in Table 1.

TABLE 1

| Electrophotographic photoreceptor | $V_A(V)$ | $E\frac{1}{2}$ (lux · sec) |
|---|---|---|
| Sample 1 | −830 | 2.3 |
| Sample 2 | −705 | 3.0 |
| Sample 3 | −680 | 4.3 |
| Sample 4 | −635 | 3.7 |
| Sample 5 | −785 | 3.3 |
| Sample 6 | −810 | 2.4 |
| Sample 7 | −815 | 2.4 |
| Sample 8 | −730 | 3.2 |
| Comparative sample 1 | −795 | 2.3 |

Further, each of the Samples 1–8 and Comparative Sample 1 was used in a dry-process electrophotographic copier U-Bix 2000R (manufactured by Konishiroku Photo Industry Co., Ltd.) to make copies in succession. In the copying cycle, the black original copying electric potential Vb(V) and the white original copying electric potential Vw(V) obtained when the exposure aperture value was set to 1.0 were measured by use of an Electrostatic Voltometer Model 144D-ID (manufactured by Monroe Electronics Inc.) immediately before development. The obtained results are as given in Table 2.

In addition, the term "black original copying electric potential" used in above implies the surface electric potential of the photoreceptor obtained when a black paper having a reflection density of 1.3 was used as an original to make the above copying cycle, and the term "white original copying electric potential implies the surface electric potential of the same photoreceptor obtained when a white paper is used.

TABLE 2

| Electrophotographic photoreceptor | Image electric potential | | | | | |
|---|---|---|---|---|---|---|
| | Initial | | After 5000 copies | | · Variance | |
| | Vb | Vw | Vb | Vw | ΔVb | ΔVw |
| Sample 1 | −680 | −40 | −650 | −45 | ⊖30 | ⊕5 |
| Sample 2 | −565 | −50 | −530 | −60 | ⊖35 | 0 |
| Sample 3 | −580 | −75 | −555 | −80 | ⊖25 | ⊕5 |
| Sample 4 | −535 | −70 | −500 | −70 | ⊖35 | 0 |
| Sample 5 | −665 | −60 | −645 | −70 | ⊖20 | ⊕10 |
| Sample 6 | −675 | −45 | −640 | −50 | ⊖35 | ⊕5 |
| Sample 7 | −670 | −45 | −635 | −50 | ⊖35 | ⊕5 |
| Sample 8 | −580 | −60 | −610 | −95 | ⊕30 | ⊕35 |
| Comparative sample 1 | −645 | −35 | −610 | −40 | ⊖35 | ⊕5 |

Note:
In the above table, the ΔVb(V) and ΔVw(V) represent the variances of the black original copying electric potential Vb(V) and white original copying electric potential Vw(V), respectively. And the ⊕ represents increase in the variance, while the ⊖ represents decrease in the variance.

On the other hand, the photoreceptors of the above examples were examined with respect to their surface conditions. The results obtained in the examination are as given in the following Table 3.

TABLE 3

| Electrophotographic photoreceptors | Surface protrusions | Toner filming |
|---|---|---|
| Sample 1 | None | None |
| Sample 2 | None | None |

TABLE 3-continued

| Electrophotographic photoreceptors | Surface protrusions | Toner filming |
|---|---|---|
| Sample 3 | None | None |
| Sample 4 | None | None |
| Sample 5 | None | None |
| Sample 6 | None | None |
| Sample 7 | None | None |
| Sample 8 | None | None |
| Comparative Sample 1 | Present | Present |

From the results given in the above table it is apparent that the photoreceptors of the present invention have satisfactory surface smoothness and bring about no toner filming trouble.

Comparative Example 2

A comparative electrophotographic photoreceptor (Comparative Sample 2) was prepared in the same manner except that the binder concentration in the coating liquid that was used in the formation of the CTL of Example 1 was changed to 4% by weight of the solvent. However, because the viscosity of the coating liquid was so low that the liquid flowed down, the thickness of the CTL was as small as 5 μm.

What is claimed is:

1. A photoreceptor comprising a photosensitive layer and a support wherein said photosensitive layer comprises a carrier generation layer and a carrier transport layer wherein said carrier generation layer and/or said carrier transport layer contains a polycarbonate compound represented by the following Formula (A) or (B) as a binder

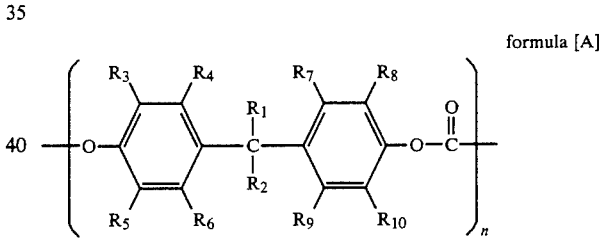

formula [A]

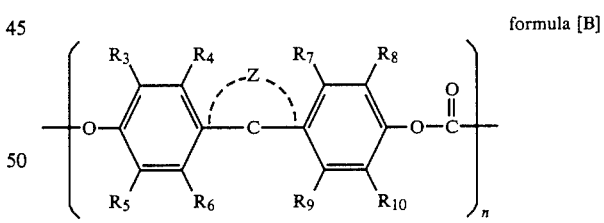

formula [B]

wherein $R_1$ and $R_2$ are independently hydrogen atom, substituted or unsubstituted aliphatic group, or substituted or unsubstituted hydrocarbon ring provided that at least one of $R_1$ and $R_2$ has at least 3 carbon atoms, Z represents a group of atoms necessary for constituting a substituted or unsubstituted carbon ring or a substituted or unsubstituted heterocyclic ring, $R_3$ to $R_{10}$ in Formulas (A) and (B) are independently a hydrogen atom, a halogen atom, a substituted or unsubstituted aliphatic group or a substituted or unsubstituted hydrocarbon ring, and n is a number from 10 to 1000.

2. The photoreceptor of claim 1, wherein said carrier generation layer contains a carrier generating material and said carrier transport layer contains a carrier transporting material.

3. The photoreceptor of claim 2, wherein said carrier generation layer contains said polycarbonate compound at least 15 wt% by weight of the total amount of the binder contained therein.

4. The photoreceptor of claim 3, wherein said carrier generation layer contains said polycarbonate compound at least 30 wt% by weight of the total amount of the binder contained therein.

5. The photoreceptor of claim 3, wherein the ratio by weight of said carrier generating material against said total binder in said carrier generation layer is from 1:0.1 to 1:100.

6. The photoreceptor of claim 5, wherein the ratio by weight of said carrier generating material against said total binder in said carrier generation layer is from 1:0.1 to 1:10.

7. The photoreceptor of claim 2, wherein said carrier generating material is selected from the group consisting of bisazo compounds and polycyclic quinone compounds.

8. The photoreceptor of claim 2, wherein said carrier transport layer contains said polycarbonate compound at least 15 wt% by weight of the total amount of the binder contained therein.

9. The photoreceptor of claim 8, wherein said carrier transport layer contains said polycarbonate compound at least 30 wt% by weight of the total amount of the binder contained therein.

10. The photoreceptor of claim 8, wherein the ratio by weight of said carrier transporting material against said total binder in said carrier transporting layer is from 1:0.1 to 1:100.

11. The photoreceptor of claim 10, wherein the ratio by weight of said carrier transporting material against said total binder in said carrier transporting layer is from 1:0.1 to 1:10.

12. The photoreceptor of claim 2, wherein said carrier transporting material is selected from the group consisting of hydrazone derivatives, carbazol derivatives, pyrazoline derivatives, styryl derivatives and amine derivatives.

13. The photoreceptor of claim 1, wherein said photosensitive layer is a single layer in which the carrier generating material and carrier transporting marterial are dispersed.

14. The photoreceptor of claim 13, wherein said photosensitive layer contains said polycarbonate compound at least 15 wt% by weight of the total amount of the binder contained therein.

15. The photoreceptor of claim 14, wherein said photosensitive layer contains said polycarbonate compound at least 30 wt% by weight of the total amount of the binder contained therein.

16. The photoreceptor of claim 1, wherein at least one of said $R_1$ and $R_2$ is selected from the group consisting of

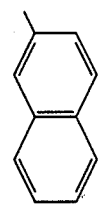 (1)

wherein, $R_{11}$ is a hydrogen atom, an alkyl group, or an alkyl ester group represented by $-(CH_2)_mCOOR'$ in which $R'$ is an alkyl group, and m is equal to or more than 1, (2)

(3) An alkyl group represented by $-(C_mH_{2m+1})$ in which m is equal to or more than 4, and (4) An alkyl ester group represented by $-(CH_2)_mCOOR_{12}$ in which $R_{12}$ is an alkyl group, and m is equal to or more than 2.

17. The photoreceptor of claim 1, wherein said $R_3$ to $R_{10}$ are independently a hydrogen atom, a halogen atom, an alkyl group or a saturated hydrocarbon ring.

18. The photoreceptor of claim 1, wherein said Z represents a group necessary for constituting a cyclopentyl ring or a cyclohexyl ring, said ring may have an acetyl group or acetylamido group.

19. The photoreceptor of claim 2, wherein said carrier generation layer has the thickness within the range of from 0.005 μm to 20 μm.

20. The photoreceptor of claim 2, wherein said carrier transport layer has the thickness within the range of from 2 μm to 100 μm.

21. The photoreceptor of claim 2, wherein said photoreceptor has a intermediate layer between said photosensitive layer and said support.

22. The photoreceptor of claim 2, wherein said support is composed of a sheet of metal such as aluminum, nickel, copper, zinc, palladium, silver, indium, tin, platinum, gold, stainless steel and brass.

23. The photoreceptor of claim 2, wherein said support consists of isolated substrate and conductive layer provided thereon.

24. A process for preparing a photoreceptor which comprises forming a photosensitive layer by coating a solution containing a semiconductor material and a binder on a support, wherein said solution contains a polycarbonate compound represented by the following formula [A] or [B] as said binder and the content of said binder is in the range of from 5% to 30% by weight of a solvent

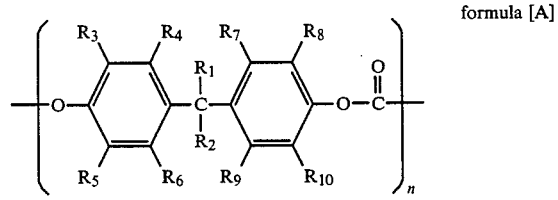

formula [A]

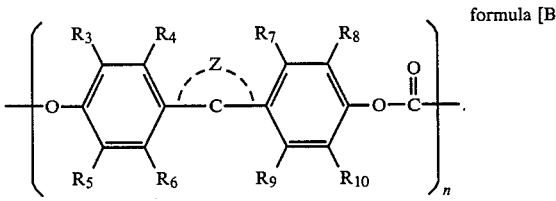

formula [B]

25. The process of claim 24, wherein said semiconductor material is carrier generating material or carrier transporting material.

26. The process of claim 24, wherein the content of said polycarbonate is at least 15% by weight of the total amount of said binder contained in said solution.

27. The process of claim 25, wherein the content of said polycarbonate is at least 30% by weight of the total amount of said binder contained in said solution.

28. The process of claim 26, wherein the viscosity of said solution is in the range of from 0.5 cp to 1000 cp.

29. The process of claim 28, wherein the viscosity of said solution is in the range of from 3 cp to 300 cp.

30. The photoreceptor of claim 13, wherein said photoreceptor has a intermediate layer between said photosensitive layer and said support.

31. The photoreceptor of claim 13, wherein said support is composed of a sheet of metal such as aluminum, nickel, copper, zinc, palladium, silver, indium, tin, platinum, gold, stainless steel and brass.

32. The photoreceptor of claim 13, wherein said support consists of isolated substrate and conductive layer provided thereon.

* * * * *